(12) United States Patent
Wong et al.

(10) Patent No.: US 11,143,826 B1
(45) Date of Patent: Oct. 12, 2021

(54) OPTICAL CONNECTION SYSTEMS AND CONNECTORS THEREFOR

(71) Applicant: Senko Advanced Components, Inc., Marlborough, MA (US)

(72) Inventors: Yim Wong, Kowloon Bay (HK); Man Kit Wong, Kowloon Bay (HK); Jeffrey Gniadek, Oxford, MA (US)

(73) Assignee: Senko Advanced Components, Inc., Marlborough (MA)

( * ) Notice: Subject to any disclaimer, the term of this patent is extended or adjusted under 35 U.S.C. 154(b) by 0 days.

(21) Appl. No.: 16/893,385

(22) Filed: Jun. 4, 2020

Related U.S. Application Data

(60) Provisional application No. 62/857,038, filed on Jun. 4, 2019, provisional application No. 62/857,031, filed on Jun. 4, 2019, provisional application No. 62/857,026, filed on Jun. 4, 2019, provisional application No. 62/856,996, filed on Jun. 4, 2019.

(51) Int. Cl.
*G02B 6/40* (2006.01)
*G02B 6/38* (2006.01)

(52) U.S. Cl.
CPC ........... *G02B 6/406* (2013.01); *G02B 6/3831* (2013.01); *G02B 6/3897* (2013.01)

(58) Field of Classification Search
None
See application file for complete search history.

(56) References Cited

U.S. PATENT DOCUMENTS

| | | | |
|---|---|---|---|
| 6,364,536 B1* | 4/2002 | Chen | G02B 6/3825 385/59 |
| 6,592,268 B2* | 7/2003 | Chen | G02B 6/3879 385/56 |
| 6,604,861 B2* | 8/2003 | Chen | G02B 6/3869 385/56 |
| 6,715,931 B1* | 4/2004 | Chen | G02B 6/3821 385/78 |
| 6,769,814 B2* | 8/2004 | Kiani | G02B 6/3821 385/60 |
| 6,776,533 B2* | 8/2004 | Gherardini | G02B 6/3878 385/56 |
| 7,422,376 B2* | 9/2008 | Chen | G02B 6/3821 385/78 |
| 7,556,436 B2* | 7/2009 | Van Der Steen | G02B 6/3817 385/139 |

* cited by examiner

*Primary Examiner* — Rhonda S Peace

(57) ABSTRACT

Connection systems for use in fiber optic communication networks and systems are disclosed. Embodiments of backplane connection systems are disclosed that include a daughterboard connector that can make with a backplane connector. One of the connectors can include a movable latch element that can bend a bendable arm on the other connector to latch and unlatch the connectors. A connector can include a movable blocking element that prevents a latch control element from moving its full range when the connectors are disconnected. A latch control element can have a range of motion along which it maintains the connection system in a latched configuration. A mounting system is also disclosed that permits a connector to flow or move along the board in a limited range of motion with respect to three axes.

4 Claims, 53 Drawing Sheets

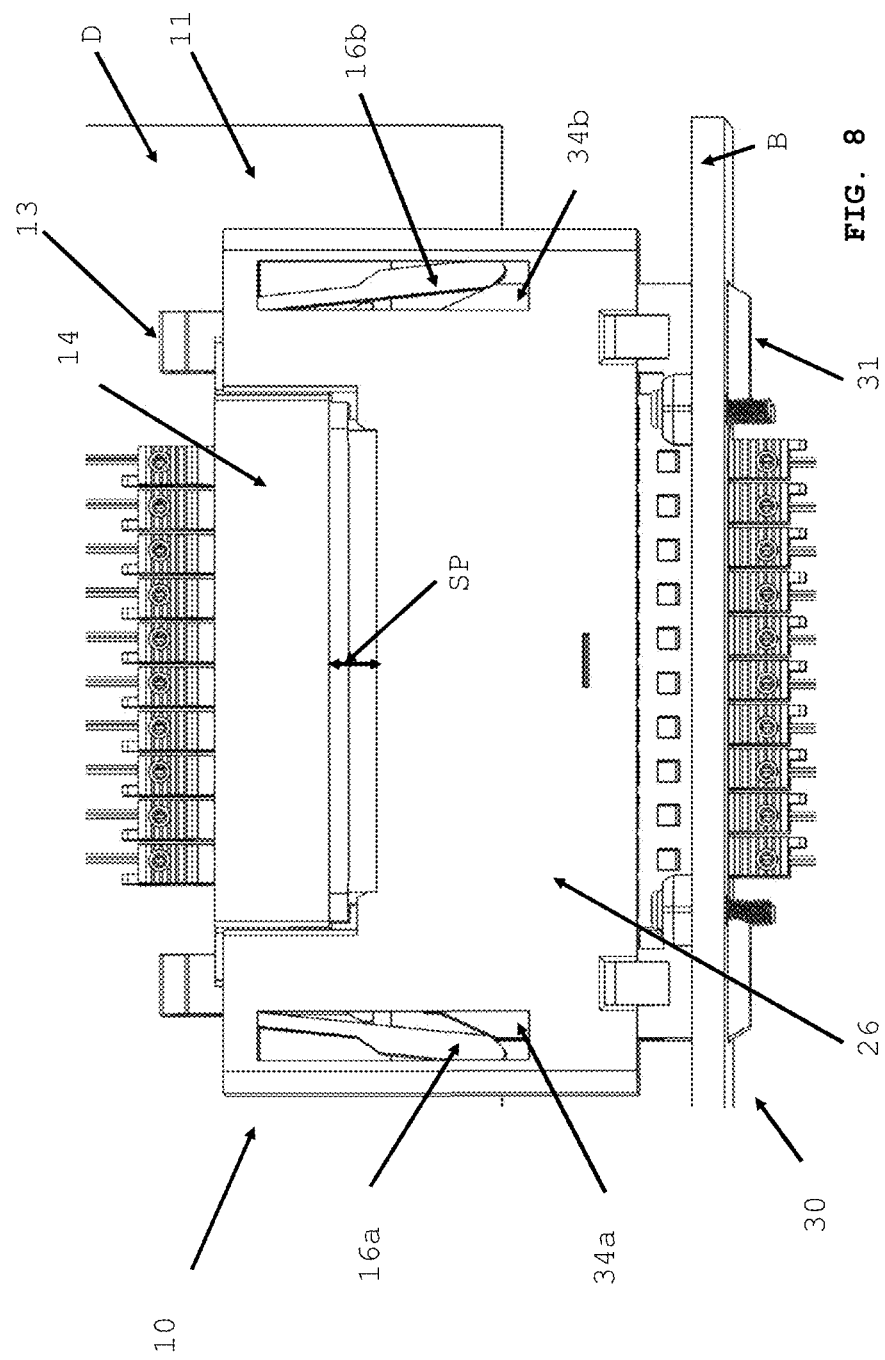

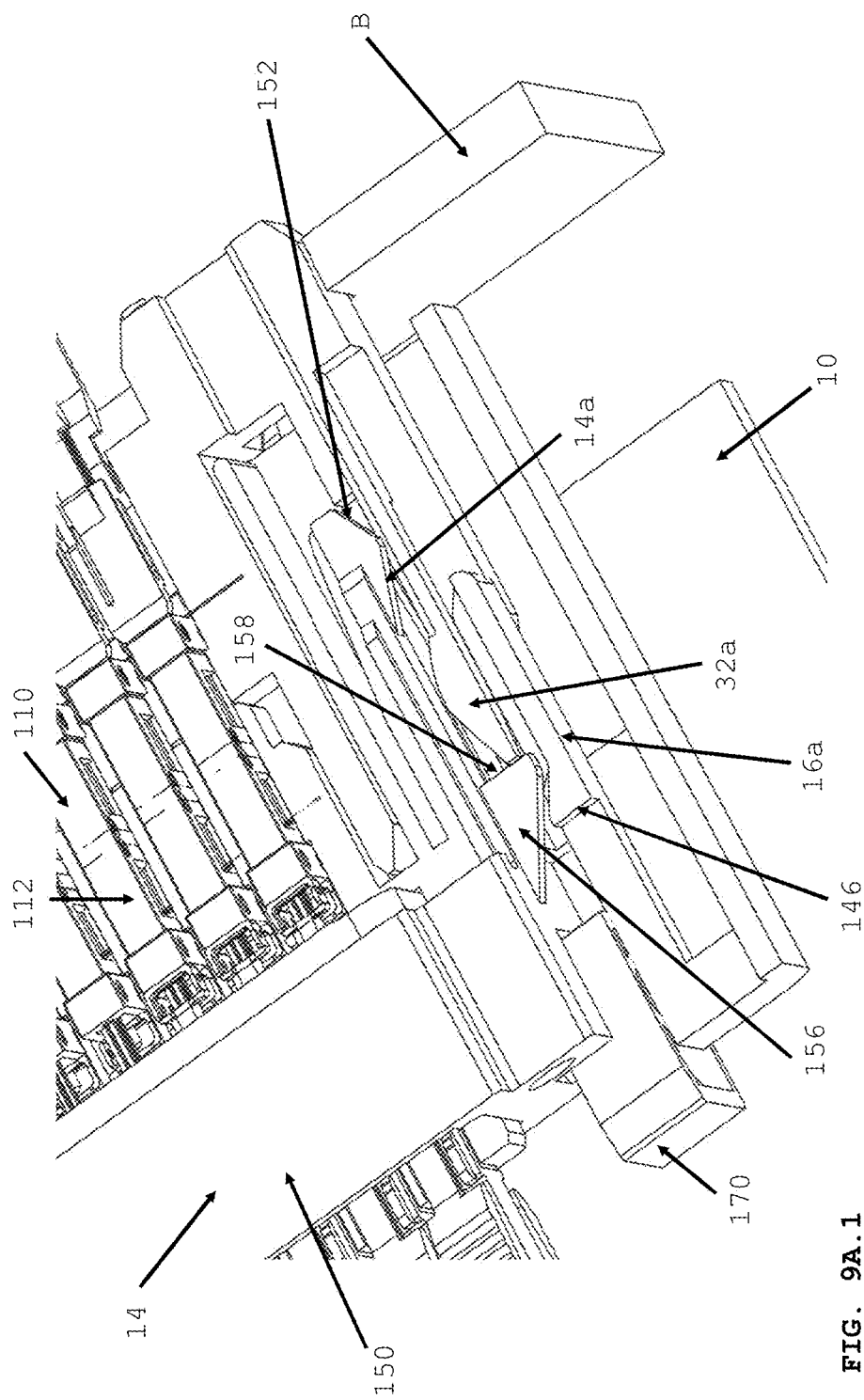
FIG. 9A.1

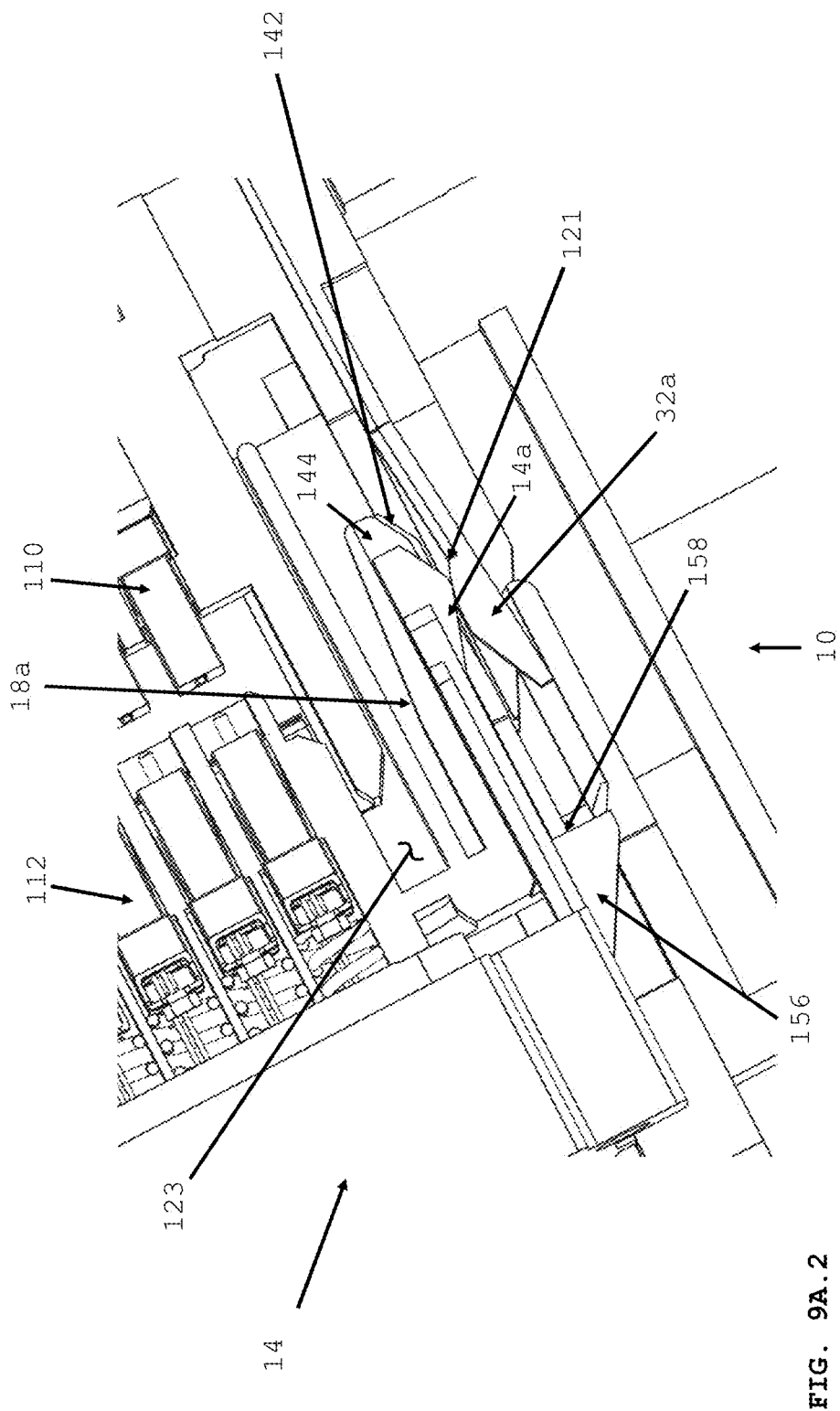
FIG. 9A.2

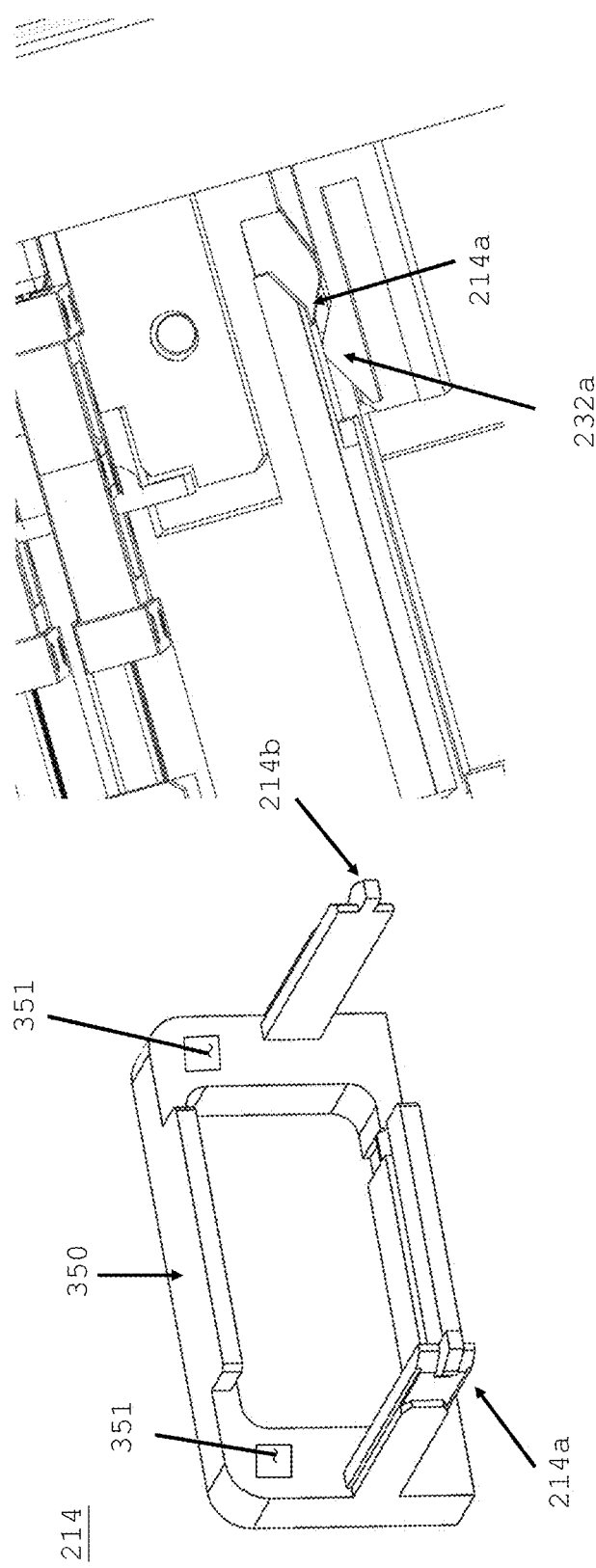

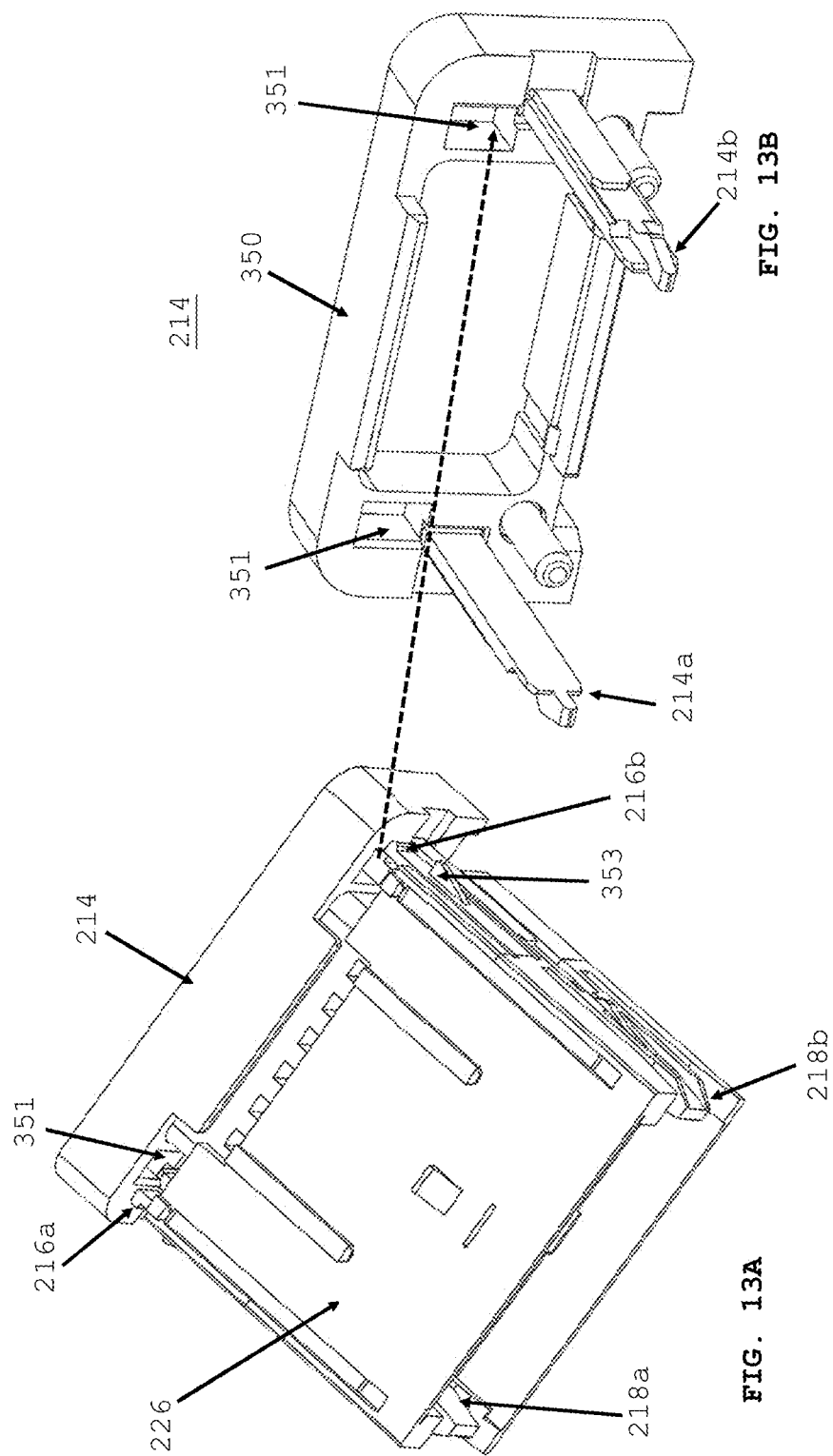

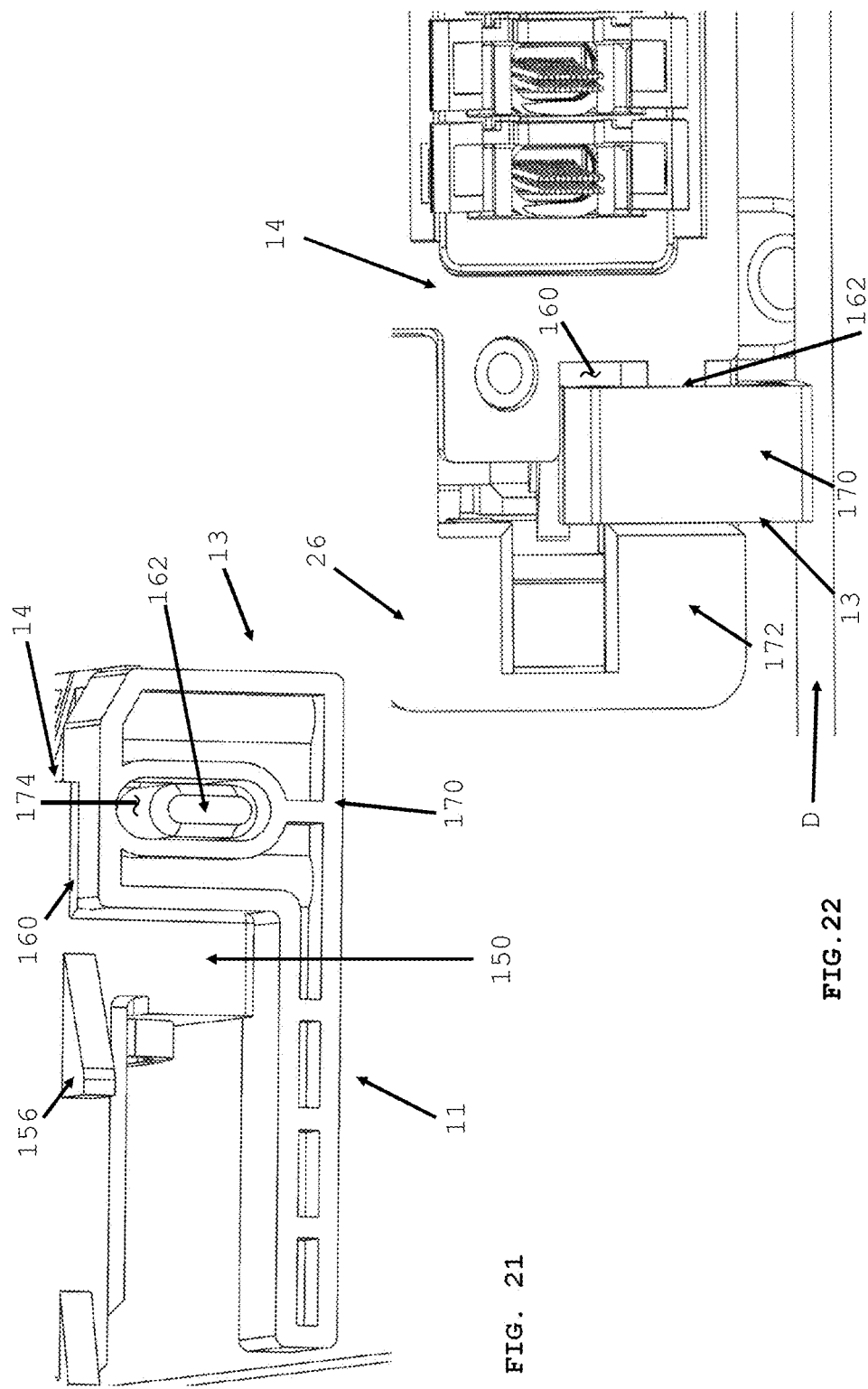

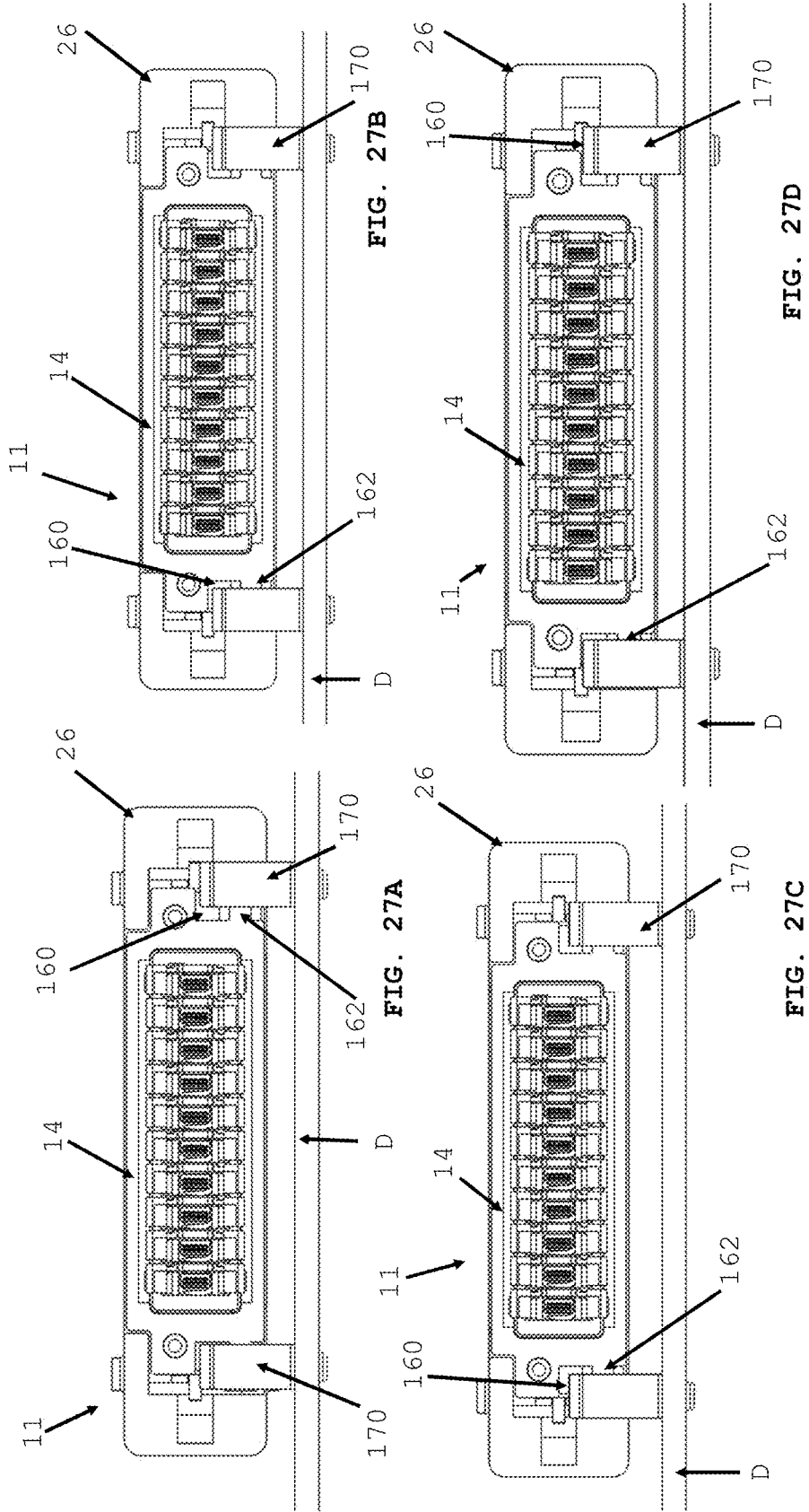

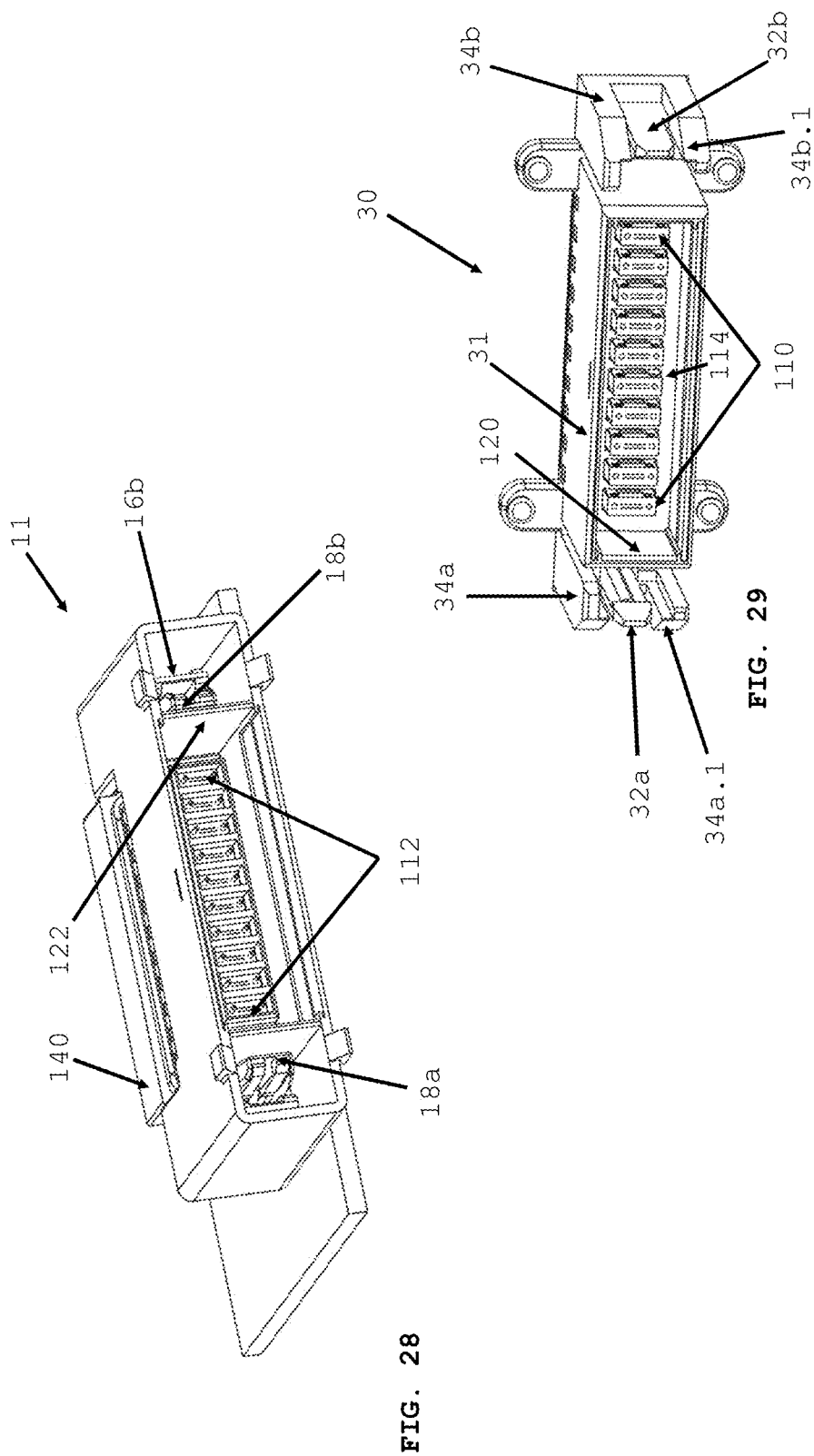

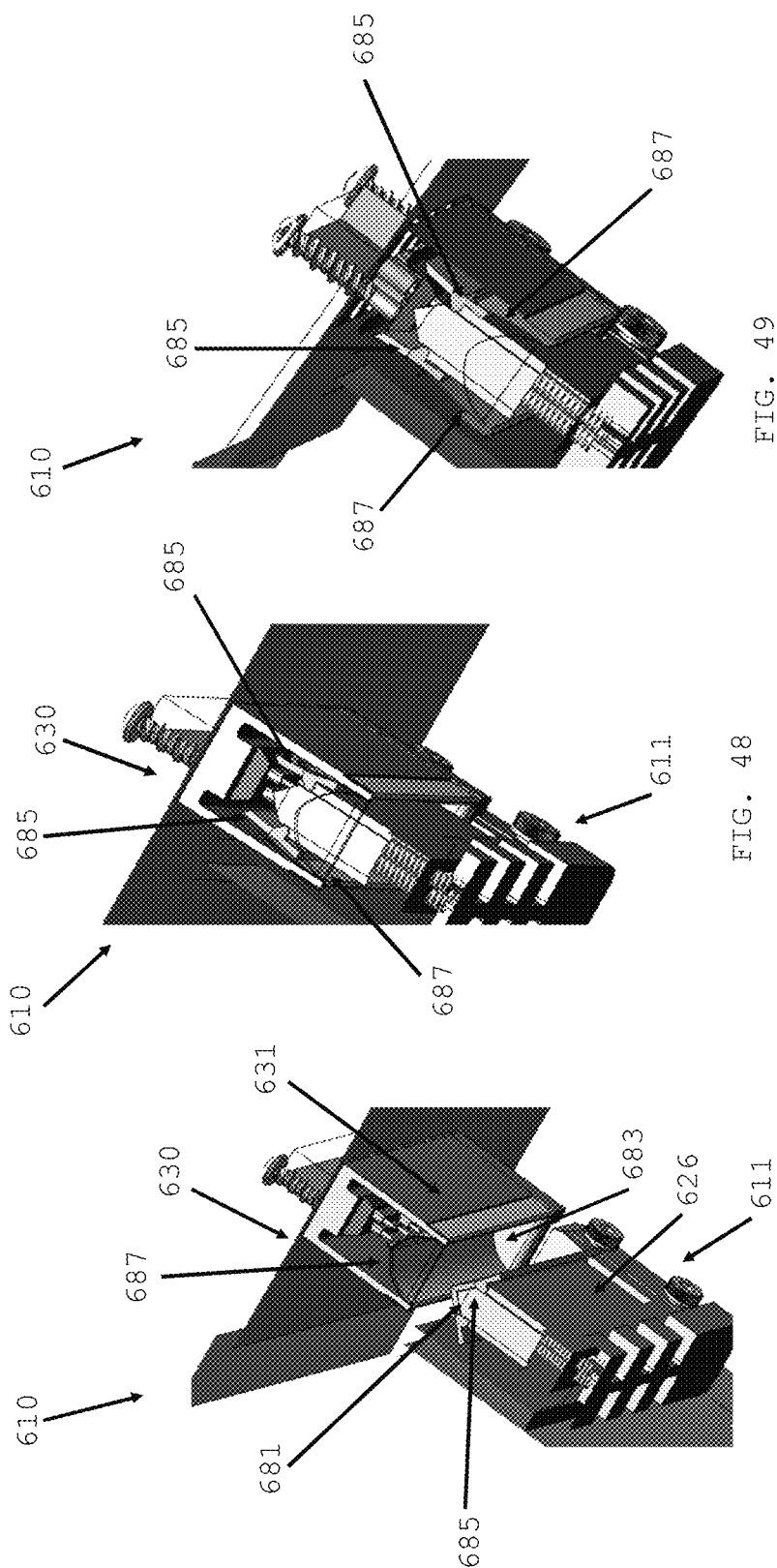

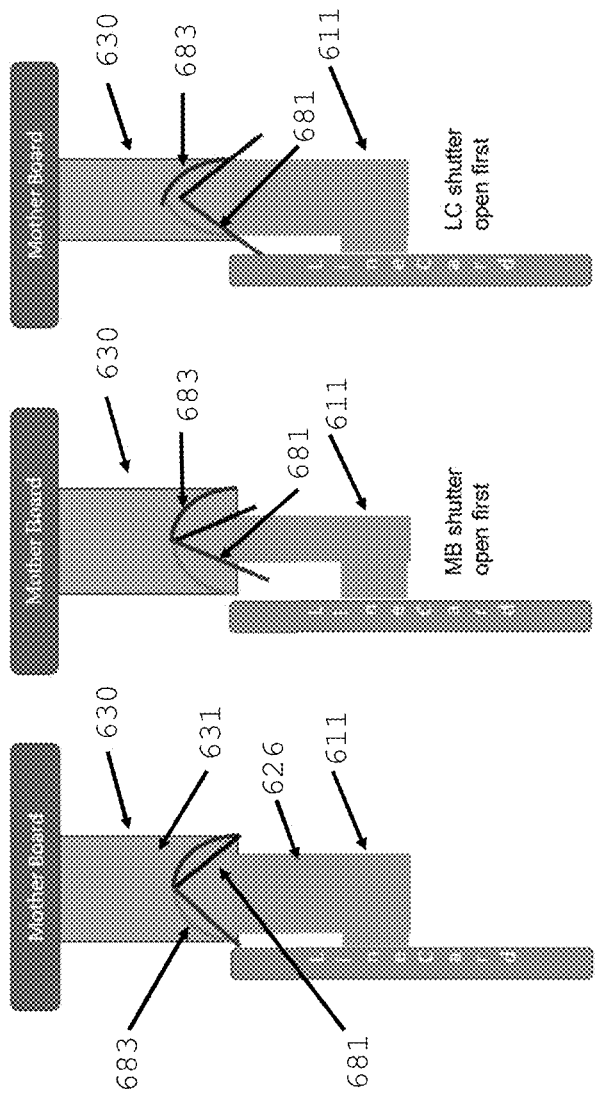

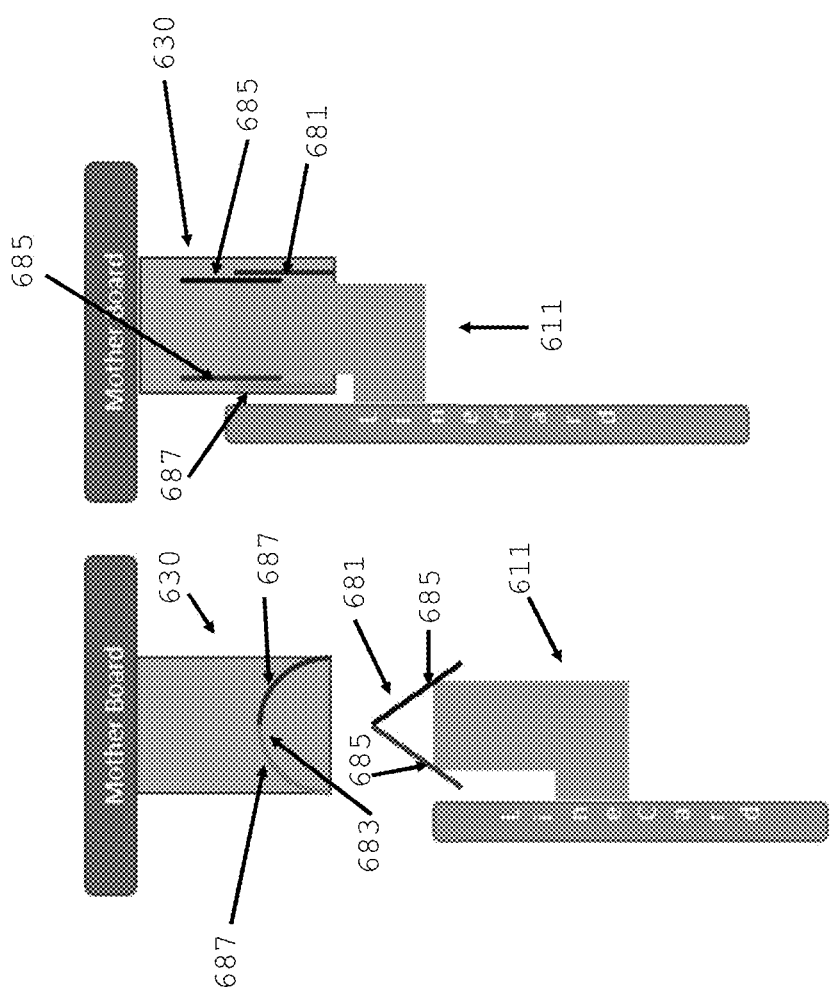

US 11,143,826 B1

OPTICAL CONNECTION SYSTEMS AND CONNECTORS THEREFOR

STATEMENT OF RELATED CASES

This application claims priority from U.S. Provisional Patent Application Nos. 62/857,038, 62/857,031, 62/857,026 and 62/856,996, all filed Jun. 4, 2019, the disclosures of each of which are incorporated herein by reference as if set forth fully herein.

FIELD

The present disclosure generally relates to optical connection systems that are suitable for connecting a daughterboard to a backplane or for connecting other similar hardware.

BACKGROUND

Optical communication networks are growing increasingly large and complex with the growing use of high-bandwidth applications by end users. Optical connectors are used within optical communication networks to interconnect optical cables to one another and to interconnect optical cables to optical devices such as receivers and switches. An optical backplane may include a printed circuit board (e.g., a "mother board") with connectors and may allow other printed circuit boards (e.g., "daughter boards" or "line cards") to be connected to it. An optical backplane may facilitate interconnection to passive or active components and may include electrical interfaces. That is, once optical signals have been converted to electrical signals in an optoelectronic component, these electrical signals may be transmitted through electrical paths in the backplane. Optical connections within optical backplanes often involve multiple-fiber interconnections with stringent insertion loss requirements.

SUMMARY

In one aspect, an optical fiber connection system for connecting a daughterboard to an optical fiber backplane comprises a first connector comprising a first connector body. The first connector body includes a ferrule housing portion configured to retain a first plurality of optical fiber ferrules and a bendable latch arm biased to a latching position and resiliently bendable from the latching position to an unlatching position. A second connector comprises a second connector body configured to be mated with the first connector body. A latching control element is slidably connected to the second connector body for movement relative to the second connector body between a first position and a second position. The second connector body includes a ferrule housing portion configured to retain a second plurality of optical fiber ferrules such that an optical connection is made between the first plurality of optical fiber ferrules and the second plurality of optical fiber ferrules when the second connector is mated with the first connector. The second connector body further comprises a substantially non-bendable latch arm. When the second connector body is mated with the first connector body, the latching control element is configured to bend the bendable latch arm to the unlatching position with the latching control element in the first position. The latching control element is configured to allow the bendable latch arm to resiliently rebound to the latching position when the latching control element is in the second position. The bendable latch arm is configured to latch with the substantially non-bendable latch arm when the bendable latch arm is in the latching position to prevent separation of the first connector from the second-board mounted connector, and the bendable latch arm is configured to unlatch from the substantially non-bendable latch arm when the bendable latch arm is in the unlatching position to allow separation of the first connector from the second connector.

In another aspect, an optical fiber connection system for connecting a daughterboard to an optical fiber backplane comprises a first connector comprising a first connector body. The first connector body includes a ferrule housing portion configured to retain a first plurality of optical fiber ferrules and a latching element. A second connector comprises a second connector body and a latching control element slidably connected to the second connector body for movement relative to the second connector body between a first position and a second position. The second connector body is configured for movement along the first connector body in a mating direction to mate the second connector body with the first connector body. The second connector body includes a ferrule housing portion configured to retain a second plurality of optical fiber ferrules such that an optical connection is made between the first plurality of optical fiber ferrules and the second plurality of optical fiber ferrules when the second connector body is mated with the first connector body. The second connector body further comprises a bendable blocking arm. The bendable blocking arm is resiliently bendable from a first position to a second position. The bendable blocking arm is configured to inhibit movement of the latching control element from the first position to the second position when the bendable blocking arm is in the first position. The first connector body is configured to bend the bendable blocking arm from the first position to the second position as the second connector body moves along the first connector body in the mating direction to mate the second connector body with the first connector body such that when the second connector body is mated with the first connector body the latching control element is movable from the first position to the second position. When the second connector body is mated with the first connector body, the latching control element is configured to enable the latching element to latch with the second connector body when the latching control element is in the second position to prevent separation of the first connector from the second connector and the latching control element is configured to unlatch the latching element from the second connector body when the latching control element is in the first position to enable separation of the first connector from the second connector.

In still another aspect, a connector for mating with a complementary connector comprises a plurality of optical fiber ferrules. A connector body includes a ferrule housing portion configured to retain the plurality of optical fiber ferrules. The connector body is configured for movement relative to the complementary connector along a longitudinal axis to mate the connector to the complementary connector whereby the plurality of optical fiber ferrules is optically connected to the complementary connector. A latching control element is slidably connected to the connector body for movement relative to the connector body along the longitudinal axis in a range of motion. The range of motion including a latching portion and an unlatching portion. The latching portion of the range of motion extends along the longitudinal axis from a first position of the latching control element relative to the connector body to a second position of the latching control element relative to the connector body that is spaced apart from the first position along the longitudinal axis. A board mount is connected to the latching control element and configured for being fixedly mounted on a circuit board. The latching control element enables the connector body to latch with the complementary connector along the entire latching portion of the range of motion such that the connector body has a range of motion along the longitudinal axis relative to the board mount at which the connector body can latch with the complementary connector.

In yet another aspect, a connector for mating with a complementary connector comprises a plurality of optical fiber ferrules. A connector body includes a ferrule housing portion configured to retain the plurality of optical fiber ferrules such that optical fiber ferrules are spaced apart along a lateral axis of connector. The connector body is configured for movement relative to the complementary connector along a longitudinal axis perpendicular to the lateral axis to mate the connector to the complementary connector whereby the plurality of optical fiber ferrules is optically connected to the complementary connector. The connector body is configured to latch with the complementary connector when mated with the complementary connector. A board mount is configured for being fixedly mounted on a circuit board. The board mount is connected to the connector body such that the connector body has a limited range of motion relative to board mount along which the connector body can be latched with the complementary connector. The limited range of motion includes a longitudinal range of motion extending from a first longitudinal end position to a second longitudinal end position spaced apart from the first longitudinal end position along the longitudinal axis, a lateral range of motion extending from a first lateral end position to a second lateral end position along the lateral axis, and a third-axis range of motion extending from a first third-axis end position to a second third-axis end position along a third axis perpendicular to the longitudinal axis and the lateral axis.

Other aspects will be in part apparent and in part pointed out hereinafter.

BRIEF DESCRIPTION OF THE DRAWINGS

FIG. 8 is a top plan view of the connection system in an operatively connected configuration and showing a collar of the daughterboard connector at a rearmost latching position;

FIG. 9A.1 is an enlarged perspective of the connection system in an operatively connected configuration and showing an upper portion of the daughterboard connector removed;

FIG. 9A.2 is an enlarged, fragmentary perspective of the connection system as the daughterboard connector is being disconnected and showing an upper portion of the daughterboard connector removed;

FIG. 11A is a perspective of a backplane connector of the connection system of FIG. 10;

FIG. 12A is a perspective of a collar of the daughterboard connector of the connection system of FIG. 10;

FIG. 12B is an enlarged section in perspective of a portion of the connection system of FIG. 10 in an operatively connected configuration;

FIG. 13A is another perspective of the daughterboard connector of the connection system of FIG. 10;

FIG. 13B is another perspective of the collar of the connection system of FIG. 10;

FIG. 21 is an enlarged perspective of a portion of the daughterboard connector of the connection system of FIG. 1;

FIG. 22 is an enlarged rear elevation of a portion of the daughterboard connector of the connection system of FIG. 1;

FIGS. 27A-27D are a series or rear elevations of the daughterboard connector of the connection system of FIG. 1, each showing a collar and the connector body at a different position relative to a daughterboard and a board mount mounted thereon;

FIG. 28 is a perspective of the daughterboard connector of the connection system of FIG. 1;

FIG. 29 is a perspective of the backplane connector of the connection system of FIG. 1;

FIGS. 47-49 are a series of cross sections of the connection system of FIG. 45 with parts removed and showing movement of the connection system from a disconnected configuration in FIG. 47, to a partially connected configuration in FIG. 48, to an operatively connected configuration in FIG. 49;

FIG. 52 is a schematic illustration of a connection system with shutters on two connectors that open simultaneously during plug-in;

FIG. 53 is a schematic illustration similar to FIG. 52 but showing a connection system in which the shutter of a backplane or motherboard connector opens before the shutter of a daughterboard or line card connector during plug-in;

FIG. 54 is a schematic illustration similar to FIG. 52 but showing a connection system in which the shutter of a backplane or motherboard connector opens after the shutter of a daughterboard or line card connector during plug-in;

FIG. 55 is a schematic illustration of shutters of a connection system in a disconnected configuration; and FIG. 56 is a schematic illustration of shutters of a connection system in an operatively connected configuration.

Corresponding parts are given corresponding reference numbers throughout the drawings.

DETAILED DESCRIPTION

Figure 1:
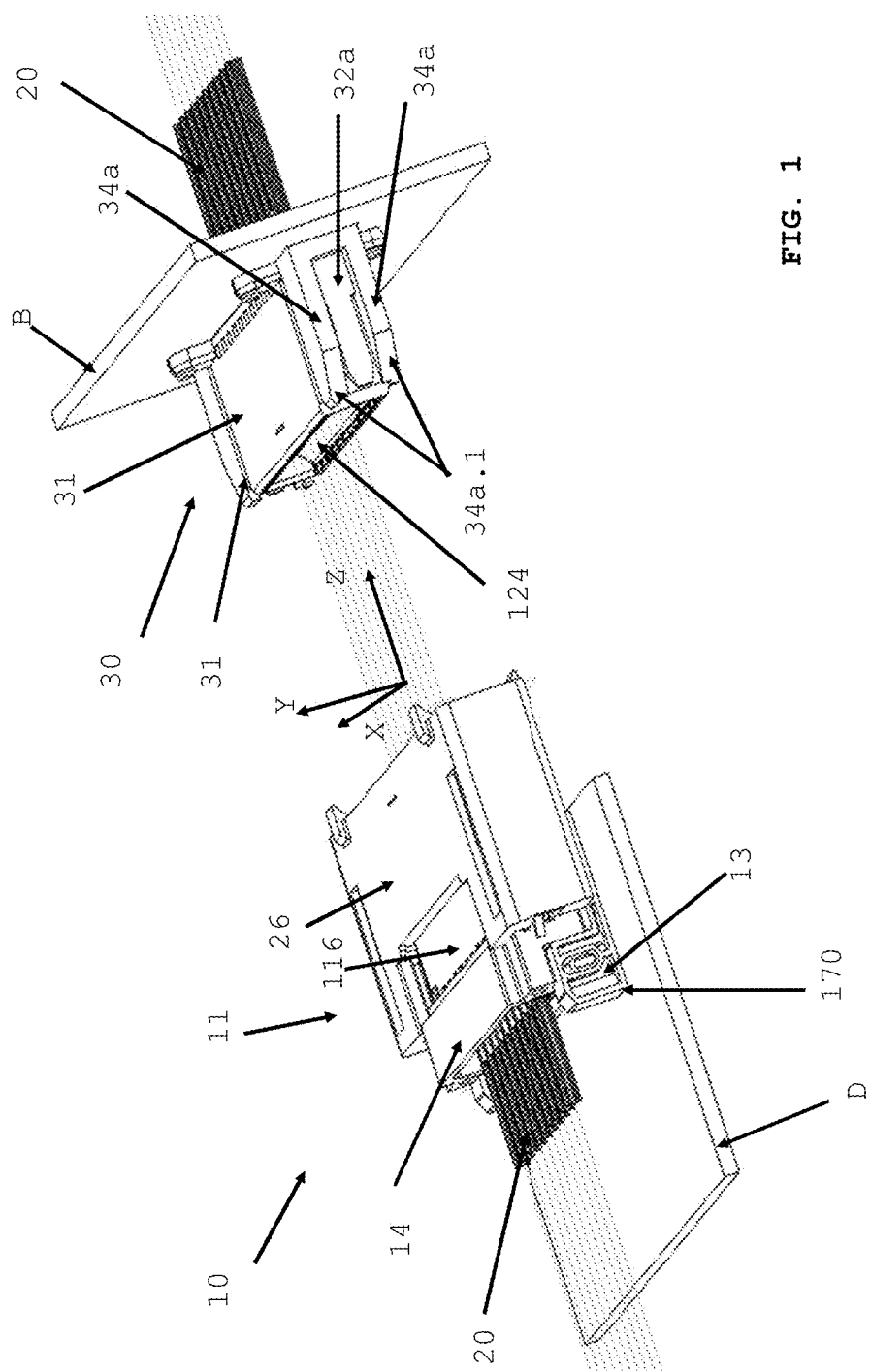
FIG. 1 is a perspective of a connection system in a disconnected configuration.
Figure 2:
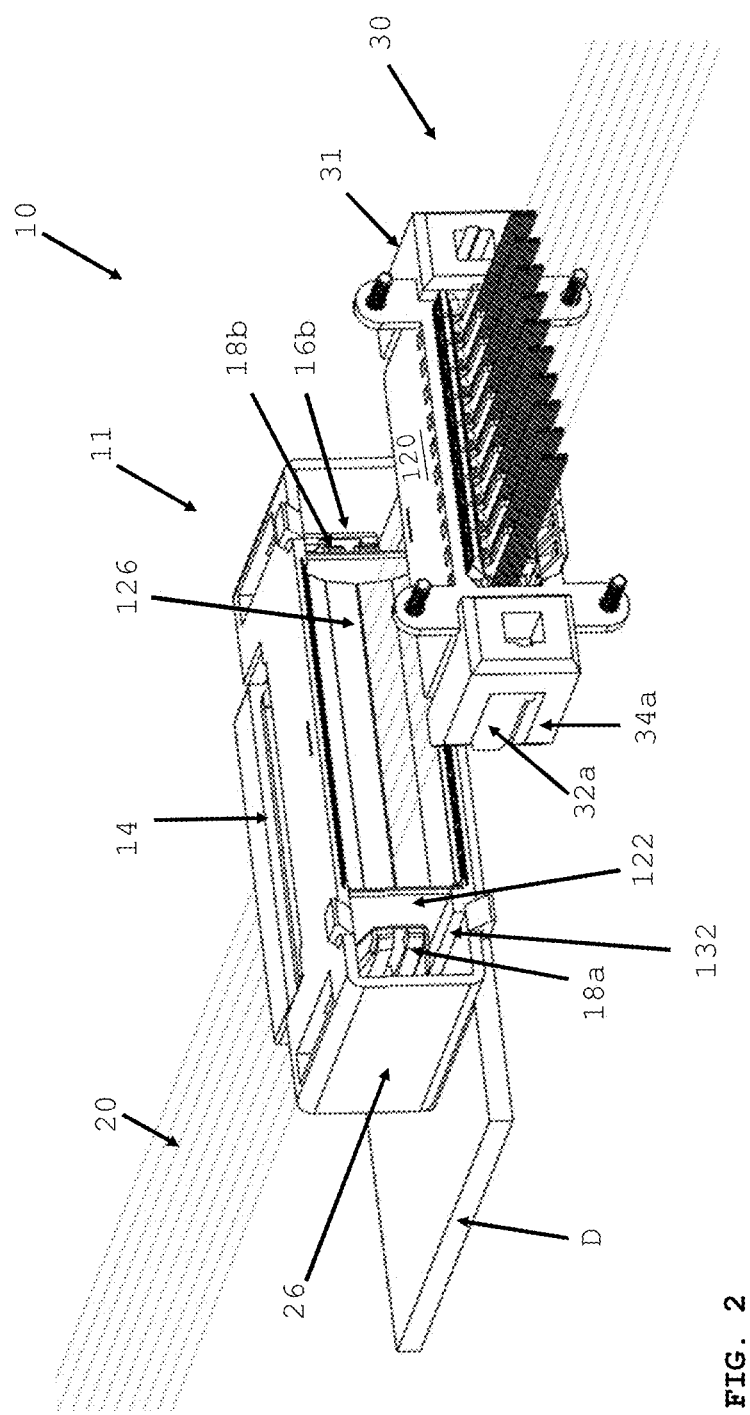
FIG. 2 is another perspective of the connection in a disconnected configuration.
Figure 3:
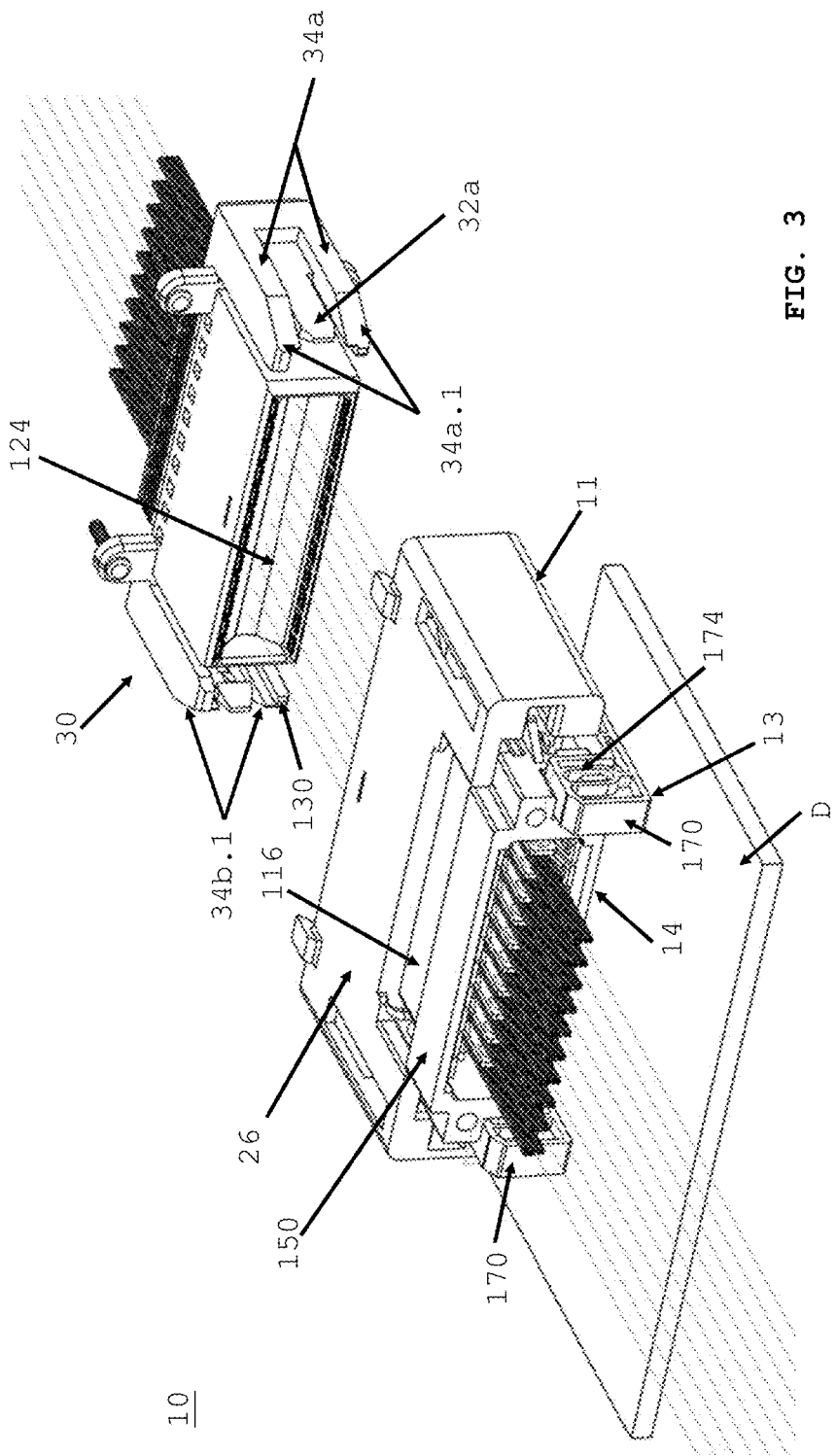
FIG. 3 is another perspective of the connection system in a disconnected configuration.

Referring now to FIGS. 1-3, an optical connection system for connecting a daughterboard D to an optical fiber backplane B is generally indicated at reference number 10. The connection system 10 broadly includes a first connector 30 and a second connector 11 configured to be optically connected to the first connector. In the illustrated embodiment, the first connector 30 is a backplane connector (which may also be referred to as a backplane adapter) and the second connector 11 is a daughterboard connector. That is, the first connector 30 is attached to a backplane B and the second connector 11 is mounted on a daughterboard D. Connecting the daughterboard connector 11 to the backplane connector 30 operatively connects the daughterboard D to the backplane B.

Figure 1A:
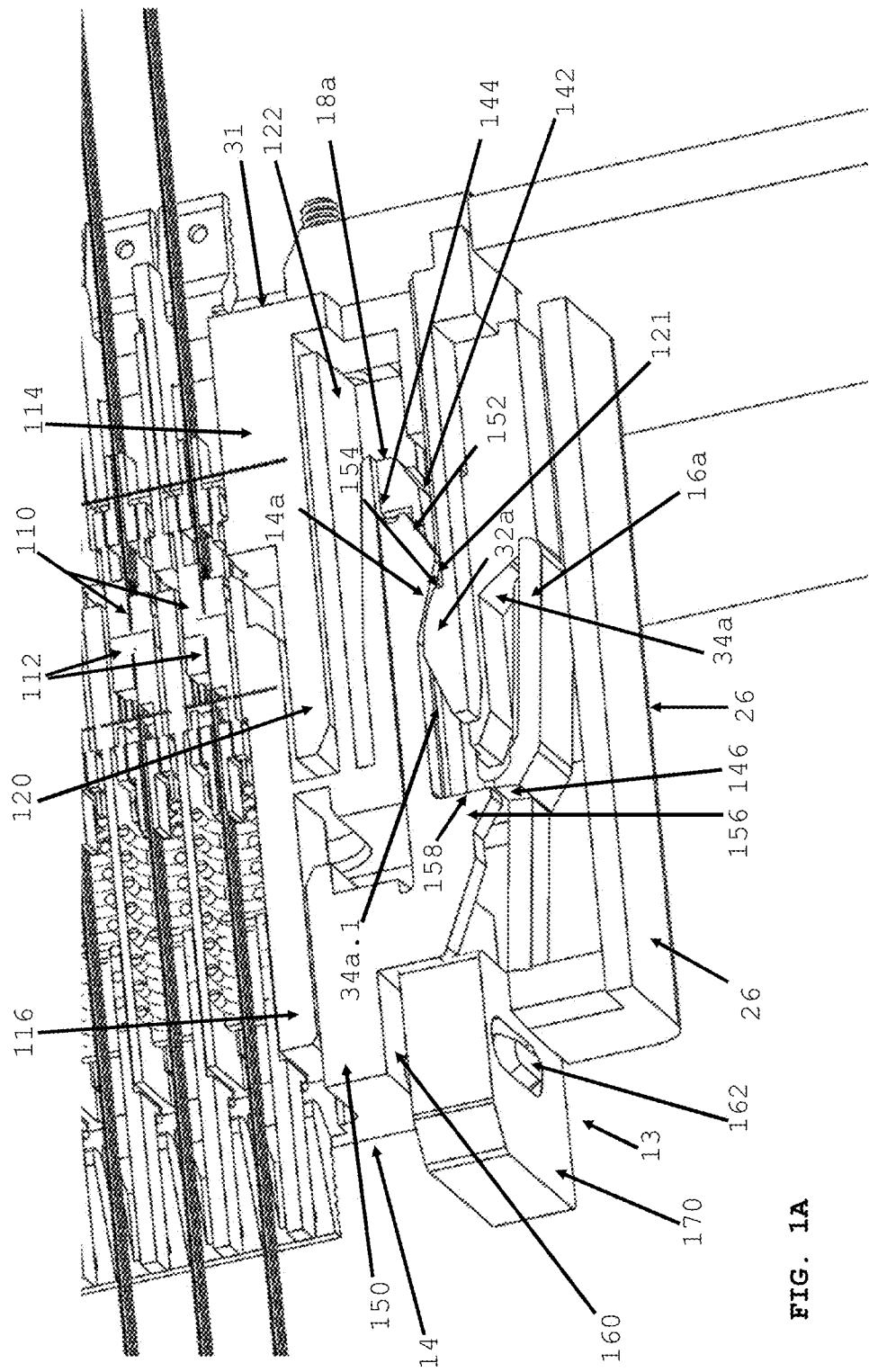
FIG. 1A is an enlarged, fragmentary, perspective section taken in a horizontal plane and of the connection system in an operatively connected configuration.

FIG. 1 includes a legend depicting X, Y, and Z axes of the connection system 10. The daughterboard D extends generally in the X-Z plane and the backplane B extends generally in the X-Y plane. Thus, in the illustrated embodiment the backplane B is substantially perpendicular to the daughterboard D. The Z axis forms a longitudinal axis along which the daughterboard connector 11 is moved relative to the backplane connector 30 to connect the connectors together. The X axis defines a lateral axis in FIG. 1. As shown, each of the connectors 11, 30 includes a plurality of optical fiber cables 20 (each containing one or more optical fibers) spaced apart along the lateral X axis. The Y axis forms a vertical axis of the optical connection system 10 in the orientation shown in these drawings, though other orientations are also possible. In one or more embodiments, the optical fiber cables 20 are multifiber cables, and the optical fibers contained therein are received in optical fiber ferrules 110, 112 (see FIG. 1A) within the respective connector 11, 30, which hold the optical fibers from each respective cable in spaced apart relationship along the vertical Y axis. As those skilled in the art will appreciate, in one or more embodiments, the backplane B can support a plurality of backplane connectors 30 at spaced apart locations along the vertical Y axis, and each of these backplane connectors can be connected to a respective daughterboard connector 11 and corresponding daughterboard D.

As shown in FIGS. 1-3, the daughterboard connector 11 generally comprises a connector body 26 (which can also be referred to as a connector housing) and a movable collar 14 (broadly, a latching control element) slidably connected to the connector body for movement with respect to the connector body along the longitudinal Z axis from a rear position (broadly, a first position) to a forward position (broadly, a second position). The daughterboard connector 11 also comprises a board mount 13 that is fixedly mounted on the daughterboard D. As will be explained in further detail below, the collar 14 is connected to the board mount 13 for movement relative to the board mount and the daughterboard in a limited range of motion along the lateral X axis and in a limited range of motion along the vertical Y axis. The backplane connector 30 comprises a connector body 31 (which can also be referred to as an adapter housing or connector housing) that is fixedly attached to the backplane B. The connector bodies 26, 31 are configured to be mated together by movement of the daughterboard connector body along the longitudinal Z axis with respect to the backplane connector body, toward the backplane B.

Figure 7A:
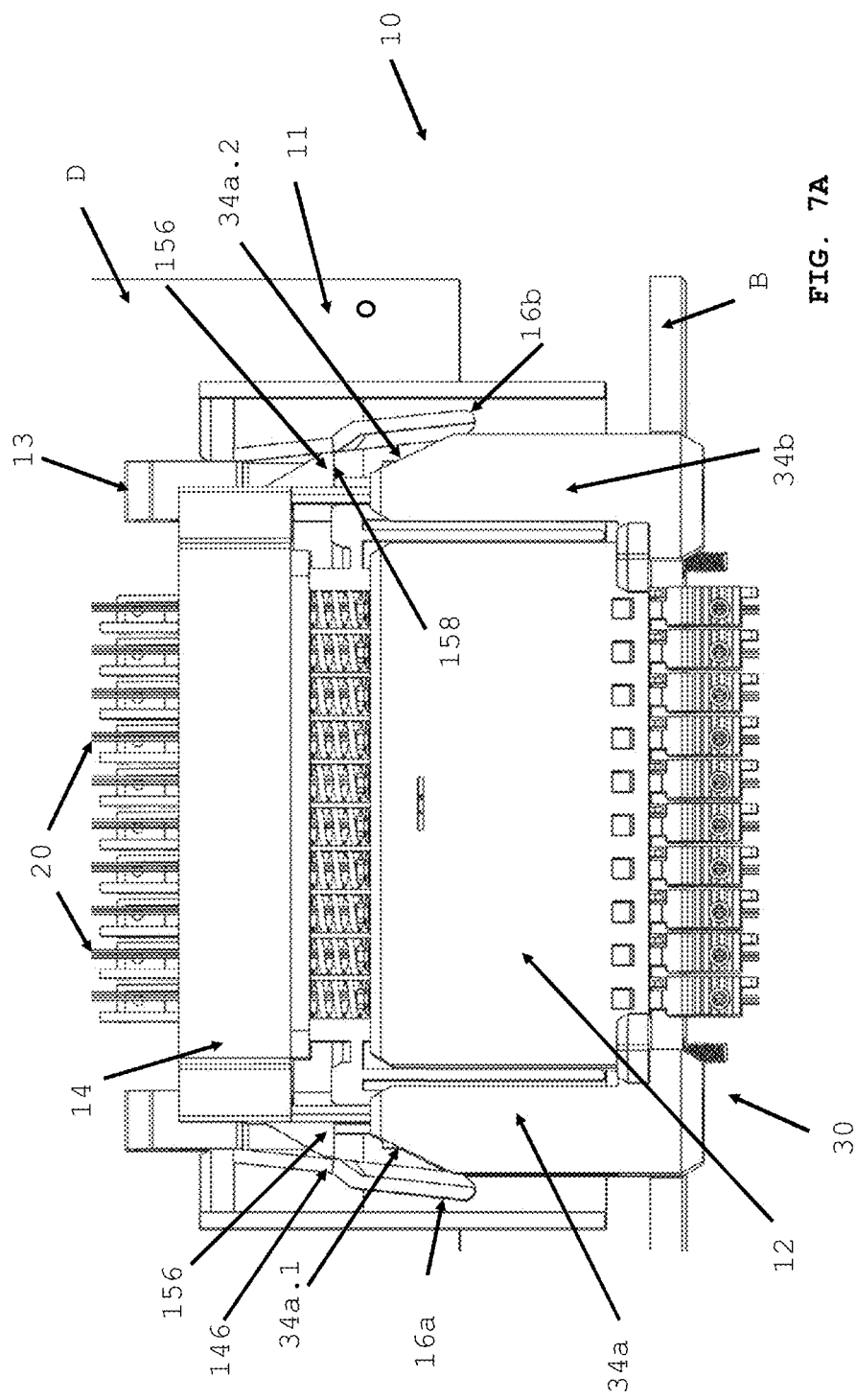
FIG. 7A is a top plan view similar to FIG. 6 showing the connection system in a mated but unlatched configuration.
Figure 7B:
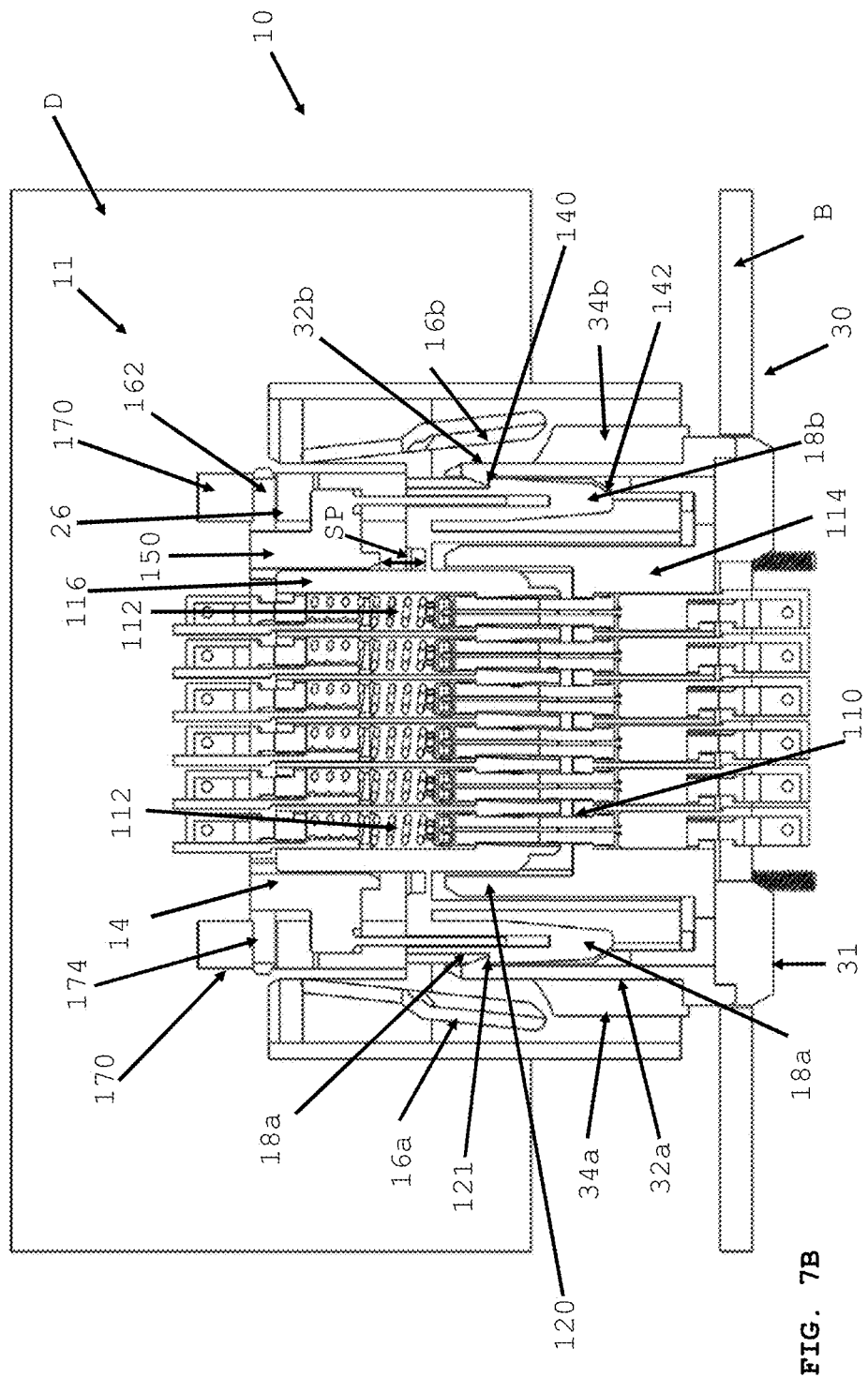
FIG. 7B is a horizontal section of the connection system in an operatively connected configuration.

Referring briefly to FIG. 7B, each of the connector bodies 26, 31 includes a ferrule housing portion 114, 116 configured to retain a plurality of ferrules 110, 112 therein. In the illustrated embodiment, the ferrule housing portion 114 of the backplane connector 30 is configured to retain a first plurality of MT ferrules 110 therein, and the ferrule housing portion 116 of the daughterboard connector 11 is configured to retain a second plurality of MT ferrules 112 therein. It is contemplated that ferrule housing portions could be configured for retaining other types of ferrules in one or more embodiments. Suitably, each ferrule housing portion 114, 116 comprises one or more retention elements configured to retain each ferrule in place in the respective ferrule housing portion. In the illustrated embodiment, the ferrule housing portion 114 of the backplane connector 30 fixedly retains the ferrules 110 so that they cannot move with respect to the connector body 31. By contrast, springs 119 bias the ferrules 112 forward in the ferrule housing portion 116 such that the ferrules on the daughterboard connector 11 can be displaced in a rearward direction along the longitudinal Z axis relative to the connector body 26 when the daughterboard connector is connected to the backplane connector 30.

Referring to FIGS. 1-3, each connector body 26, 31 further comprises a mating body portion 120, 122. As shown in FIGS. 28-29, each mating body portion 120, 122 forms a shroud in front of the respective set of ferrules 110, 112. The shrouds formed by the mating body portions 120, 122 form a barrier between the respective ferrules 120, 122 and the latching elements of the respective connector 11, 30. In other words the connector bodies 26, 31 include walls that delineate separate ferrule and latch component stalls.

In the illustrated embodiment, the mating body portion 120 of the backplane connector body 31 comprises a four-sided plug wall extending forward from the ferrule housing portion 114. The mating body portion 122 of the illustrated daughterboard connector 11 comprises a socket wall that extends circumferentially around the ferrule housing portion 116 with respect to the longitudinal Z axis such that an annular receptacle space 123 is defined between the socket wall and the ferrule housing portion as can be seen, for example, in FIG. 5. The front ends of each mating body portion 120, 122 defines an opening through which the optical fiber ferrules 110, 112 may be exposed for making an optical connection. In one or more embodiments, when the connector bodies 26, 31 are not mated together, the front openings of the ferrule housing portions 114, 116 may be covered with a displaceable shutter 124, 126 that is displaced to expose the ferrules for optical connection as the connectors are mated together.

Figure 30:
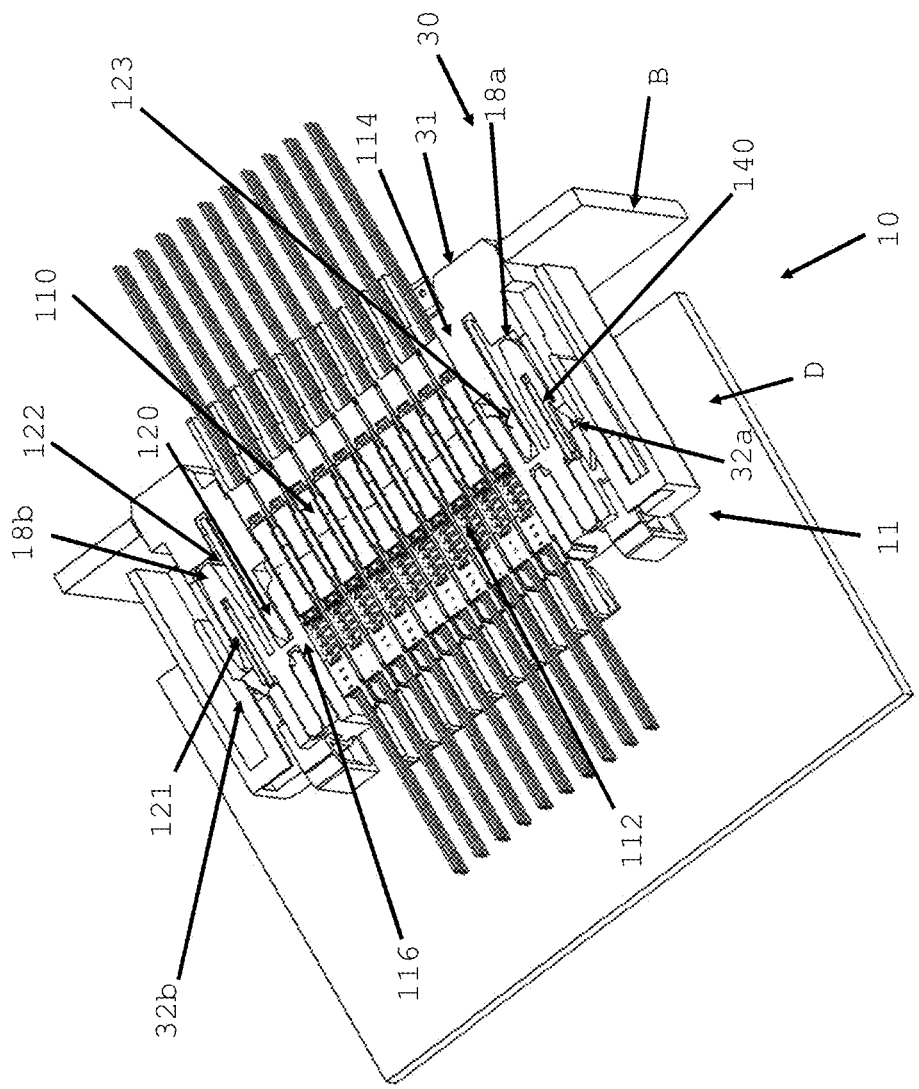
FIG. 30 is a perspective of the connection system of FIG. 1 in an operatively connected configuration with top portions removed to show internal construction.
Figure 31:
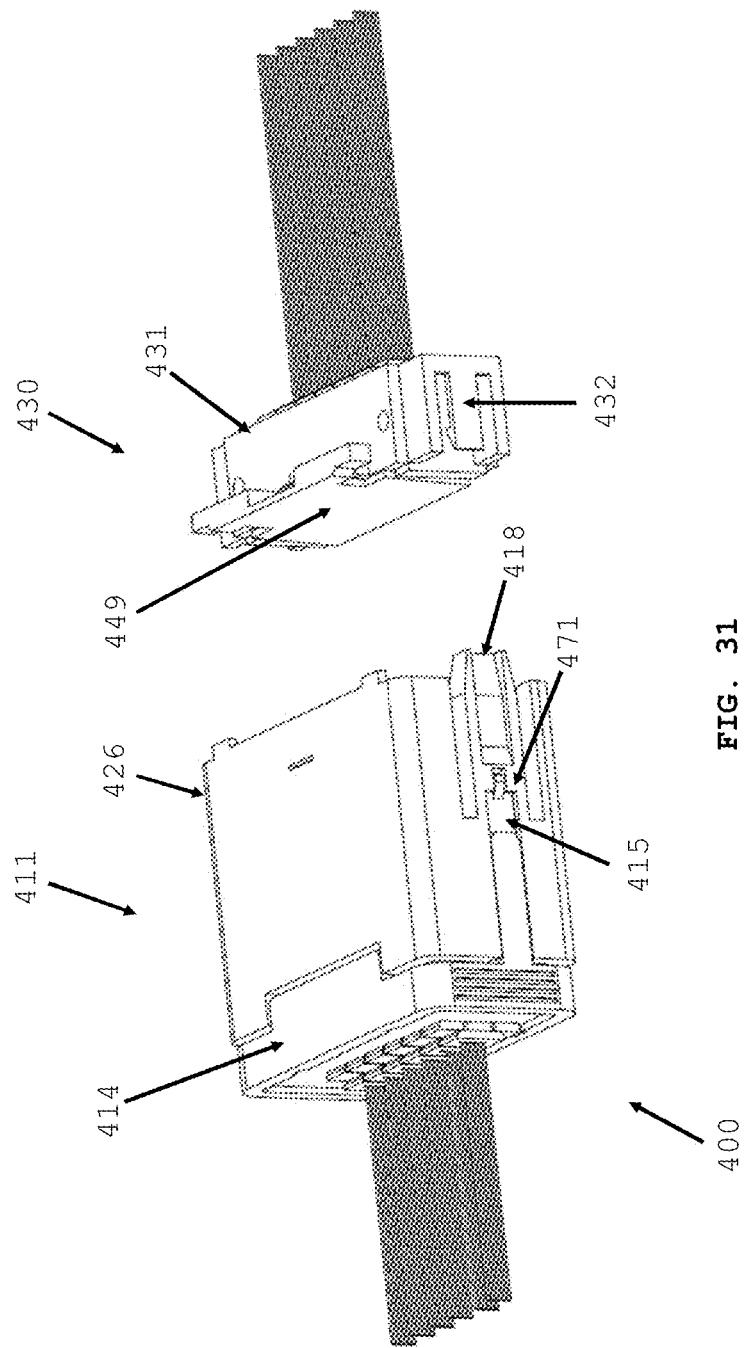
FIG. 31 is a perspective of another connection system in a disconnected configuration.

In general, one mating body portion 120 is configured to be plugged into the other mating body portion 122 to mate the daughterboard connector body 26 with the backplane connector body 31. In the illustrated embodiment, the backplane connector body 31 comprises a male or plug body portion 120 that is configured to be received in the female or socket body portion 122 of the daughterboard connector body 26. The annular receptacle space 123 is configured to receive the plug body portion 120 so that the plug body portion radially overlaps the ferrule housing portion 116 of the daughterboard connector 11 when the connector bodies 26, 31 are mated together as shown in FIG. 30.

In this disclosure, the connectors 11, 30 are mated together when the plug body portion 120 is matingly received in the socket body portion 122. However, as will be explained in further detail below, the connectors 11, 30 do not automatically complete their mechanical interconnection (e.g., latch together) upon being mated together. Instead, the illustrated connector system 10 includes a latching mechanism that is actuated for latching the connectors 11, 30 together in an action separate from positioning the connectors in mated relationship. The latching mechanism is also moved separately from the remainder of the connectors 11, 30 to unlatch the connectors. In particular, the illustrated connection system 10 facilitates latching and unlatching by movement of the collar 14 relative to the daughterboard connector body 26.

Referring to FIGS. 1-3, the backplane connector 30 includes various features that facilitate latching to and unlatching from the daughterboard connector 11 when the collar 14 is moved relative to the connector body 26. In the illustrated embodiment, the backplane connector 30 comprises a pair of bendable latch arms 32a, 32b (each, broadly, a latching element) on opposite lateral sides of the plug body portion 120. Each latch arm 32a, 32b comprises a laterally inwardly protruding latch hook surface 121 (FIG. 1A) configured to latch with a complementary latching element of the daughterboard connector body 26. As explained more fully below, each latch arm 32a, 32b (see also FIG. 29) is resiliently bendable from an inner latching position to an outer unlatching position.

In addition to the bendable latch arms 32a, 32b, the backplane connector 30 further comprises, on each lateral side of the plug body portion 120, a pair of substantially rigid (substantially non-bendable) deflector arms 34a, 34b above and below the respective latch arm 32a, 32b. Each deflector arm 34a, 34b comprises a laterally outward facing ramp surface 34a.1, 34b.1 that slants laterally outward as it extends in the rearward longitudinal direction from the front end portion of the deflector arm. As explained below the ramp surfaces 34a.1, 34b.1 are configured deflect portions of the daughterboard connector body 26 laterally outward as the daughterboard connector body is mated with the backplane connector body 31. In the illustrated embodiment, the lower portion of each pair of deflector arms 34a, 34b comprises an alignment key 130 (FIG. 3) that will interfere with a corresponding alignment key 132 formed on the daughterboard connector body 26 to prevent mating of the connector bodies in an inverted orientation.

Figure 4:
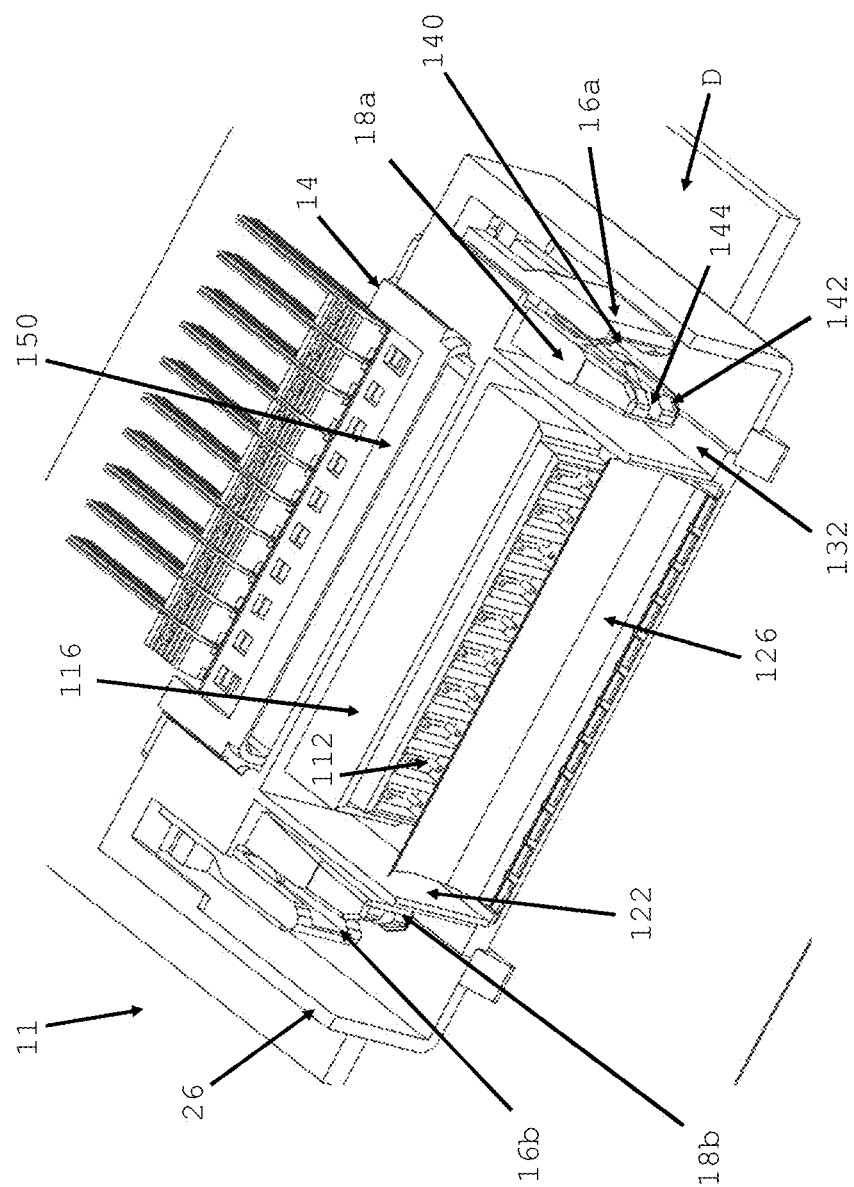
FIG. 4 is a perspective of a daughterboard connector of the connection system with a top portion of a connector body thereof removed to illustrated interior features.
Figure 5:
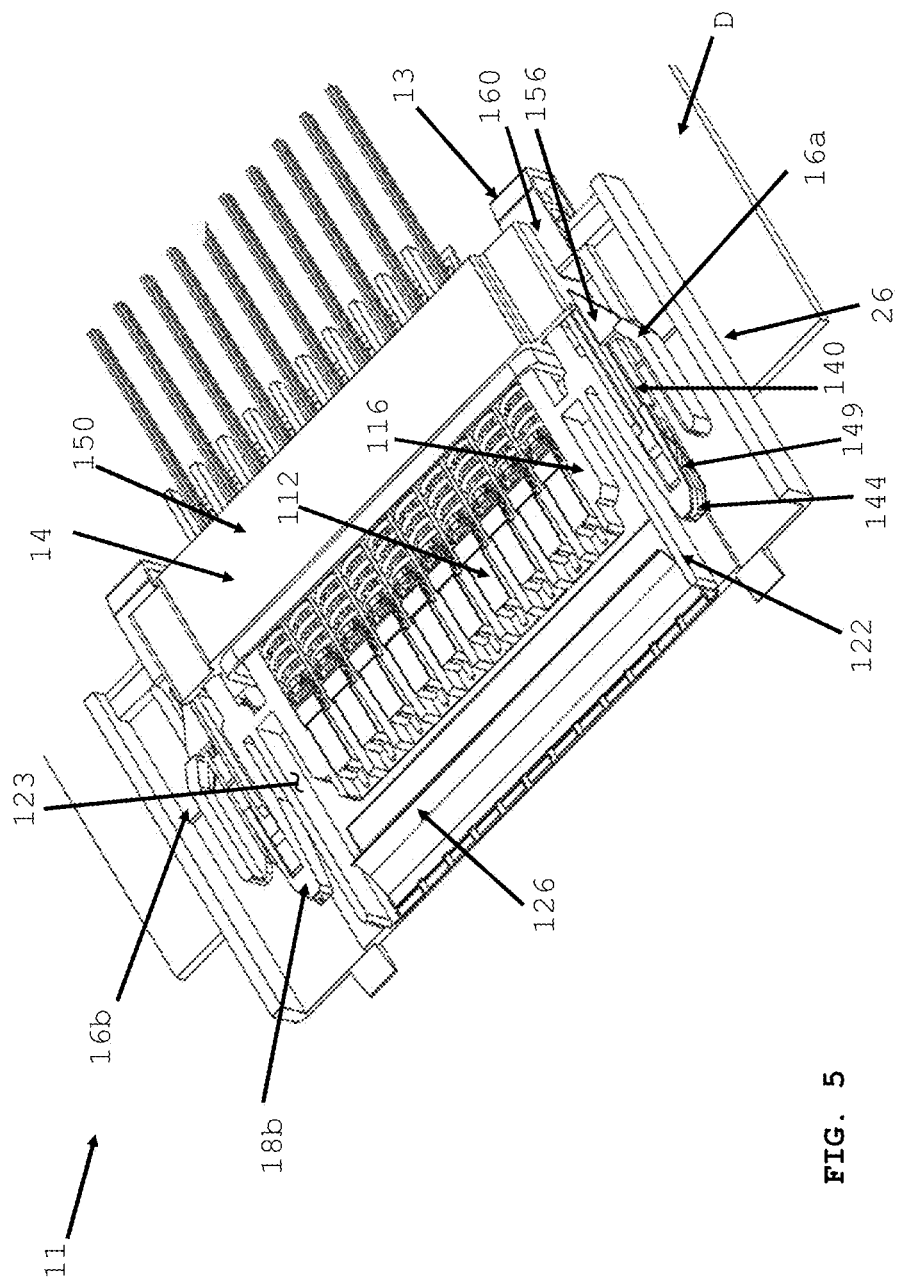
FIG. 5 is another perspective of the daughterboard connector with a top portion of the connector body thereof removed to illustrated interior features.
Figure 6:
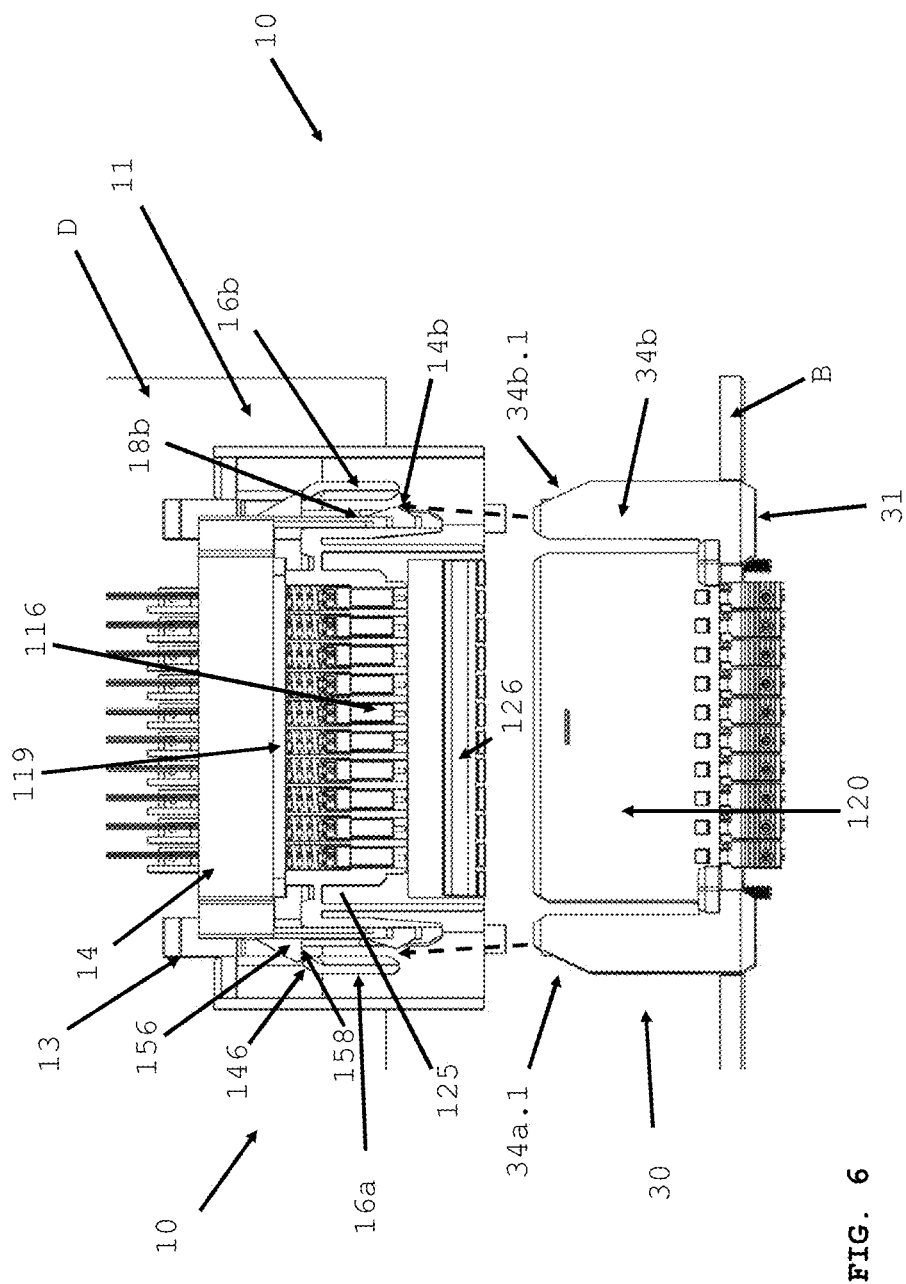
FIG. 6 is a top plan view of the connection system in a disconnected configuration and with a top portion of the daughterboard connector removed.

Referring to FIGS. 4-6, the daughterboard connector body 26 comprises a pair of rigid (substantially non-bendable) latch arms 18a, 18b (each, broadly, a latching element) on opposite sides of the socket body portion 122. Each latch arm 18a, 18b comprises a laterally outwardly protruding, rearward facing latch hook surface 140 that is configured to latch with the hook surface 121 of the back plane connector body 31. Additionally, the front end portion of each latch arm 18a, 18b comprises a wedge surface. that is configured to engage the front end portion of the corresponding bendable latch arm 18a, 18b and bend the bendable latch arm laterally outward as the plug body portion 120 is inserted or plugged into the socket body portion 122 to mate the connector bodies 26, 31. Still further each rigid latch arm 18a, 18b comprises a longitudinal groove 144 which forms a track for guiding longitudinal movement of the collar 14 with respect to the daughterboard connector body 26.

The illustrated daughterboard connector body 26 further comprises a pair of bendable blocking arms 16a, 16b, spaced apart laterally outboard of the rigid latch arms 18a, 18b. Generally, the blocking arms 16a, 16 be are resiliently bendable laterally outward from a first inner position to a second outer position. The first inner position may be referred to as a blocking position of the blocking arm 16a, 16b, while the second outer position may be referred to as a release position. Each of the blocking arms 16a, 16b comprises a rearward facing blocking surface 146 that is configured to block forward movement of the collar 14 with respect to the daughterboard connector body 26 when the daughterboard connector body is not mated with the backplane connector body 31. Front end portions of the blocking arms 16a, 16b are configured to slide against the ramp surfaces 34a.1, 34b.1 as the daughterboard connector body 26 is mated with the backplane connector body 31. The ramp surfaces 34a.1, 34b.1 are configured to deflect the blocking arms 16a, 16b laterally outwardly as the connector bodies 26, 31 are mated together, whereby the blocking surfaces 146 are displaced to release the collar 14 for movement relative to the daughterboard connector body 26.

Figure 9:
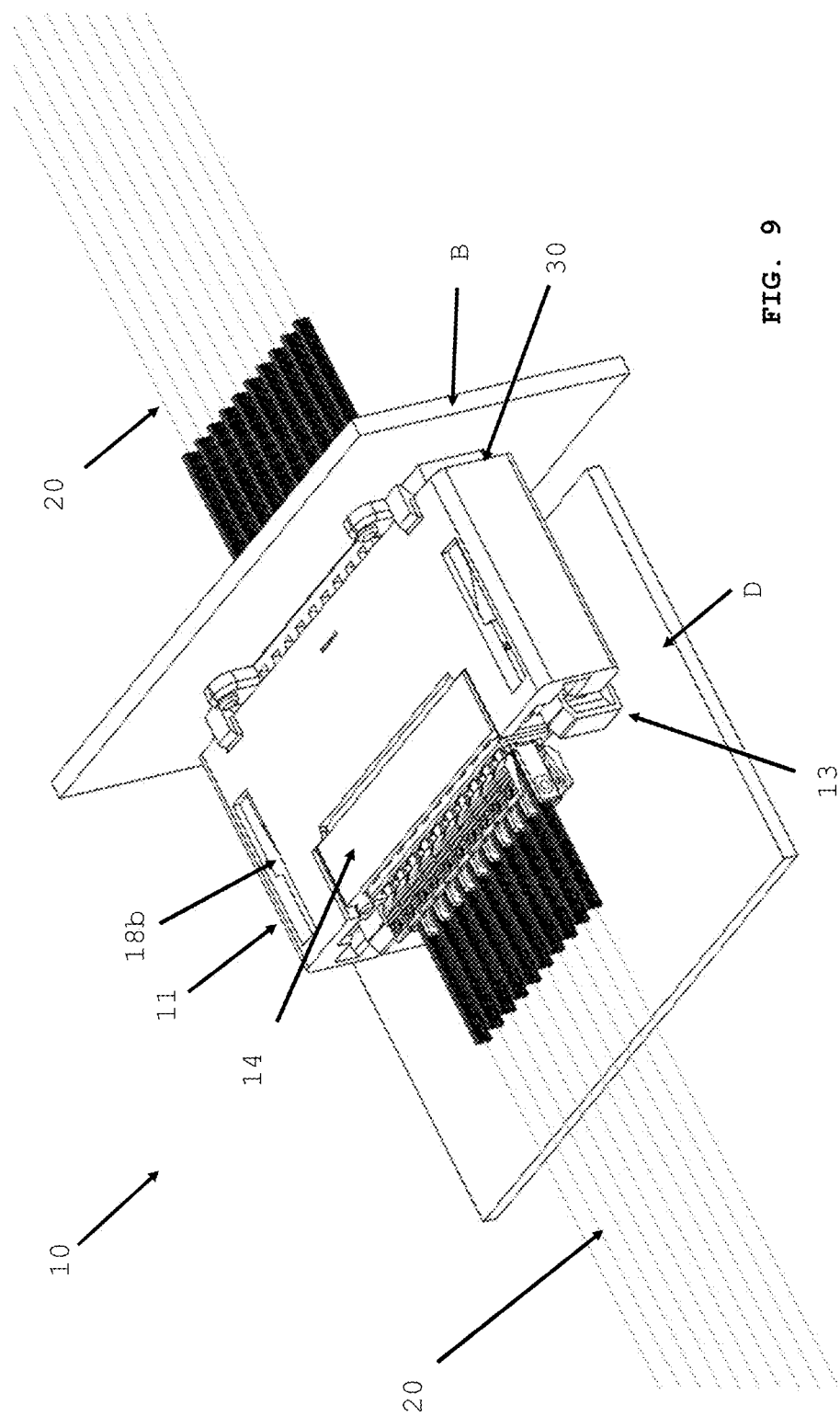
FIG. 9 is a perspective of the connection system in an operatively connected configuration.
Figure 9A:
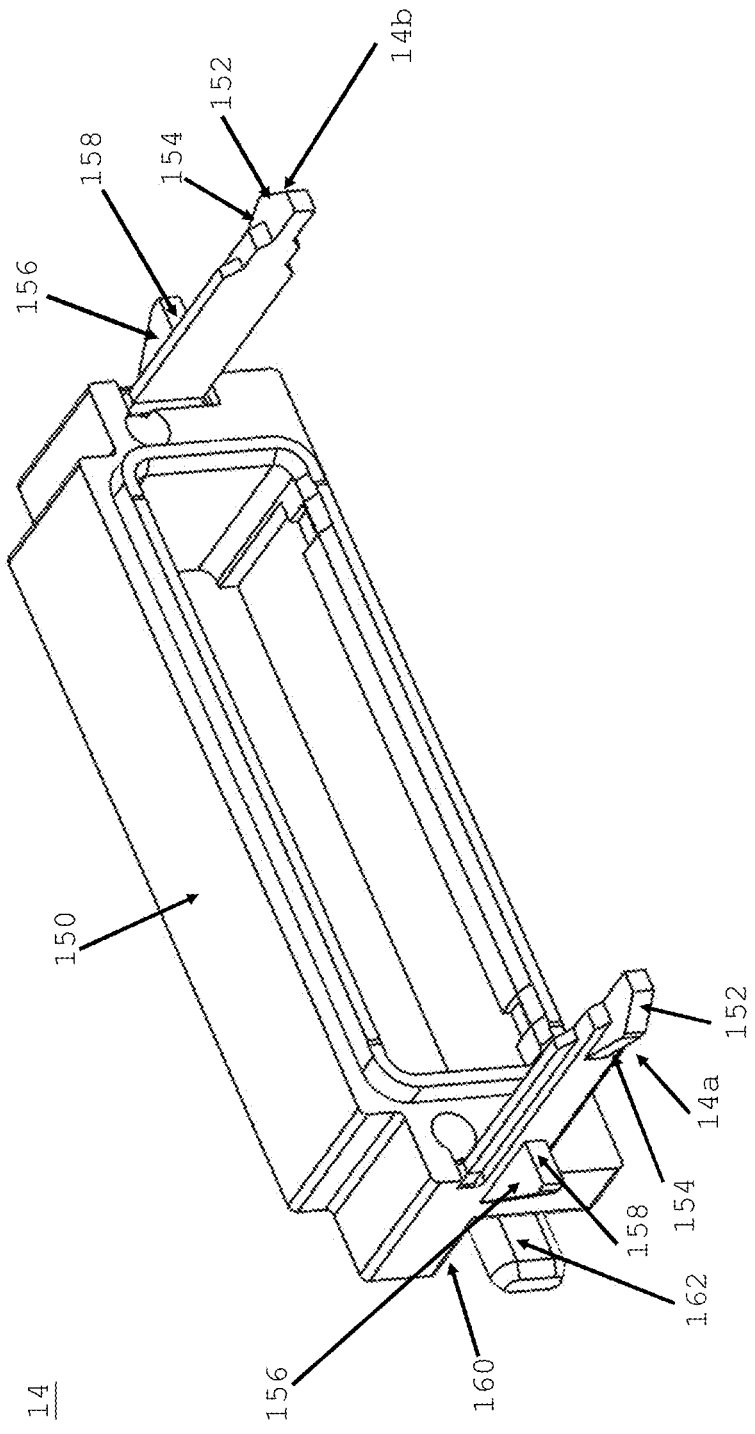
FIG. 9A is a fragmentary perspective of the collar of the daughterboard connector.
Figure 10:
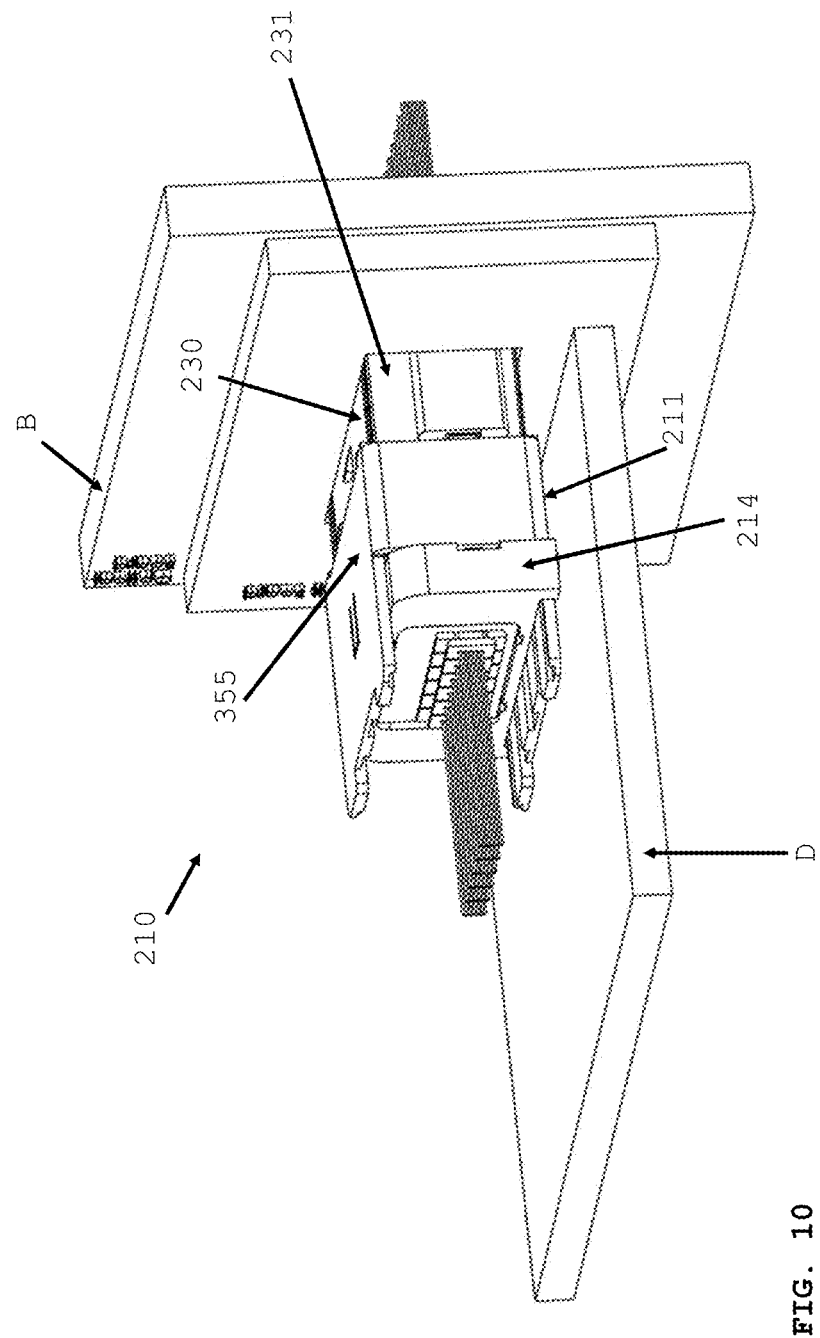
FIG. 10 is a perspective of another connection system in an operatively connected configuration.

Referring to FIG. 9A, the collar 14 comprises a collar body 150 and first and second latch control arms 14a, 14b on opposite sides of the collar body. The collar body 150 defines an opening configured to receive the rear end section of the daughterboard ferrule housing portion 116 so that the collar body can slide longitudinally along the connector body 26 along a longitudinal range of motion. The latch control arms 14a, 14b are configured to be slidably received in the longitudinal grooves 144 of the rigid latch arms 18a, 18b for sliding along grooves the as the collar 14 moves through a range of motion (discussed below).

The front end portion of each latch control arm 14a, 14b is enlarged in relation to the remainder of the arm. The illustrated enlarged from arm portions define front and rear ramp surfaces 152, 154 configured for deflecting the bendable latch arms 32a, 32b of the backplane connector body 31. The front ramp surface 152 slopes laterally outward as it extends longitudinally rearward from the front tip of the respective latch control arm 14a, 14b, and the rear ramp surface 154 slopes laterally inward as it extends rearward from the front ramp surface. The latch control arms 14a, 14b are configured so that, along a front portion of the range of motion of the collar 14, the front ramp surfaces 152, 154 engage the bendable latch arms 32a, 32b of the backplane connector body 31 and bend the latch arms laterally outward to respective unlatching positions where they are disengaged from the rigid latch arms 18a, 18b of the daughterboard connector 11.

Each of the illustrated latch control arms 14a, 14b further comprises a stop tab 156 that is configured to engage the respective blocking arm 16a, 16b of the connector body 26 to prevent forward movement of the collar 14 in certain circumstances. In particular, each stop tab 156 projects laterally outward and defines a forward facing stop surface 158 configured to engage the rearward facing blocking surface 146 of the respective bendable blocking arm 16a, 16b when the blocking arm is not deflected outward by the respective deflector arm 34a, 34b.

Referring to FIGS. 6-9 and 9A.1-9A.2, the actions of connecting and disconnecting the connectors 11, 30 will now be briefly described. As shown in FIG. 6, to mate the daughterboard connector 11 with the backplane connector 30, the daughterboard connector is moved along the longitudinal Z axis in an insertion direction relative to the backplane connector. This causes the plug body portion 120 to mate with the socket body portion 122 and optically aligns the first and second sets of optical fiber ferrules 110, 112.

Before the connector bodies 26, 31 are mated together, as shown in FIG. 6, the blocking tabs are in the laterally inward, non-deflected positions. As a result, the blocking arms 16a, 16b interfere with the stop tabs 156 to prevent forward movement of the collar 14 to the front portion of its range of motion. That is, the blocking arms 16a, 16b limit the collar 14 to the rear portion of its longitudinal range of motion. As shown in FIG. 6, along the rear portion of the collar range of motion the ramp portions 152, 154 overlap the latch hook surfaces 140 of the rigid latch arms 18, 18b. In this position, the ramp portions 152, 154 will deflect the bendable latch arms 32a, 23b laterally outward to unlatching positions. Thus, the rear end portion of the range of motion—the portion of the range of motion to which the collar is constrained when the blocking arms 16a, 16b are in the inward undeflected positions—may be referred to as the unlatching portion of the range of motion.

As the plug body portion 120 passes into the socket body portion 122, the front end portions of the blocking arms 16a, 16b slide against the ramp surfaces 34a.1, 34b.1 of the deflector arms 34a, 34b, causing the blocking arms to deflect laterally outward to their outwardly deflected positions. When the blocking arms 16a, 16b are in the outwardly deflected positions, the stop tabs 156 of the collar 14 can move forward past the blocking surfaces 146.

After the plug body portion 120 is mated with the socket body portion 122, forward movement of the collar 14 latches the connectors bodies 26, 31 together. As shown in FIG. 7B, when the collar 14 travels to the forward portion of its range of motion, the ramp portions 152, 154 move longitudinally past the bendable latch arms 32a, 32b, which allows the bendable latch arms to resiliently rebound to their inward latching positions. In the latching positions, the hook surfaces 121 of the bendable latch arms 32a, 32b latch with the hook surfaces 140 of the rigid latch arms 18a, 18b to prevent the daughterboard connector body 26 from being pulled out of or unmated from the backplane connector body 31. To separate the connector bodies 26, 31 after the latch is established, the bendable latch arms 32a, 32b must be deflected laterally outward to the undeflected position.

FIGS. 7B and 8 depicts the collar 14 at a rearmost position at which latch control arms 14a, 14b permit the bendable latch arms 32a, 32b to rebound to their inward latching positions. The collar 14 has clearance, indicated by the clearance span SP, to travel further forward until the collar body 159 abuts the rear end of the connector body 26. At every location of the collar 14 between the position shown in FIGS. 7B and 8 and the forward-most position at which the collar body 150 engages the rear end of the connector body 26, the latch control arms 14a, 14b are clear of the bendable latch arms 32a, 32b so that the bendable latch arms are latched with the rigid latch arms 18a, 18b. Thus, the forward portion of the range of motion of the collar 14 is a latching portion along which the collar can move while the latch arms 18a, 18b, 32a, 32b remain latched together. FIG. 9 shows the collar 14 in its forward-most position which marks the forward end of the latching portion of the range of motion. As will be explained in further detail below, providing the latch control collar 14 with a latching range of motion enables the daughterboard connector 11 to be operatively connected to the backplane connector 30 at a range of positions of the daughterboard connector body 26 along the longitudinal Z axis relative to the daughterboard D.

Referring to FIGS. 9A.1 and 9A.2, to unlatch the daughterboard connector 11 from the backplane connector 30, the user pulls the collar 14 in the rearward direction. The latch control arms 14a, 14b slide rearward along the grooves 144 until the rear ramp portion 154 engages the bendable latch arm and deflects it laterally outward to its unlatching position. This causes the latch hook surface 121 to disengage from the hook surfaces 140. Thus, continuing to pull rearward on the collar 14 will cause the daughterboard connector body 26 to separate from the backplane connector body 30.

Referring to FIGS. 9 and 21-27D, the disclosure now turns to the way in which the daughterboard connector 11 is mounted on the daughterboard D. In one or more embodiments, the board mount 13 facilitates an operative connection with the backplane connector 30 at a range of positions of the daughterboard connector body 26 relative to the daughterboard D. As explained more fully below, the illustrated daughterboard connector body 30 is able to (i) move relative to the daughterboard D along the longitudinal Z axis in a limited range of motion, (ii) move relative to the daughterboard along the lateral X axis in a limited range of motion, and (iii) move relative to the daughterboard along the vertical Y axis in a limited range of motion, all while the daughterboard connector 11 is operatively connected to the backplane connector 30.

The rear end portion of the collar body 150 comprises a lower recess 160 on each opposing lateral sides of the collar body. A mounting post 162 projects laterally outward from the laterally outward facing side of each recess 160. The mounting posts 162 are configured to be moveably received in the board mount 13, whereby the collar 14 is mounted on the daughterboard D but is still permitted to move or float with respect to the board mount 13 in a limited range of motion along the vertical Y axis and the lateral X axis. The mounting posts 162, however, constrain the collar body 150 from moving relative to the board mount along the longitudinal Z axis. But as explained above, the latching mechanism of the connection system 10 provides the collar 14 with a latching range of motion with respect to the connector body 26. This enables connector body 26 to move or float in a limited range of motion along the longitudinal Z axis relative to the daughterboard D while the collar 14 and the board mount 13 mount the connector body on the daughterboard.

Figure 23:
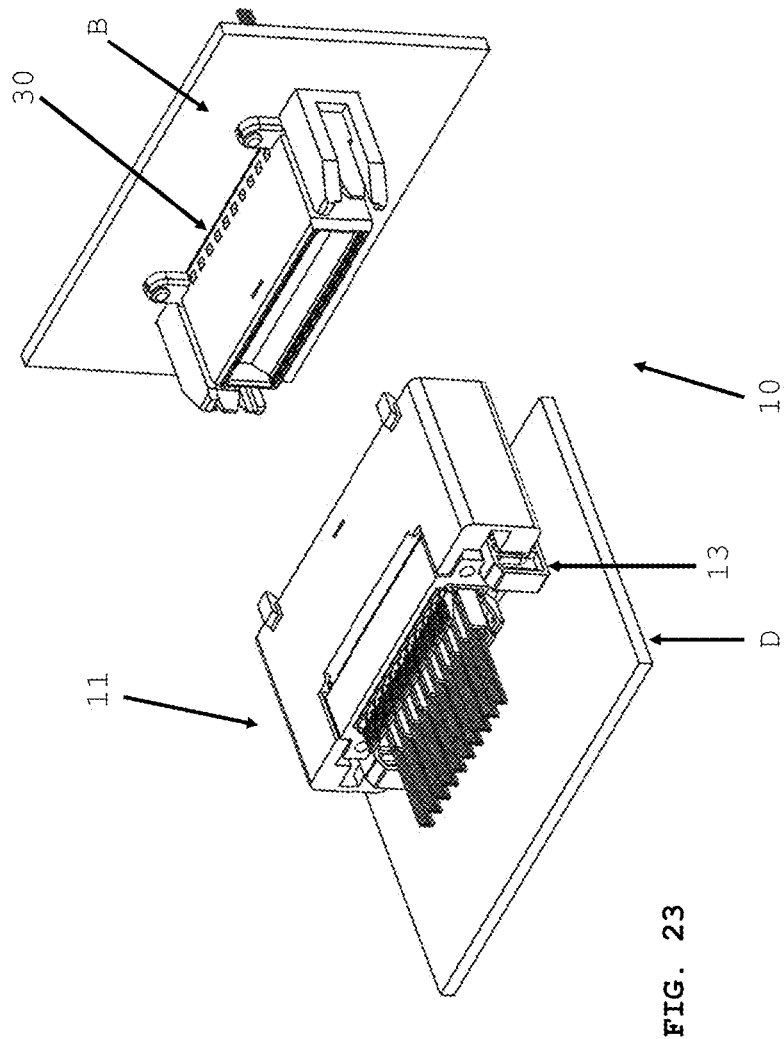
FIG. 23 is a perspective of the connection system of FIG. 1 in a disconnected configuration.
Figure 26:
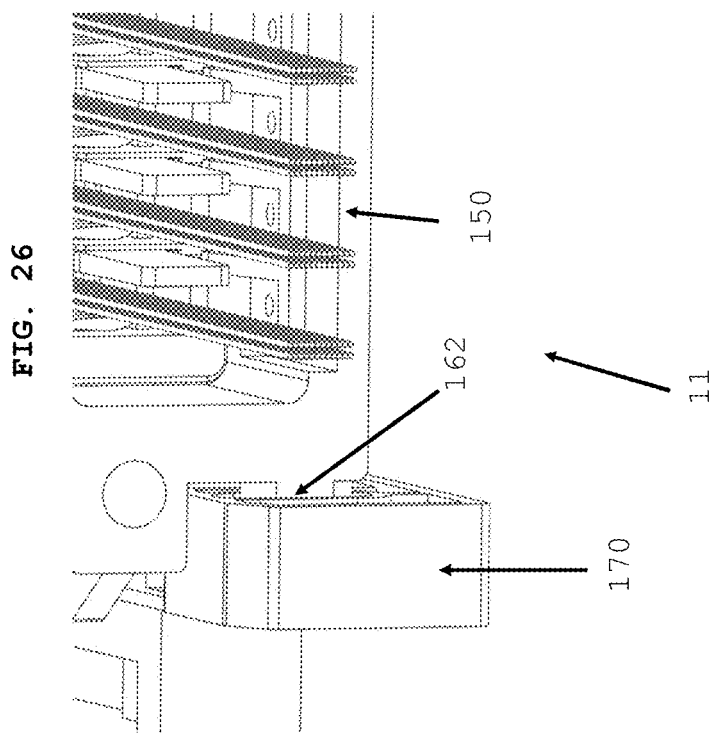
FIG. 26 is an enlarged perspective of a portion of the daughterboard connector of the connection system of FIG. 1.
Figure 25:
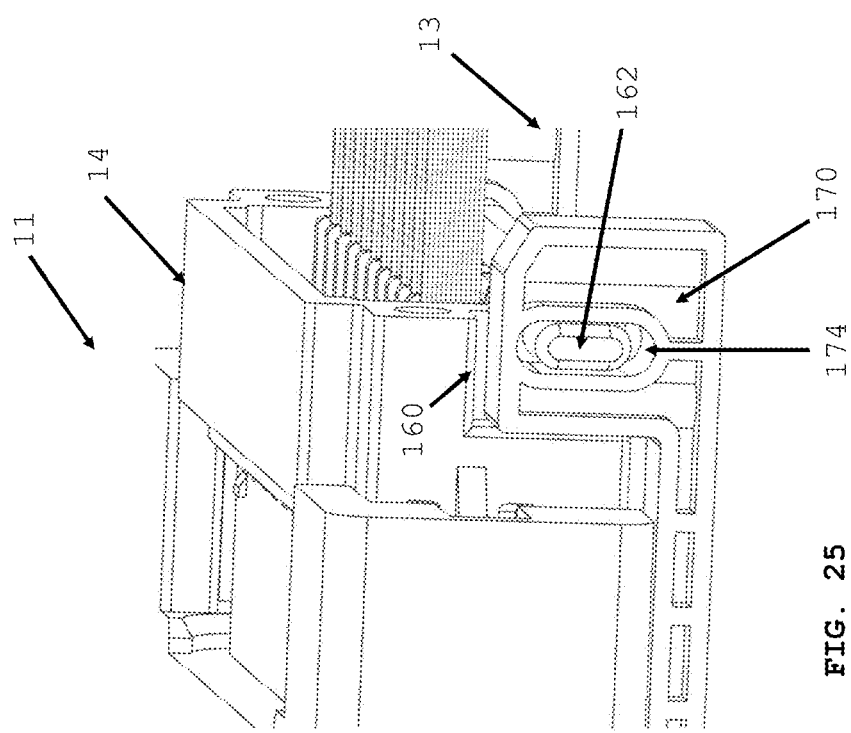
FIG. 25 is an enlarged perspective of a portion of the daughterboard connector of the connection system of FIG. 1.

Referring to FIG. 23, the board mount 13 comprises first and second leg pieces 170 that are fixedly mounted on (e.g., screwed to) the daughterboard D at spaced apart locations along the lateral X axis. The leg pieces 170 are arranged generally in the lower recesses 160 of the collar 14, in a lateral space between the collar and lower corner portions 172 (FIG. 22) of the daughterboard connector body 26. Each leg piece 170 comprises a vertically elongate slot configured to slidably receive a respective one of the mounting posts 162 therein. Each slot 174 has a height that is greater than the height of the mounting post 162 such that the mounting post can travel vertically along the Y axis in a limited range of motion. The vertical range of motion is constrained by the upper and lower ends of the slot 174.

Referring to FIGS. 27A and 27B, a gap extends along the lateral X axis between the legs 170. The gap has a width along the X axis that is greater than the span along the X axis between the laterally outward facing faces defining the recesses 60. As a result, the mounting collar 14, and the connector body 26 along with it, can move within a limited range of motion along the lateral X axis relative to the board mount 13 and the daughterboard D. The range of motion of the connector body 26 and the mounting collar 14 relative to the board mount 13 is depicted in FIGS. 27A-27B.

Referring to FIGS. 10-16, another embodiment of a backplane connection system, is generally indicated at reference number 210. The backplane connection system 210 is similar in certain respects to the backplane connection system 10. Where parts of the backplane system 210 correspond in function and name to the parts of the backplane system 10, the same reference number is used, plus 200. The connection system 210 comprises a daughterboard connector 211 and a backplane connector 230, each comprising a respective connector body 226, 231 with a ferrule housing portion configured to retain a plurality of ferrules therein. The connector bodies 226, 231 are generally configured to mate with one another such that a portion of the backplane connector body is received within a portion of the daughterboard connector body 226. Like the connector bodies 26, 31 discussed above, the connector bodies 226, 331 can be mated together before the connection system 210 is latched.

Figure 11:
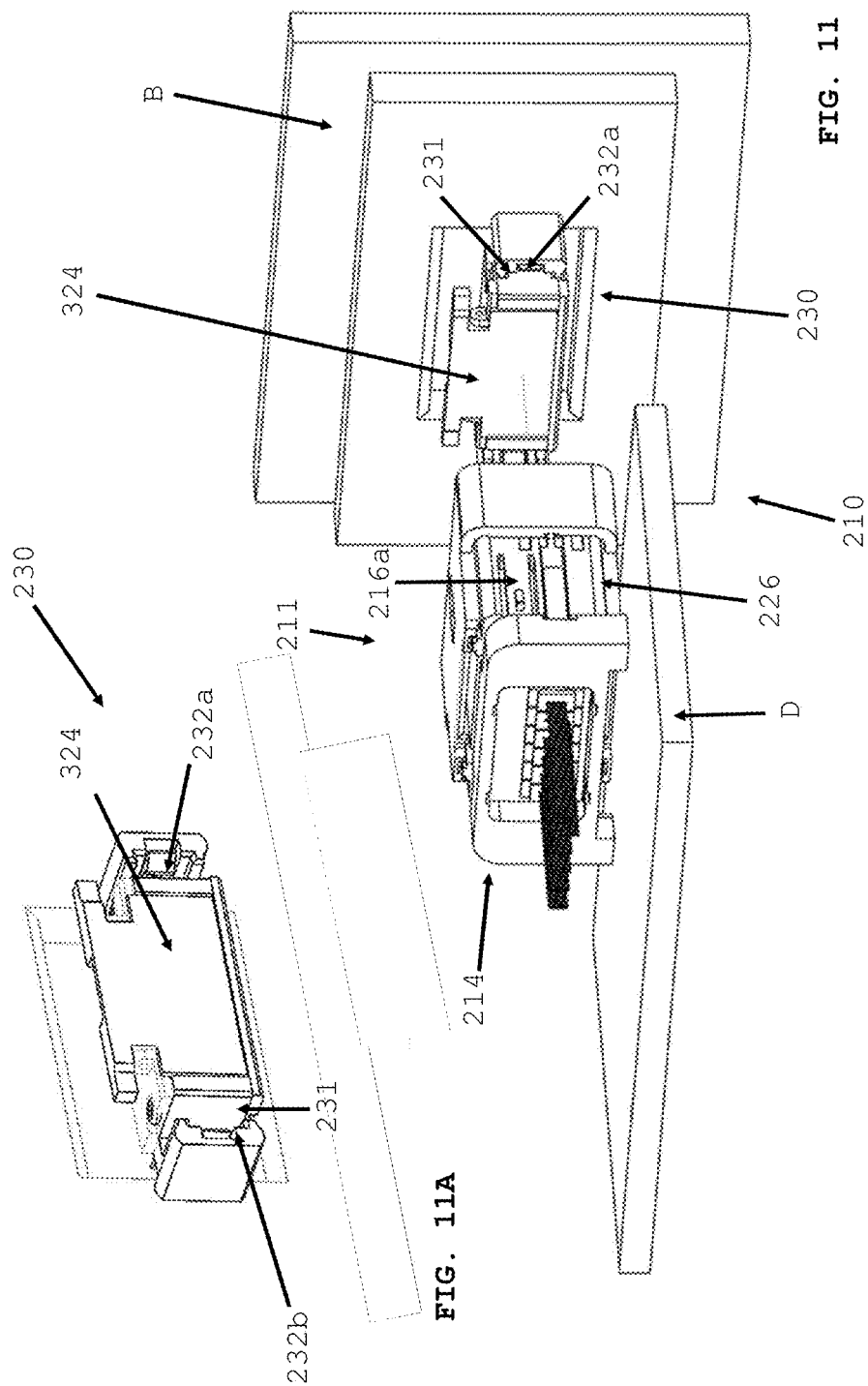
FIG. 11 is a perspective of the connection system of FIG. 10 in a disconnected configuration.

The backplane connector 230 comprises a shutter 324 for covering the ferrules when the connector is not mated to the daughterboard connector 211, as shown in FIG. 11. The illustrated shutter 324 comprises a single panel pivotably connected to the connector body 231. Further, the shutter 324 is resiliently biased to a closed position The upper end portion of the shutter 324 is configured to engage the front end portion of the daughterboard connector body 326 as the connectors 211, 230 are mated together. This causes the shutter 324 to swing or pivot about a hinge to an open position so that an optical connection can be made.

The daughterboard connector 211 comprises a pair of rigid latch arms 218a, 218b that are configured to latch with a pair of bendable latch arms 232a, 232b of the backplane connector 230. Moreover, like the daughterboard connector 11 discussed above, the daughterboard connector 211 comprises a movable collar 214 comprising a pair of latch control arms 214a, 214b and configured to move longitudinally along the connector body 226 through a range of motion that includes a rear unlatching position and a forward latching position. Again, like the daughterboard connector 11, the daughterboard connector 211 is configured to prevent the collar 214 from moving to the latching position until the daughterboard connector body 226 is mated with the backplane connector body 231.

Figure 12:
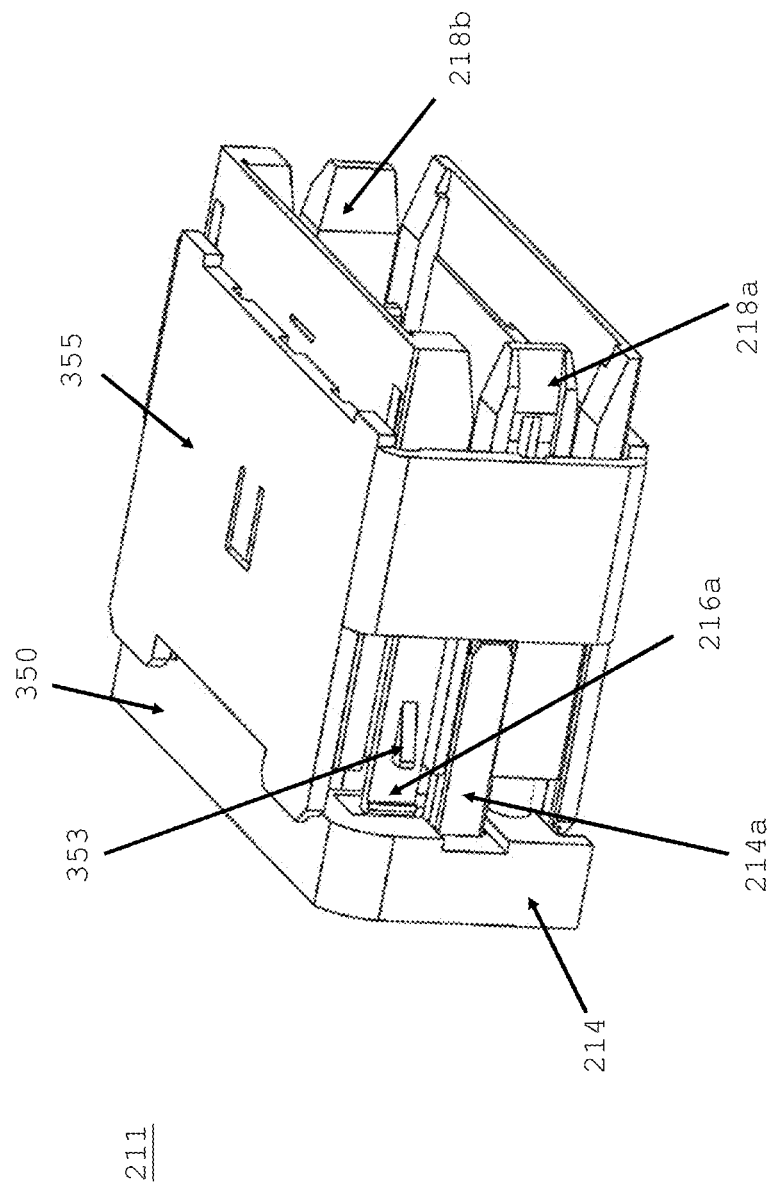
FIG. 12 is perspective of a daughterboard connector of the connection system of FIG. 10.
Figure 14:
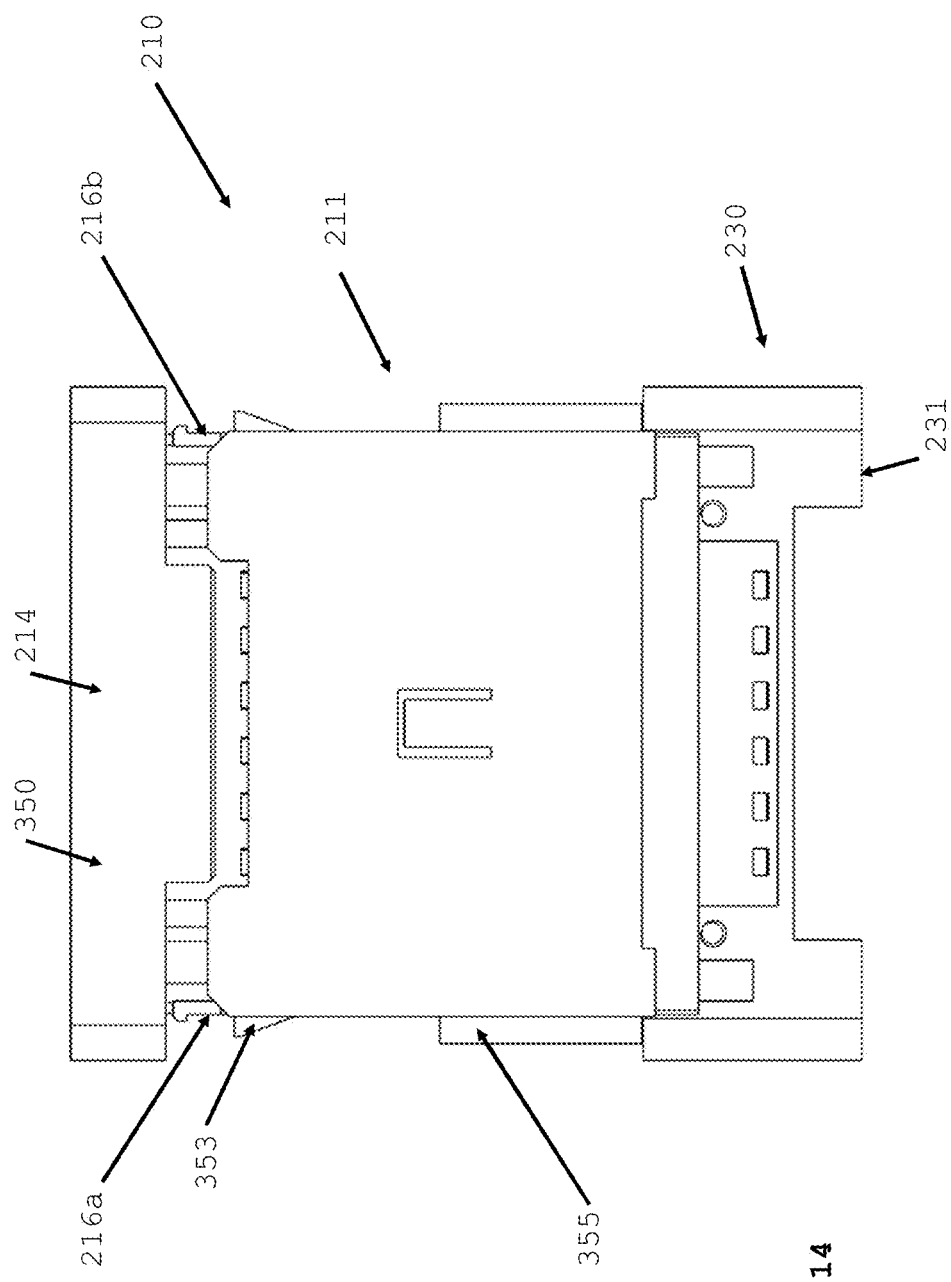
FIG. 14 is a top plan view of the connection system of FIG. 10 in a partially connected configuration.
Figure 15:
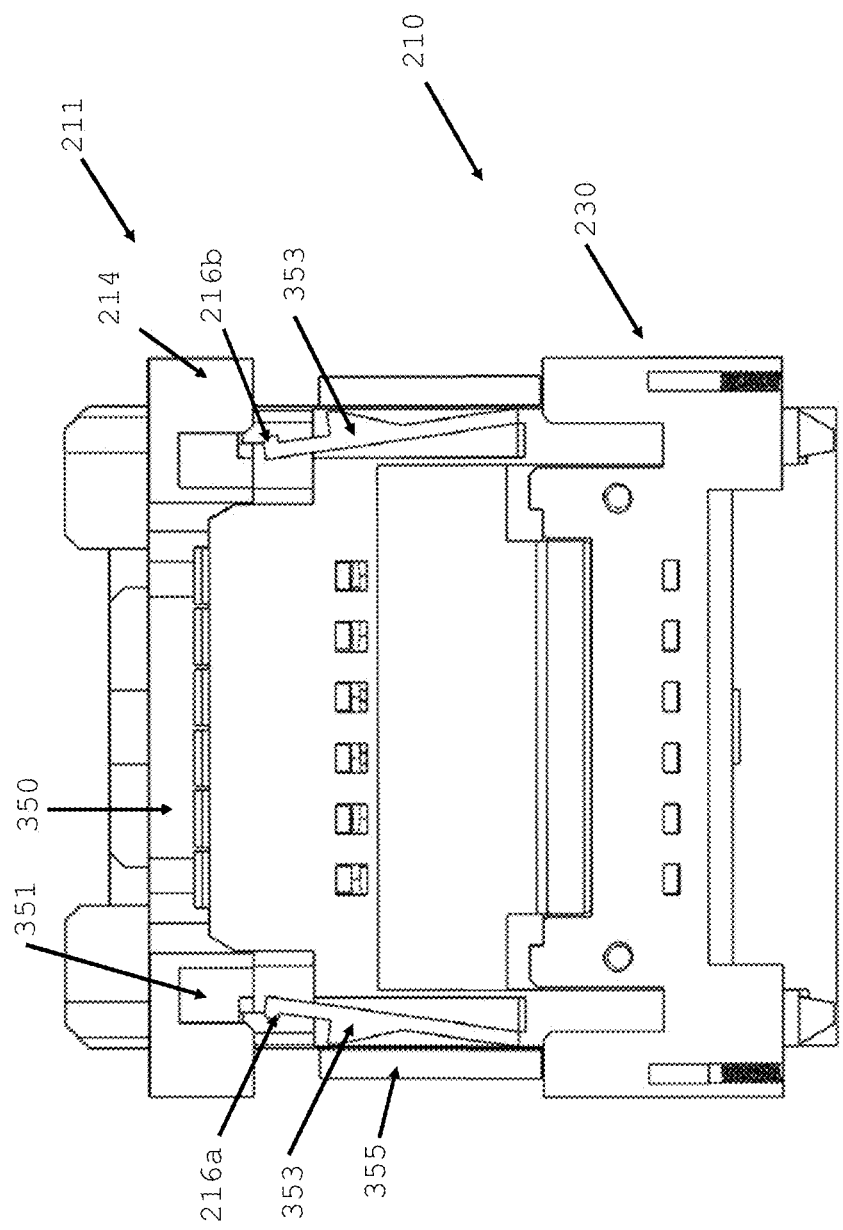
FIG. 15 is a section of the connection system of FIG. 10 in another partially connected configuration that is closer to fully connected than the configuration shown in FIG. 14.
Figure 15A:
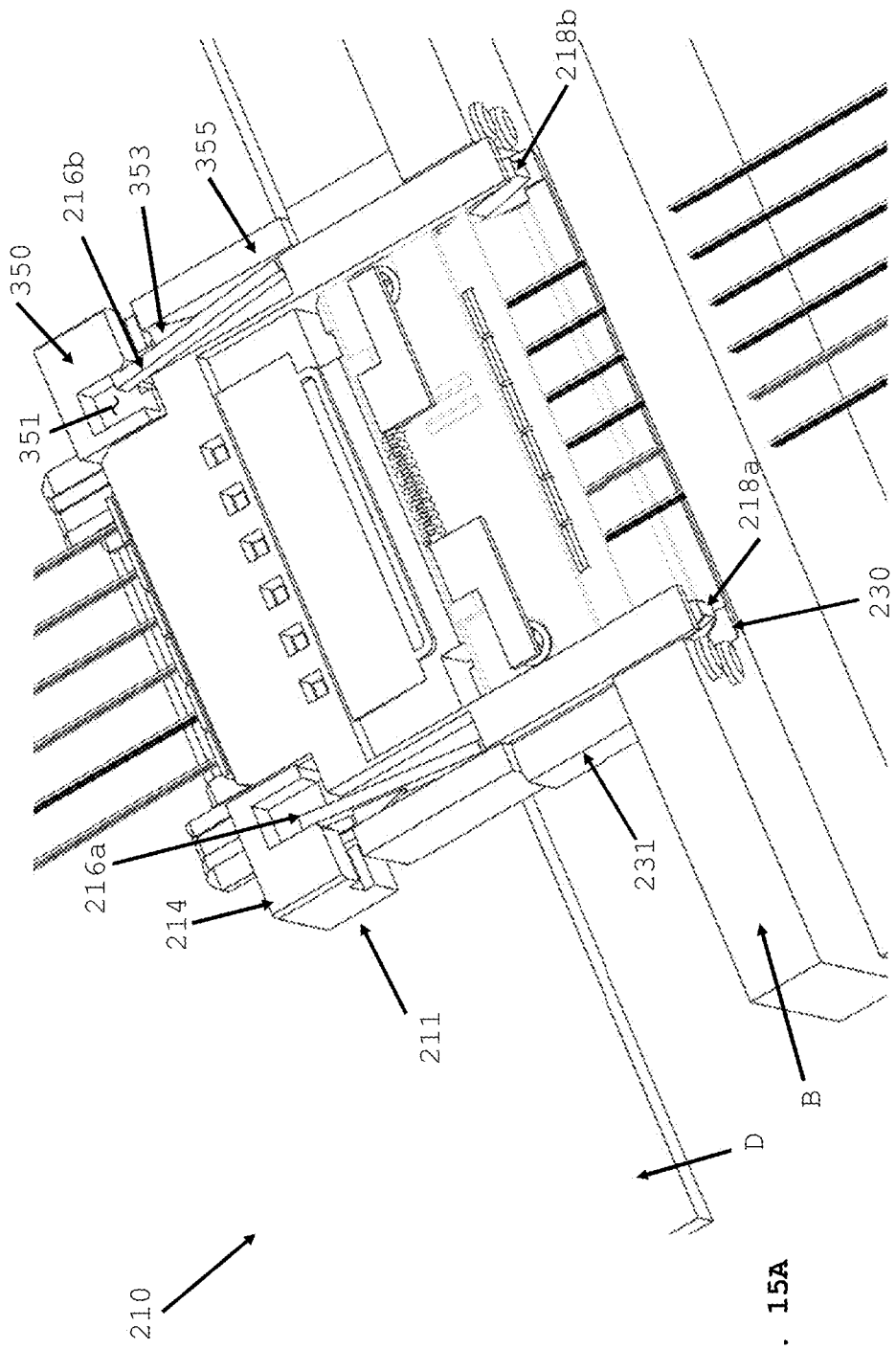
FIG. 15A is an enlarged section in perspective of the connection system of FIG. 10 in an operatively connected configuration.
Figure 16:
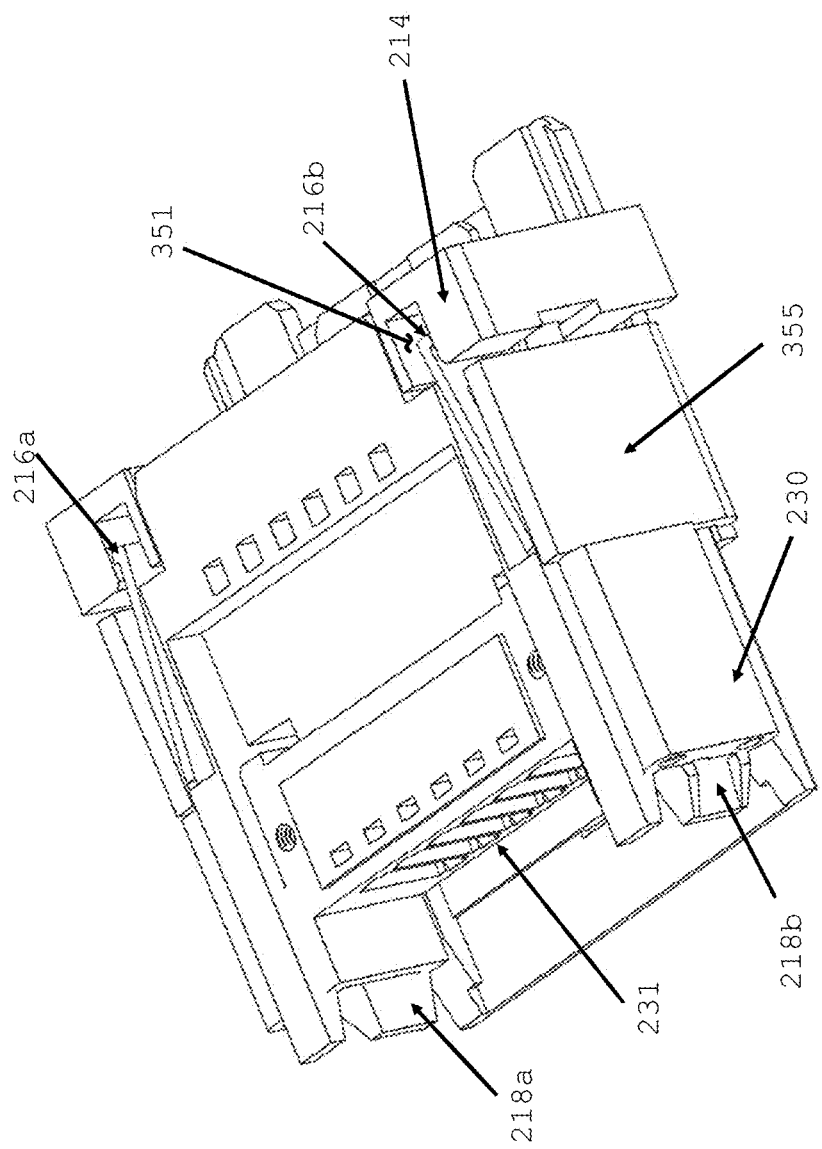
FIG. 16 is a perspective of the connection system of FIG. 10 in an operatively connected configuration with parts removed to show internal construction.
Figure 17:
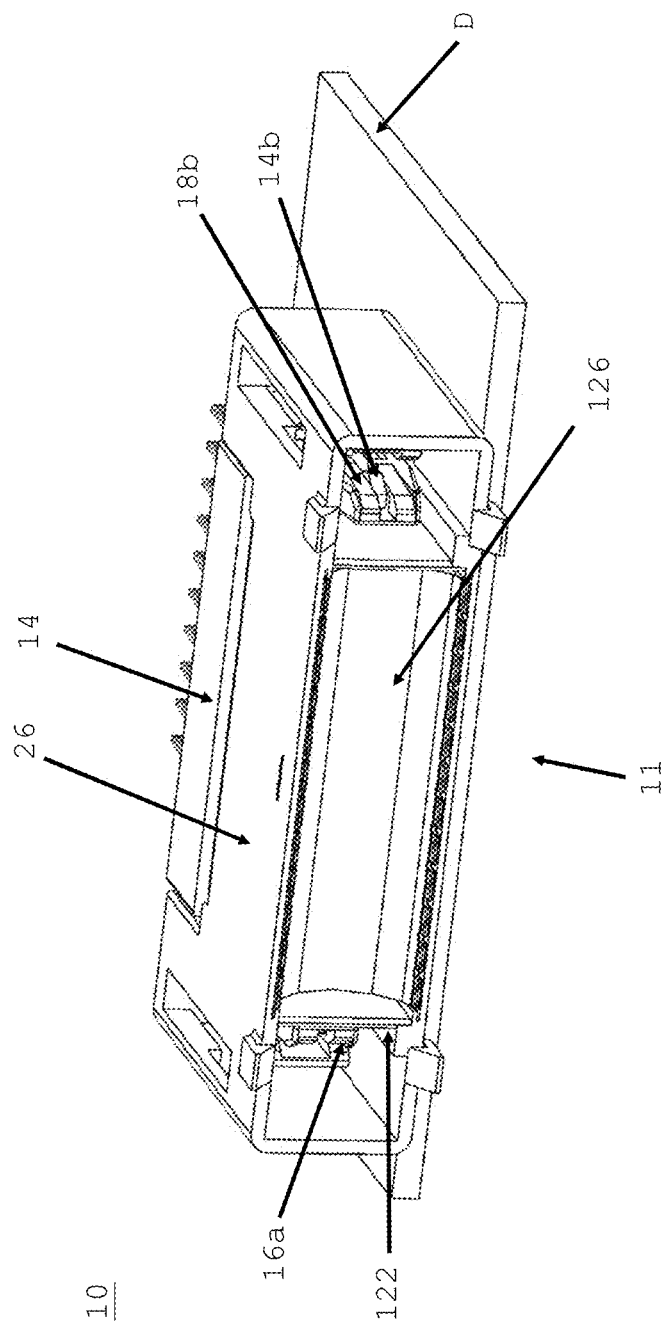
FIG. 17 is a perspective of the daughterboard connector of the connection system of FIG. 1.
Figure 18:
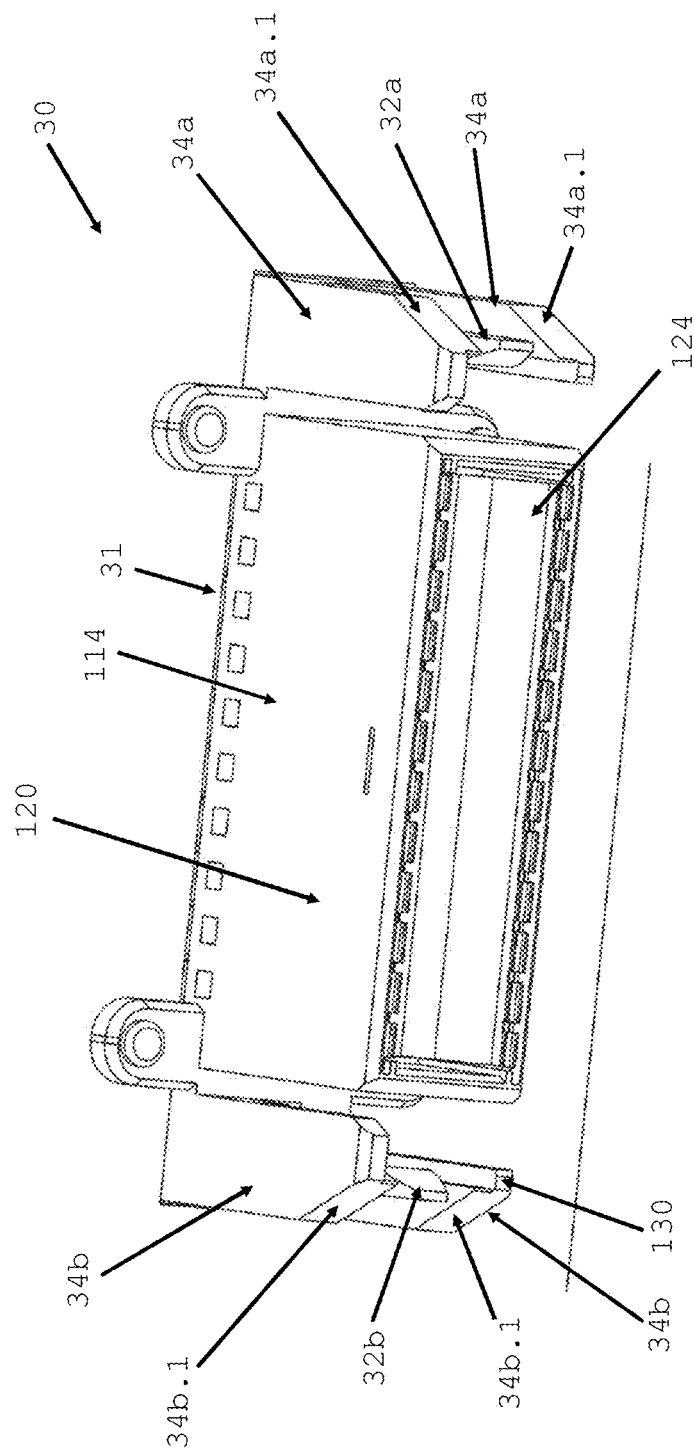
FIG. 18 is a perspective of the backplane connector of the connection system of FIG. 1.
Figure 19:
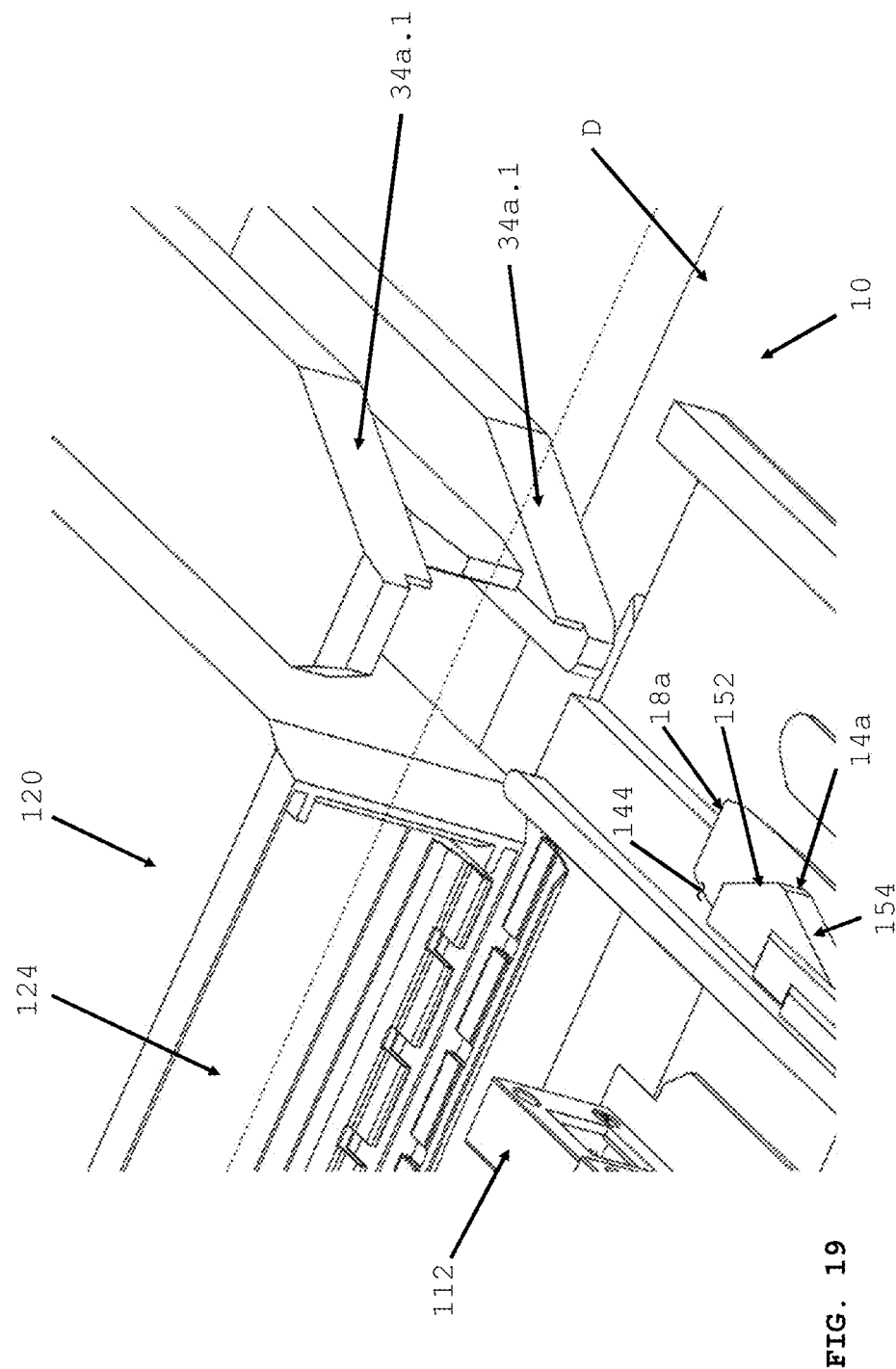
FIG. 19 is an enlarged perspective of a portion of the connection system showing the daughterboard connector approaching the backplane connector and with a top portion of the daughterboard connector body removed.
Figure 20:
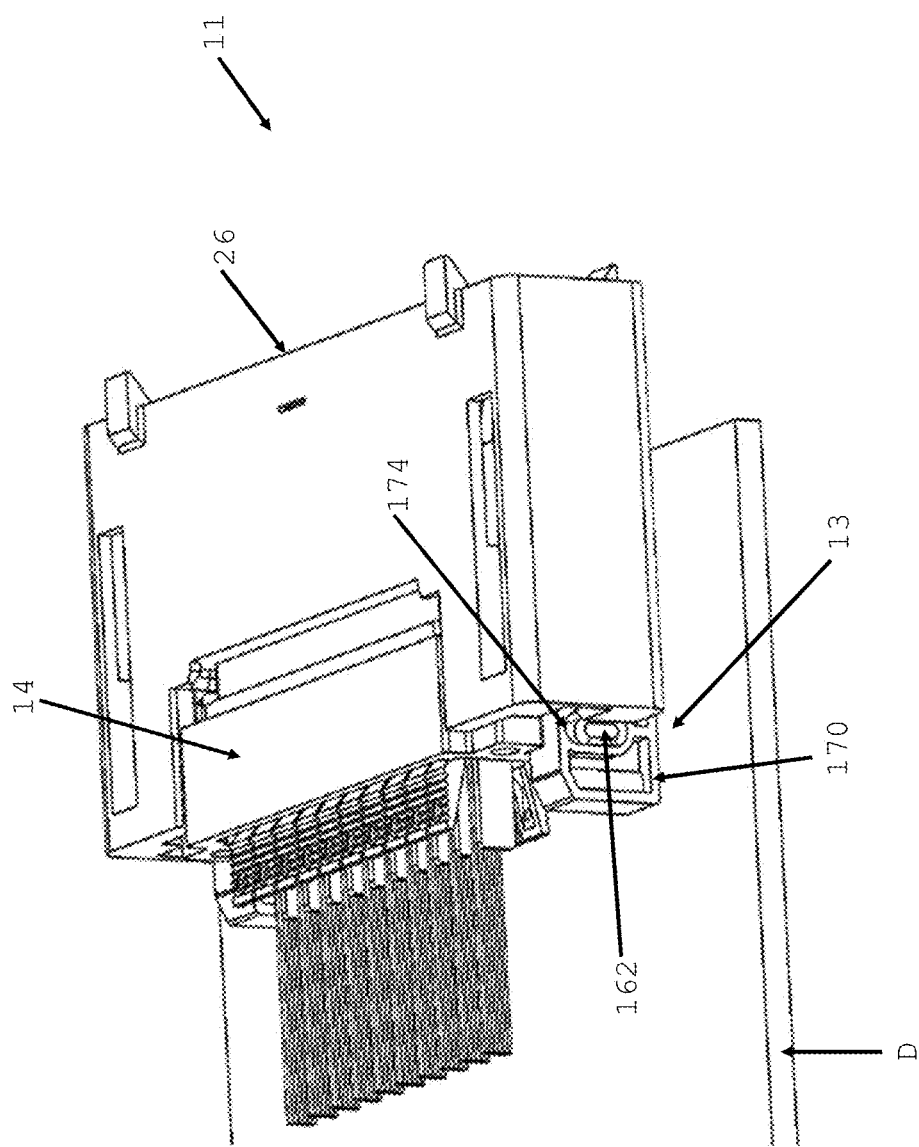
FIG. 20 is a perspective of the daughterboard connector of the connection system of FIG. 1.
Figure 24:
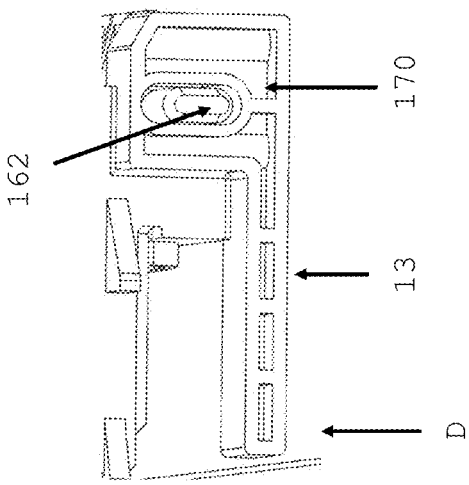
FIG. 24 is an enlarged perspective of a portion of the daughterboard connector of the connection system of FIG. 1.

In the illustrated embodiment, the daughterboard connector body 231 comprises a pair of resiliently bendable blocking arms 216a, 216b that can bend from an outer blocking position shown in FIGS. 12 and 14 to an inner release position shown in FIG. 15. In the outer blocking positions, the arms 216a, 216b are configured to engage a front end of a collar body 350 of the movable collar 214 to prevent forward movement of the collar with respect to the connector body 226. The illustrated collar body 350 further comprises a pair of recesses 351 that open through the front end of the collar body. As shown in FIG. 15, when the blocking arms 216a, 216b are deflected to their inner release positions, the rear end portions of the blocking arms can be received in the recesses 251, allowing the collar 214 to slide forward relative to the connector body 226.

To facilitate deflection of the blocking arms 216a, 216b inward to the release positions, the illustrated release arms comprise ramp projections 353 that extend laterally outward on the blocking arms. In addition, the illustrated daughterboard connector 211 comprises a slidable release member 355 that is configured to slide longitudinally along the connector body 226 from a forward non-releasing position (FIGS. 11, 12, and 14) to a rearward release position (FIGS.

15 and 16). In the forward non-release position, the release member 355 is spaced apart from the ramp projections 353 in the forward longitudinal direction. But as the release member 355 slides rearward along the connector body 226 toward the release position, it is configured to engages the leading angled ramp surfaces of the ramp projections 353, and thereby deflects the blocking arms 216a, 216b laterally inward to the release positions.

As depicted in FIGS. 14 and 15, as the daughterboard connector body 226 is being moved along the backplane connector body 231 toward the backplane B to mate the connector bodies together, the front end portion of the backplane connector body engages the front end portion of the release member 355 and displaces the release member rearward along the daughterboard connector body 226. As explained above, this deflects the blocking arms 216a, 216b to the release positions such that the collar 214 can move forward along the connector body.

Before the collar 214 moves forward along the connector body 226, it is positioned in a rear unlatching position at which the front end portion of the latch control arms 214a, 214b are positioned to deflect the bendable latch arms 232a, 232b to outer unlatched position when the connector bodies 211, 230 are mated together (in much the same way as the connection system 10 described above). Further, like the collar 14 discussed above, when the collar 214 moves forward along the connector body 226 after being released by displacement of the release member 355, the enlarged front end portions of the latch control arms 214a, 214b move forward clear of the bendable latch arms 232a, 232b, allowing the latch arms to rebound inwardly to respective latching positions. This creates a latched connection between the bendable latch arms 232a, 232b and the rigid latch arms 218a, 218b.

To unlatch and separate the connectors 211, 230, the user can pull the collar 214 in the rearward direction. The latch control arms 214a, 214b will deflect the bendable latch arms 232a, 232b laterally outward so that the daughterboard connector 211 can be pulled away from the backplane connector 230.

Referring to FIGS. 31-36l, another embodiment of a backplane connection system, is generally indicated at reference number 410. The connection system 410 comprises a daughterboard connector 411 and a backplane connector 430, each comprising a respective connector body 426, 431 with a ferrule housing portion configured to retain a plurality of ferrules therein. The connector bodies 426, 431 are generally configured to mate with one another such that a portion of the backplane connector body is received within a portion of the daughterboard connector body 426. Unlike the connectors 11, 30 discussed above, the connectors 411, 430 automatically latch together when they are mated.

Figure 32:
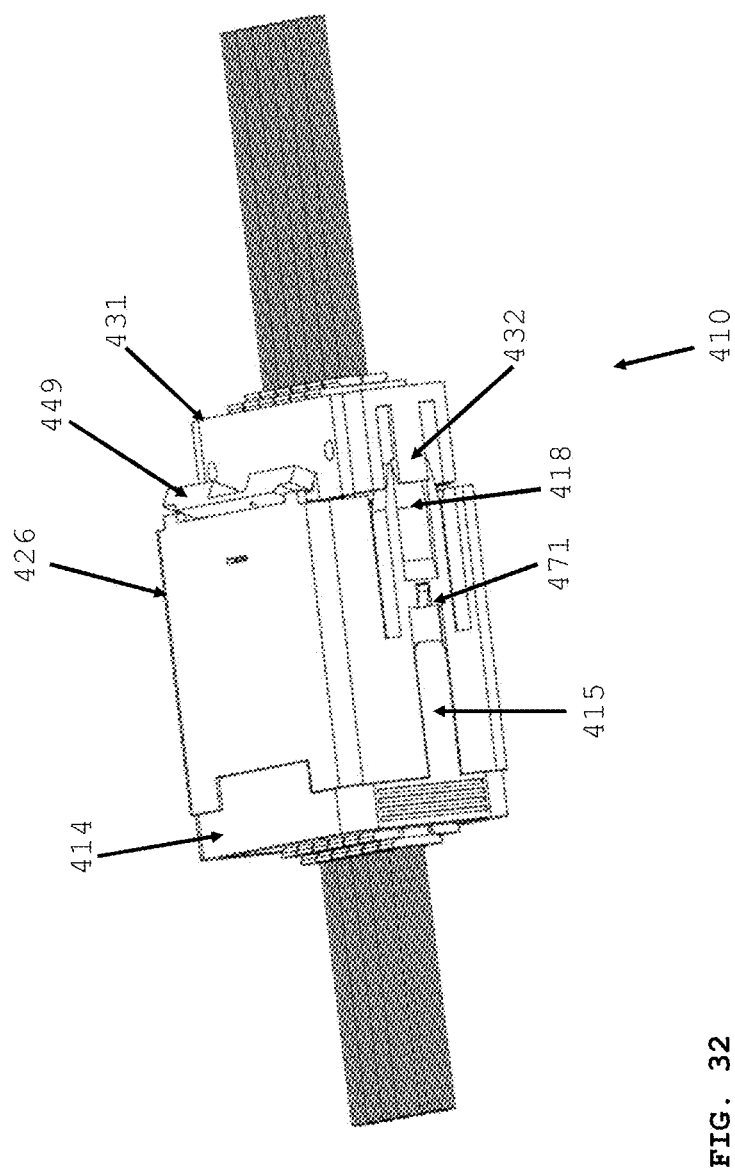
FIG. 32 is a perspective of the connection system of FIG. 31 in a partially connected configuration.
Figure 33:
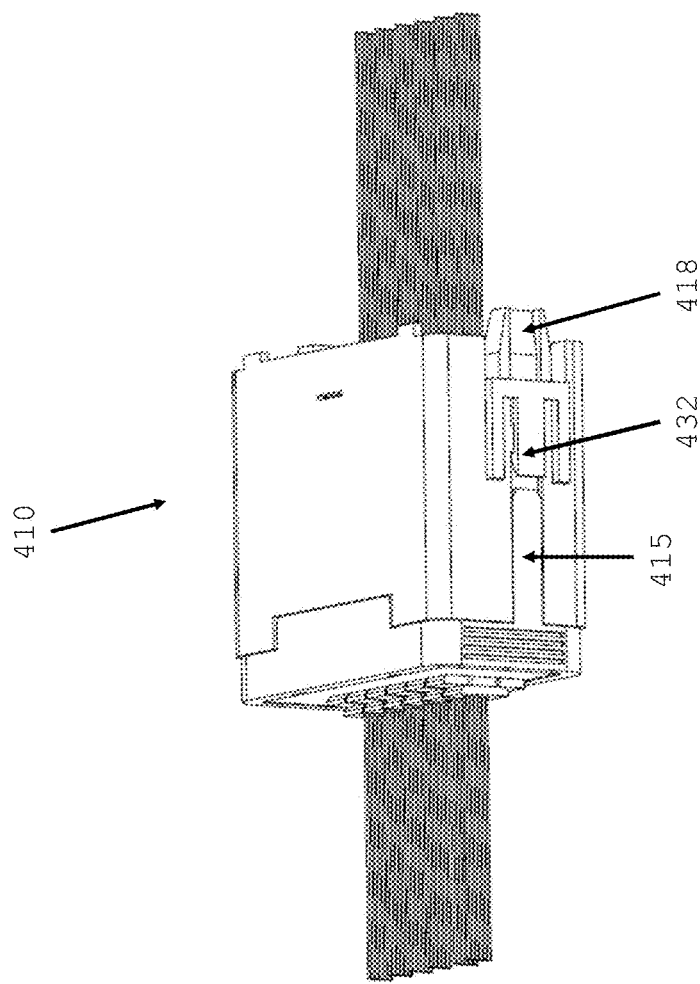
FIG. 33 is a perspective of the connection system of FIG. 31 in an operatively connected configuration.
Figure 34:
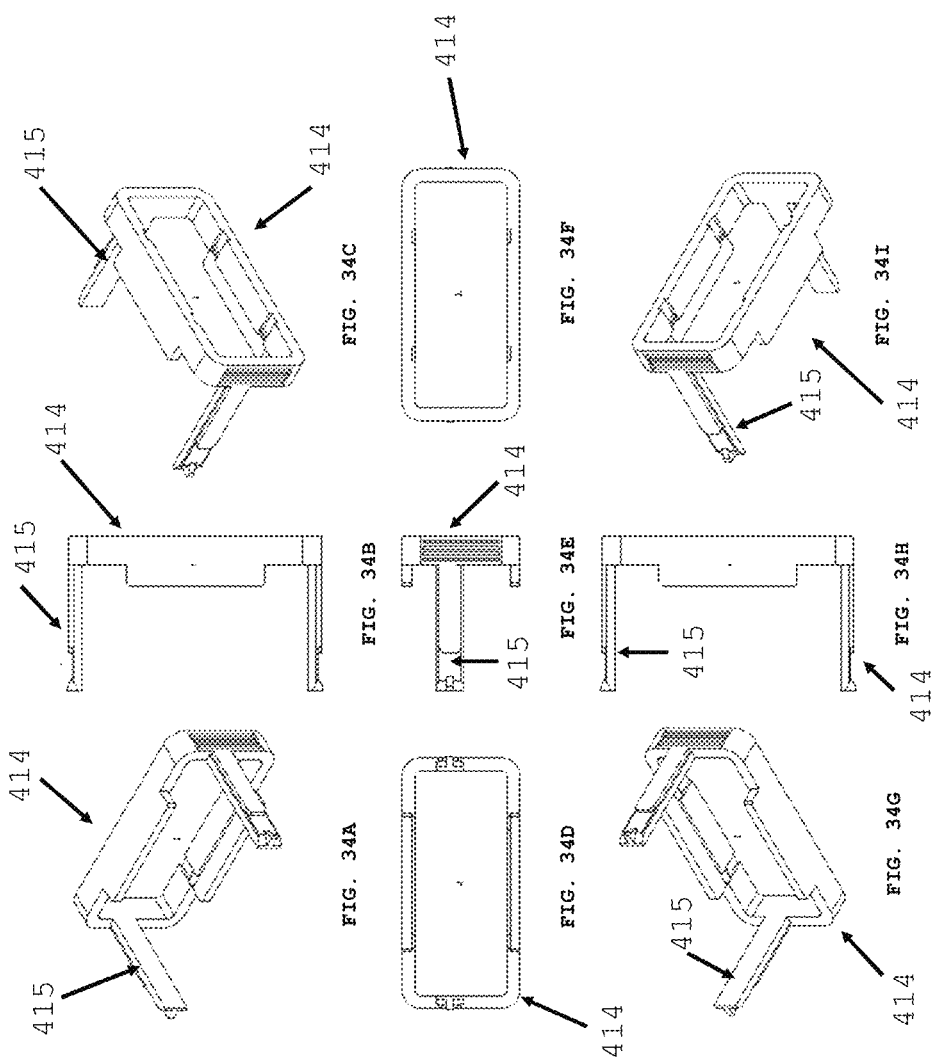
FIGS. 34A-34I are perspective, elevation and plan views of a collar of a daughterboard connector of the connection system of FIG. 31.
Figure 35:
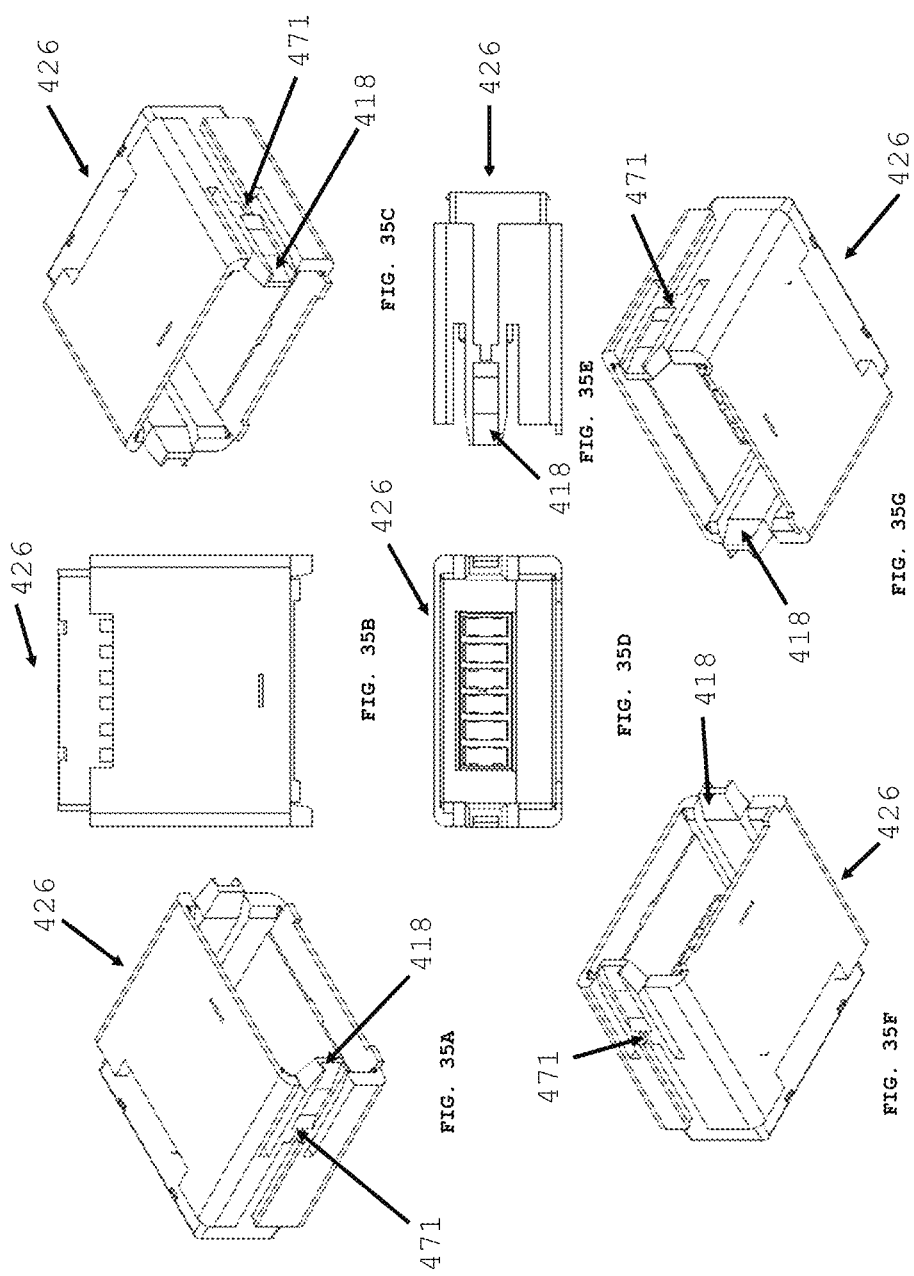
FIGS. 35A-35G are perspective, elevation and plan views of a connector body of the daughterboard connector of the connection system of FIG. 31.
Figure 36:
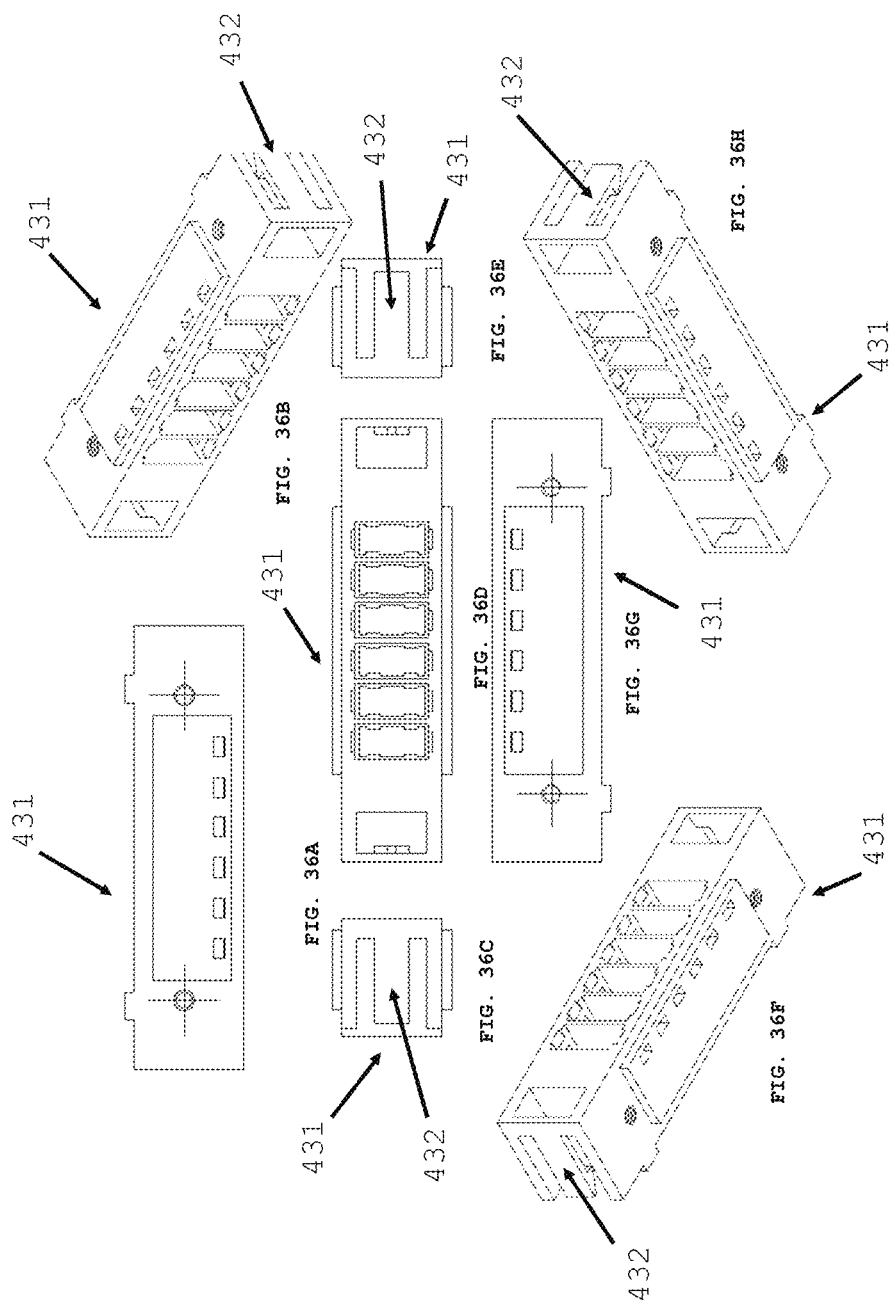
FIGS. 36A-36H are perspective, elevation and plan views of a backplane connector body of the connection system of FIG. 31.

The daughterboard connector 411 comprises a pair of latch arms 418b that are configured to latch with a pair of bendable latch arms 432 of the backplane connector 430. Moreover, like the daughterboard connector 11 discussed above, the daughterboard connector 411 comprises a movable collar 414 comprising a pair of latch control arms 415. The collar 411 is configured to move longitudinally along the connector body 426 through a range of motion that includes a rear unlatching position and a forward latching position. In FIGS. 32-33, the collar is shown in the forward latching position.

To couple the daughterboard connector 411 to the backplane connector 430, the daughterboard connector is simply pushed forward along the backplane connector body 431. The front end portion of the daughterboard connector body 426 pushes against an upper portion of a shutter 449 of the backplane connector 430 to pivot the shutter to an open position. The bendable latch arms 432 bend outwardly to clear a latch hook protrusion 471 of the respective latch arms 416a, 416b and then rebound inwardly so that each pair of opposing latch arms meet in latching engagement. To unlatch and separate the connectors 411, 430, the user can pull the collar 414 in the rearward direction. The enlarged front end portions of the latch control arms 415 will deflect the bendable latch arms 432 laterally outward so that the daughterboard connector 411 can be pulled away from the backplane connector 430.

Referring to FIGS. 37-44, another embodiment of a connection system is generally indicated at reference number 500. Like the connection systems 10, 210, 410 discussed above, the connection system 500 comprises a daughterboard connector 511 and a backplane connector 530. The connectors 511, 530 (like any of the mating connectors 11, 30, 211, 230, 411, 430 described above) may also be referred to as blind mate connectors. The daughterboard connector 511, for example, (like any of the daughterboard connectors 11, 211, 411 described above) may be referred to as a blade switch connector, and the backplane connector 530 may be referred to as a blind mate shuffle box connector.

Figure 37:
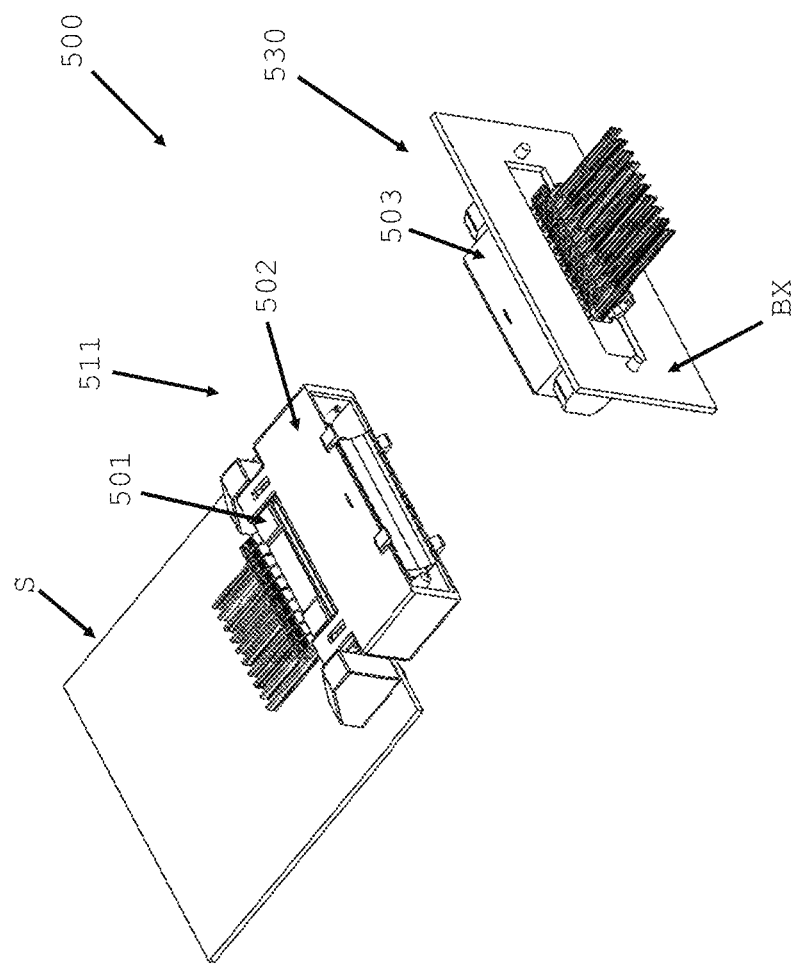
FIG. 37 is a perspective of another connection system in a disconnected configuration.
Figure 38:
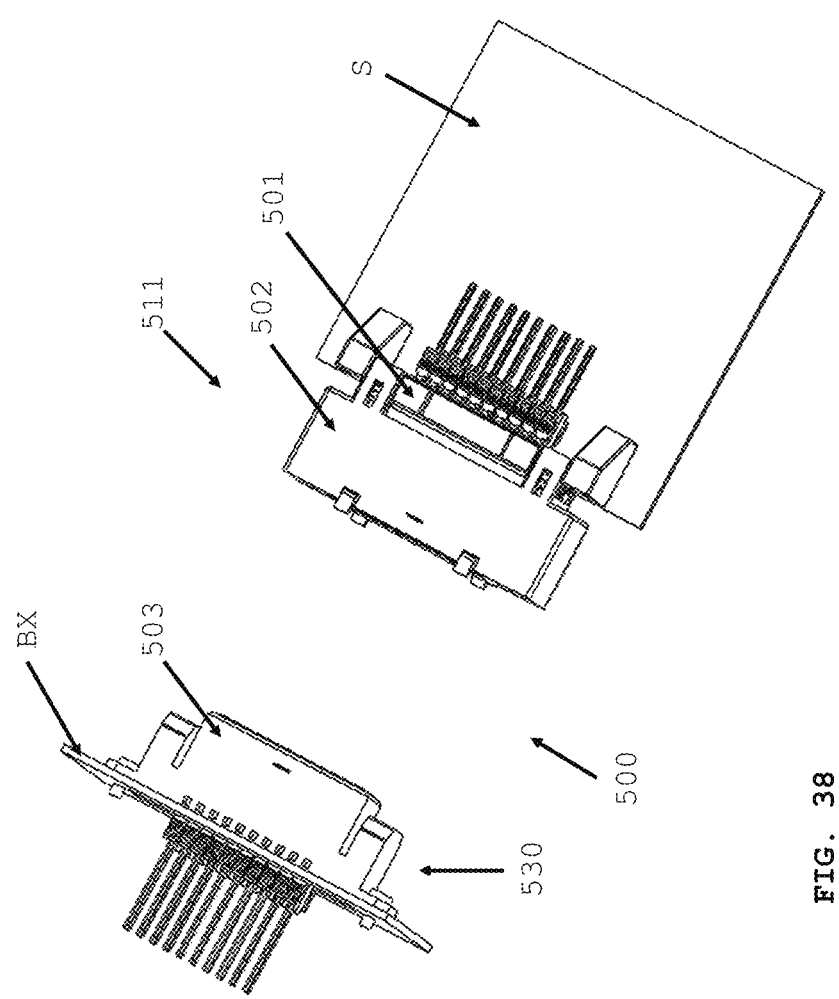
FIG. 38 is another perspective of the connection system of FIG. 37 in a disconnected configuration.

Referring to FIGS. 37-38, the blind mate connector 511 for the blade switch S comprises a backend body 501 that is fixed to the blade switch body or casing. The blind mate connector 511 for the blade switch S further comprises a frontend body 502 that is moveably connected to the backend body 501. The backend body 501 has an opening through which optical fibers extending from the blade switch S are passable to one or more ferrules 506c (FIG. 40) held in the frontend body 502. The corresponding blind mate connector 530 for the shuffle box BX has a single body 503 of a dimension that allows it to be fitted inside the blade switch blind mate connector frontend body 502.

Figure 39:
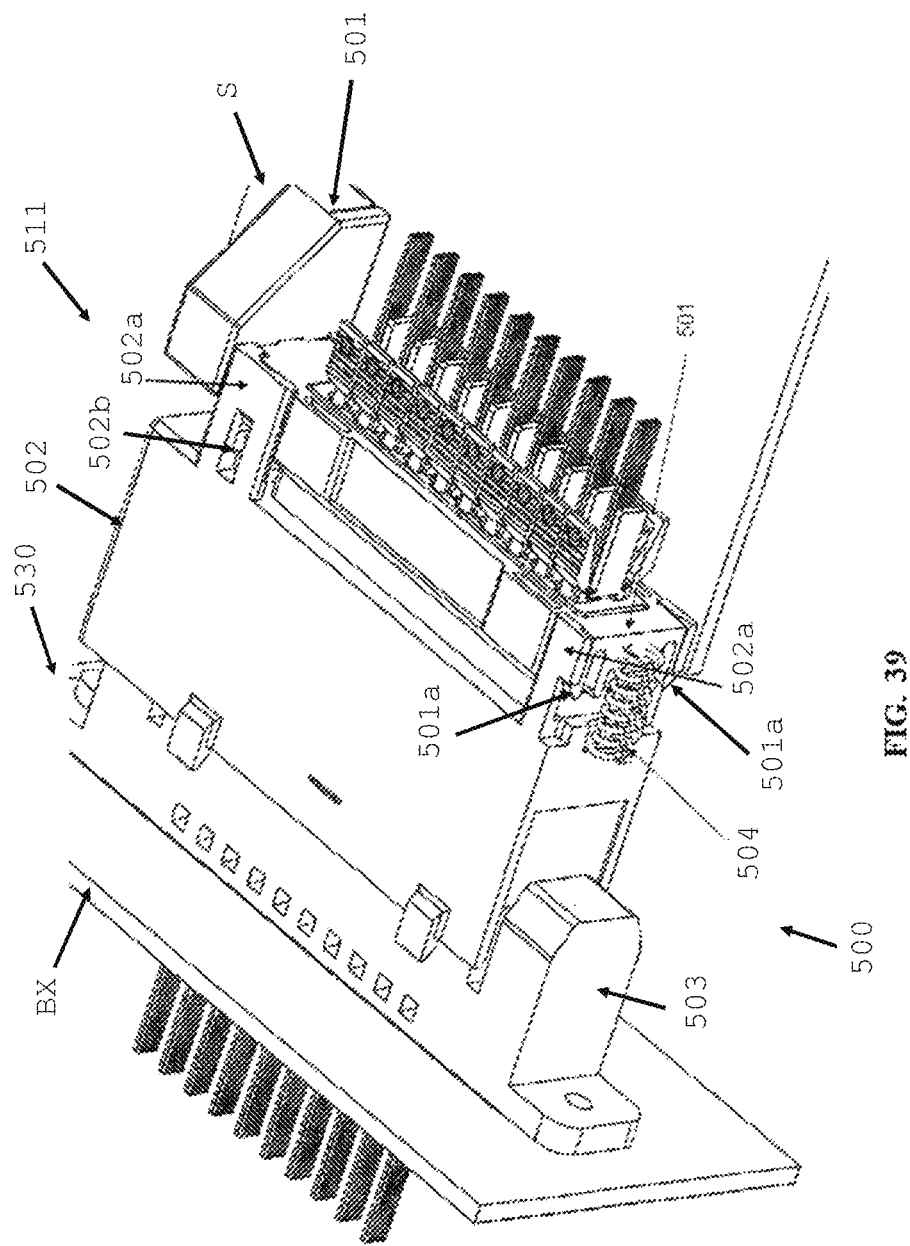
FIG. 39 is a fragmentary perspective of the connection system of FIG. 37 in an operatively connected configuration with a side portion of a daughterboard connector of the connection system removed.

FIG. 39 shows a vertical cross-sectional view of the blade switch blind mate connector 511 and the shuffle box blind mate connector 530 in a mated configuration. The cross-sectional view illustrates a configuration that allows the front end body 502 to float longitudinally on the back end body 501. In particular, the back body 501 comprises a pair of latch hooks 501a that retain a rear end portion 502a of the front body 502. The latch hooks 501a are received in longitudinal slots 502b formed in the upper and lower walls of the front end body. A compression spring 504 extends from a middle portion of the front body 502 to the back body 501 and yieldably biases the front body forward. However, with sufficient force, the front body 502 can be pushed rearward against the springs 504 until the latch hooks 501a bottom out against the forward ends of the slots 502b. Thus, it can be seen that the front body 502 is permitted to float or move along a limited longitudinal range of motion with respect to the back body 501. Moreover, the springs 504 provide a resistive buffer against the pushing force exerted on the blind mate connectors 511, 530 during blind-mating of the blade switch S and the shuffle box B.

Figure 40:
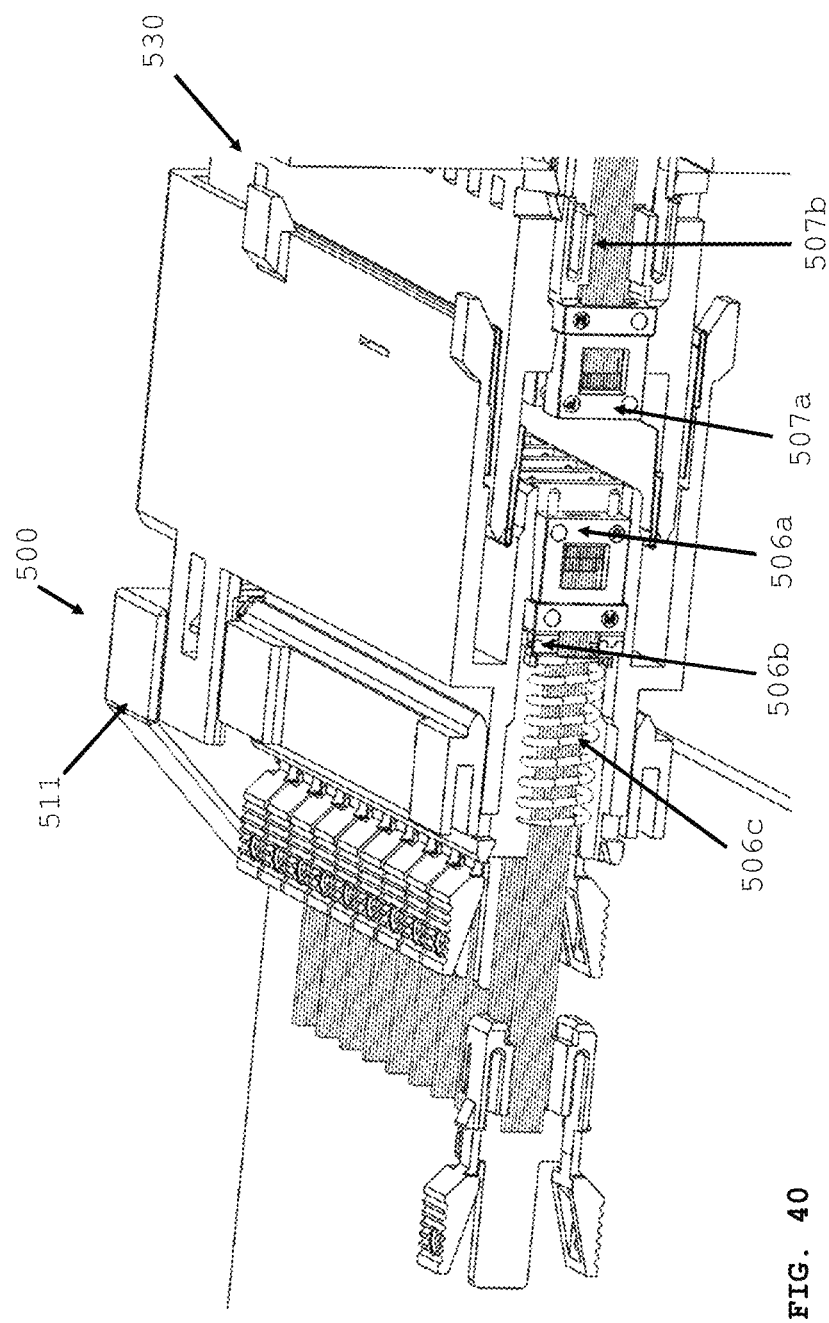
FIG. 40 is a fragmentary vertical section in perspective of the connection system of FIG. 37.
Figure 41:
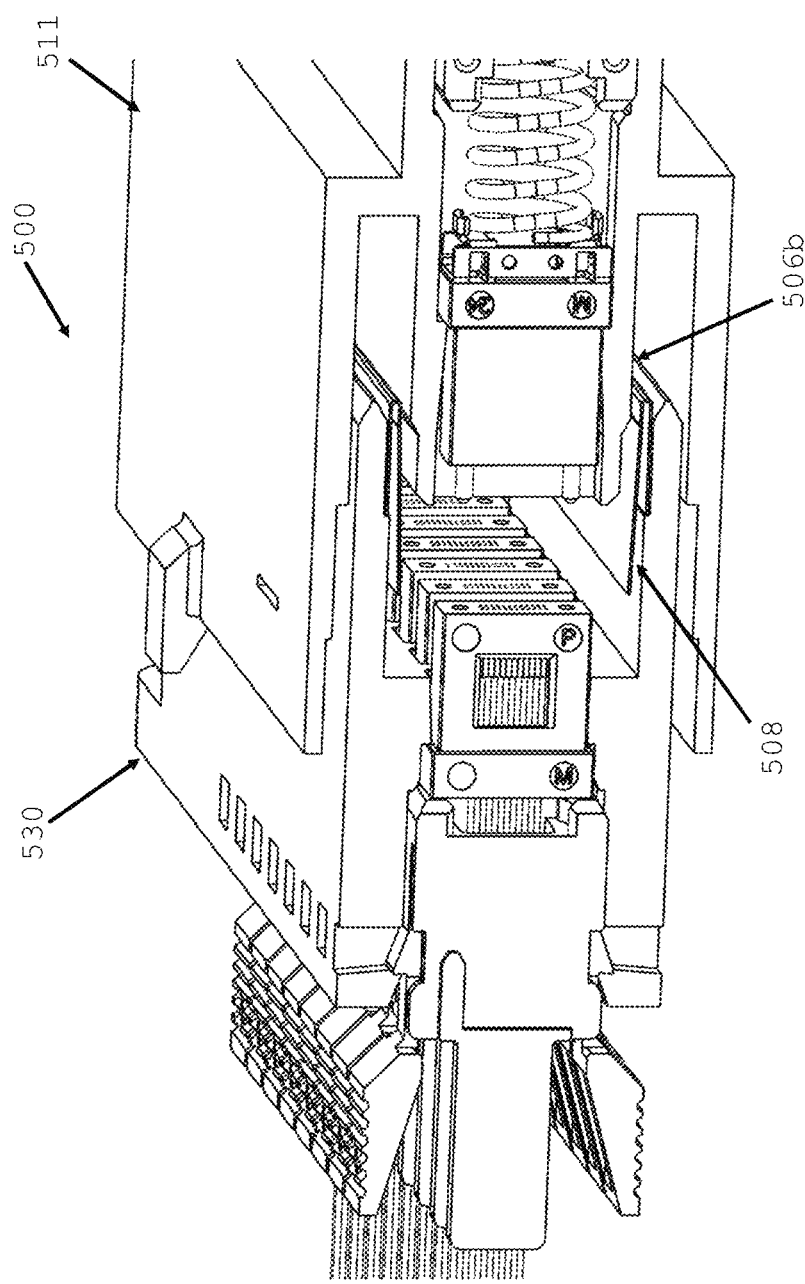
FIG. 41 is another fragmentary vertical section in perspective of the connection system of FIG. 37.

FIGS. 40 and 41 show two other vertical sections of the blade switch blind mate connector 511 and the shuffle box blind mate connector 530 in mated positions. These views show in more detail the shuffle box blind mate connector body 503 being fitted inside the blade switch blind mate connector front end body 502. In FIG. 40, it can be seen that each ferrule 506a in the blade switch blind mate connector is held in an inner ferrule housing portion 506b with a spring 506c engaged with the rear of the ferrule to push the ferrule 506a toward its counterpart ferrule 507a in the shuffle box blind mate connector 530. The spring 506*c* complements the floating mechanism described above by extending resistive buffer against the pushing force exerted on the blind mate connectors 511, 530 during blind-mating of the blade switch S and the shuffle box BX. In the shuffle box blind mate connector body 503, each ferrule 507*a* is secured by a releasable latching mechanism 507*b*.

In accordance to one embodiment, the shuffle box blind mate connector 530 may further comprise a shutter 508 as shown in FIG. 41. The shutter 508 can be of a two-plate design and configured to be pushed open by the mating of the connectors 511, 530, e.g., the inner housing 506*b* of the blade switch blind mate connector can push open the plates forming the shutter.

Figure 42:
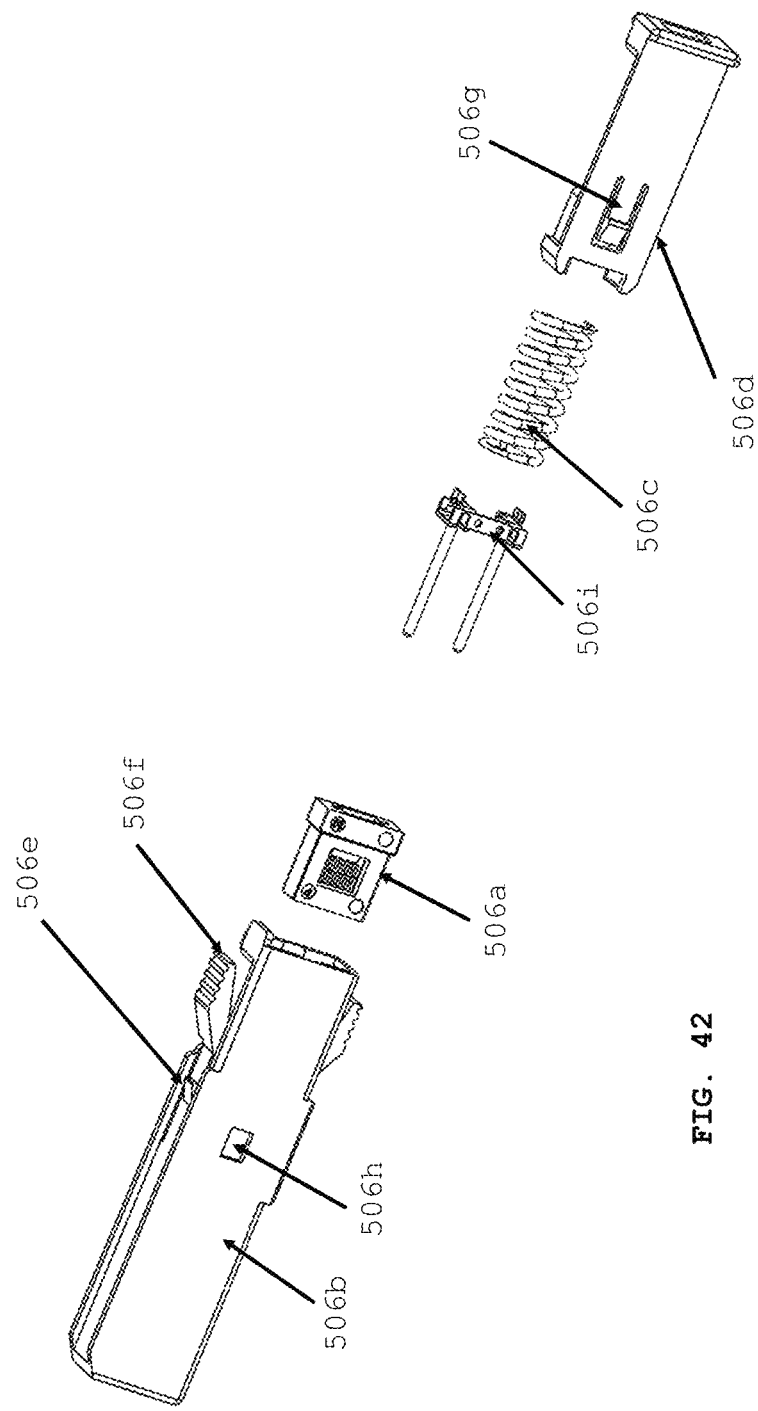
FIG. 42 is an exploded perspective of an inner housing and ferrule subassembly of a connector of the connection system of FIG. 37.
Figure 43:
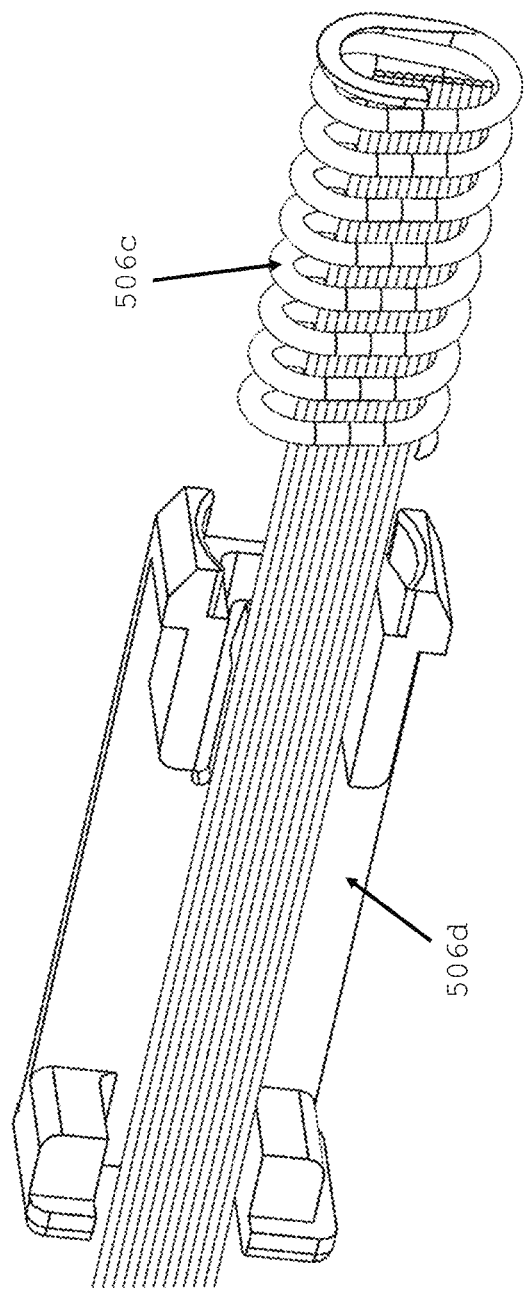
FIG. 43 is a perspective showing a spring exploded away from a back body of the inner housing (shown in section) and ferrule subassembly depicted in FIG. 42.
Figure 44:
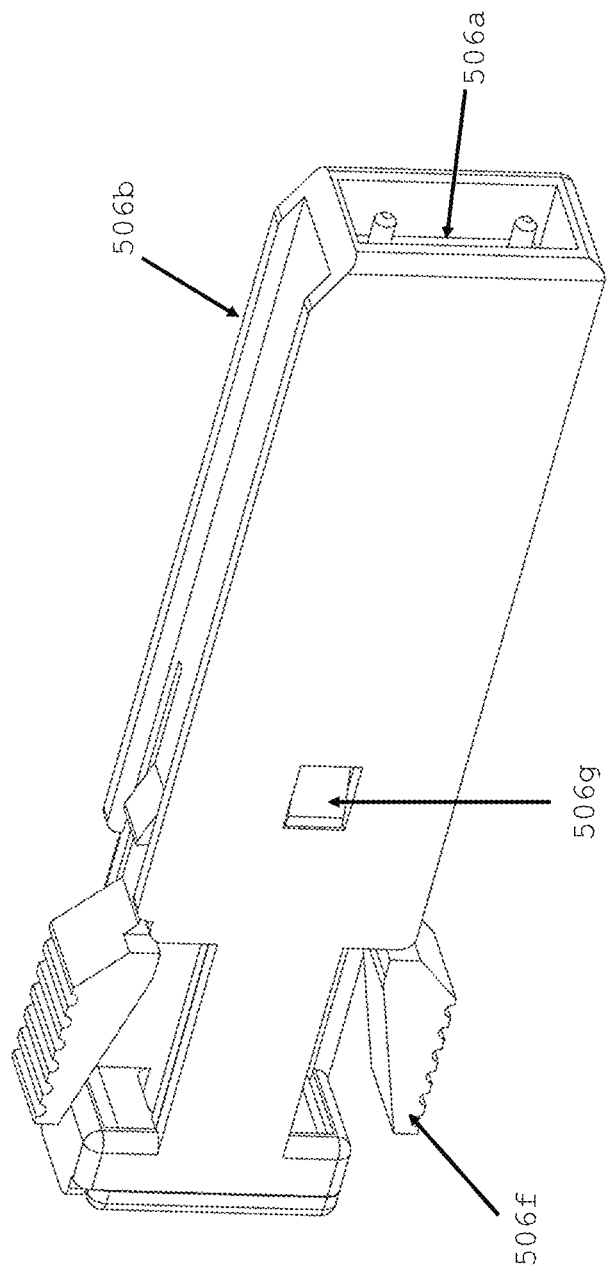
FIG. 44 is a perspective of the inner housing and ferrule subassembly of FIG. 42.

Referring to FIGS. 42-44, in accordance to one embodiment, each ferrule 506*a* in the blade switch blind mate connector 511 is housed in a separate inner housing 506*b*. Each ferrule 506*a* may receive a guide pin assembly 506*i*, and a back body 506*d* may couple with the inner housing 506*b* to compress the spring 506*c* against the rear end portion of the ferrule 506*a*, thereby biasing the ferrule forward. More specifically, the back body 506*d* is inserted into the inner housing 506*b* and latched to it by a back body latch 506*g* latching into a through-hole 506*h* in the inner housing. The front end portion of the back body 506*d* comprises a spring retention collar for receiving and centering a rear end portion of the spring 506*c* therein. The inner housing 506*b* comprises dual latches 506*e* for catching the corresponding grooves or through-holes in the blade switch blind mate connector backend body 501, and the dual release levers 506*f* for releasing the inner housing 506*b* from the blade switch blind mate connector backend body 501.

In accordance to another aspect, the blade switch blind mate connector frontend body 502 further incudes two or more mating pins in its interior that are configured to be received in the corresponding mating holes corresponding mating holes formed on the shuttle box blind mate connector body 503 when the connectors are mated together in the proper polarity orientation but that are configured to prevent mating of the connectors in an inverted orientation. In one embodiment, the mating orientation is ensured by mating pins having a diameter that corresponds to the inner diameter of the mating holes. In another embodiment, the mating orientation is ensured by the mating pins having a length corresponding to the depth of the mating holes. In accordance to still another embodiment, proper mating orientation (polarity) is ensured by an asymmetry in the blind mate connector body; for example, the blade switch blind mate connector frontend body has an extra plate or extension on one side only that can only accommodate the shuttle box blind mate connector body 503 in the proper polarity orientation.

Figure 45:
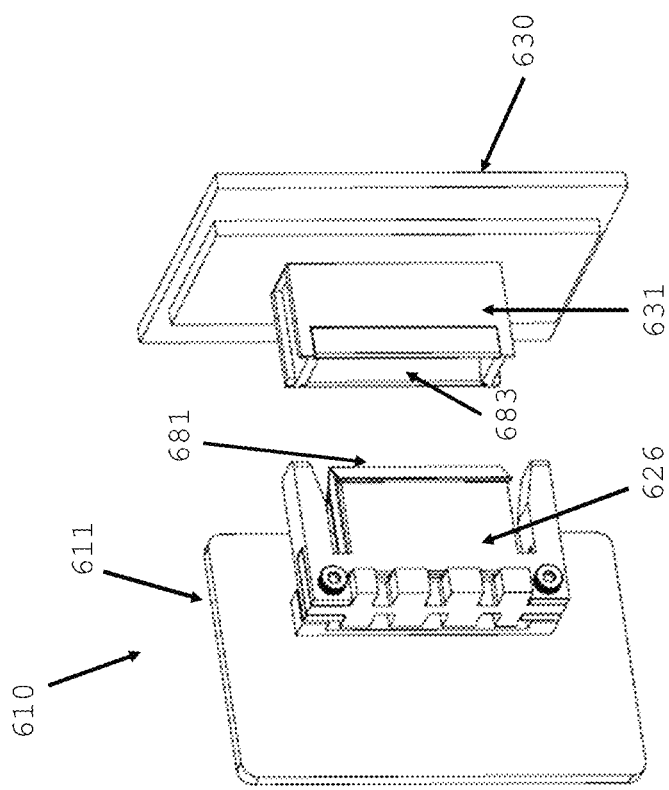
FIG. 45 is a perspective of another connection system in a disconnected configuration.
Figure 46:
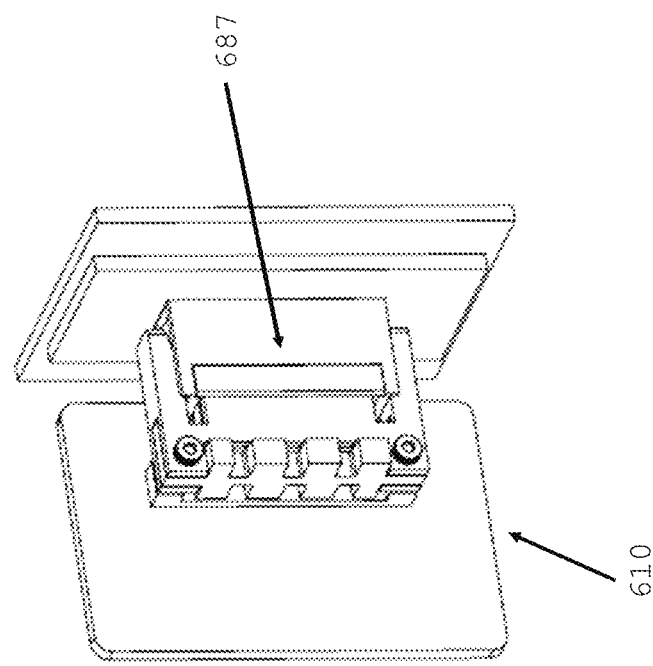
FIG. 46 is a perspective of the connection system of FIG. 45 in an operatively connected configuration.

Referring to FIGS. 45-46, another embodiment of a connection system is generally indicated at reference number 610. The connection system 610 comprises a backplane connector 630 (which also may be referred to as a motherboard connector) having a connector body 631 and a daughterboard connector 611 (which also may be referred to as a line card connector) having a connector body 626. FIG. 45 shows the connectors 611, 630 separated, and FIG. 46 shows the connectors mated together. As shown in FIGS. 47-49, each of the connectors 611, 630 comprises a respective shutter 681, 683, and the shutters are configured to open automatically as the connector 611 moves along the connector 630 to mate the connectors together.

Figure 50:
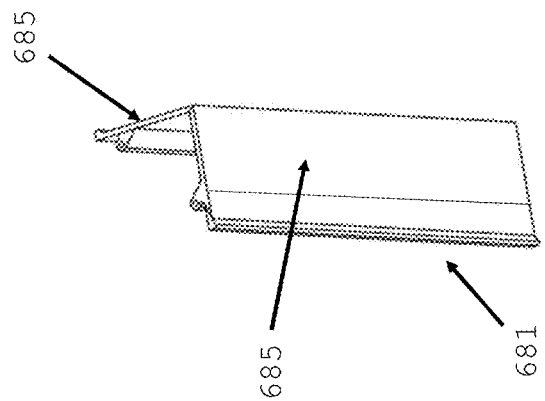
FIG. 50 is a perspective of a shutter of a daughterboard connector of the connection system of FIG. 45.

As shown further in FIG. 50, the daughterboard connector shutter 681 comprises a pair of rigid shutter doors 685, each comprising an inner end portion, an outer end portion, and a hinge connection region spaced apart between the inner end portion and the outer end portion. As shown in FIGS. 47-49, the shutter doors 685 are pivotably connected to an inner housing portion of the connector body 626. Further, the shutter doors 685 are resiliently biased to a closed position at which the inner end portions meet to cover the fronts of the optical fiber ferrules. In the closed position, the outer end portions protrude outboard of the inner housing portion and ferrules. As shown in FIGS. 48 and 49, the outer end portions of the shutter doors 685 are configured to engage the front end portion of the backplane connector body 631 as the connectors 611, 630 are mated together. This causes the shutter doors 685 to swing or pivot to an open position so that an optical connection can be made.

Figure 51:
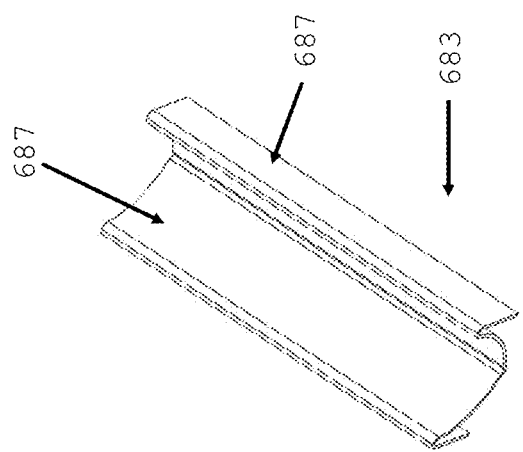
FIG. 51 is a perspective of a shutter of a backplane connector of the connection system of FIG. 45.

As shown further in FIG. 51, the backplane connector shutter 683 comprises a pair of bendable or deformable shutter panels 687, each comprising an inner end portion and an outer end portion. As shown in FIGS. 47-49, the outer end portion of each shutter panel 687 is affixed to a respective wall of the connector body 631. The shutter doors have a natural, undeformed configuration in which they curve inwardly as they extend in the rearward direction from the outer end portions to the inner end portions. In the natural, undeformed configurations, the inner end portions meet to cover the fronts of the optical fiber ferrules. When the connectors 611, 630 are mated together, the front end portion of the inner portion of the daughterboard connector engages the shutter panels 687, thereby bending the shutter doors outward against the opposing walls of the connector body 631. This opens the backplane connector 630 so that an optical connection can be made.

FIGS. 52-54 schematically illustrate that the connection system 610 can have different configurations that enable the shutters 681, 683 to open simultaneously (FIG. 52), to open sequentially with the backplane shutter 683 opening before the daughterboard shutter 681 (FIG. 53), or to open sequentially with the daughterboard shutter 681 opening before the backplane connector shutter 683 (FIG. 54).

FIGS. 55-56 schematically illustrate how the shutters 681, 683 are opened as the connectors 611, 630 are mated together.

In certain connection systems in the scope of this disclosure, the end faces of optical fibers bay be recessed from the end faces of the ferrules by, for example, a distance in an inclusive range of from about 0.5 microns to about 5 microns. In such a configuration, an antireflection coating may be positioned on the ferrule end face and the fiber end facets that terminate within the ferrule. The recessed fibers may have an end face perpendicular to the fiber axis or the fiber end face may have a non-perpendicular angle relative to the fiber axis. A typical angle is 8 degrees offset from perpendicular. By recessing the fibers in this manner, the fibers, which may be subject to repeated matings, are not damaged because only the ferrule faces make contact with each other. This is referred to as a non-contact connection because the mating fibers do not touch. Although the fibers do not touch, the insertion losses may be on order of conventional contact-based connectors. Insertion losses of 0.4 dB to 0.6 dB may be obtained depending upon the amount of separation and other factors including the anti-reflection coating.

When introducing elements of the present disclosure or the preferred embodiment(s) thereof, the articles "a", "an", "the" and "said" are intended to mean that there are one or more of the elements. The terms "comprising", "including"

and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. An optical fiber connection system for connecting a daughterboard to an optical fiber backplane, the optical fiber connection system comprising:
    a first connector comprising a first connector body, the first connector body including a ferrule housing portion configured to retain a first plurality of optical fiber ferrules and a bendable latch arm biased to a latching position and resiliently bendable from the latching position to an unlatching position; and
    a second connector comprising a second connector body configured to be mated with the first connector body and a latching control element slidably connected to the second connector body for movement relative to the second connector body between a first position and a second position, the second connector body including a ferrule housing portion configured to retain a second plurality optical fiber ferrules such that an optical connection is made between the first plurality of optical fiber ferrules and the second plurality of optical fiber ferrules when the second connector is mated with the first connector, the second connector body further comprising a substantially non-bendable latch arm,
    wherein when the second connector body is mated with the first connector body:
    the latching control element is configured to bend the bendable latch arm to the unlatching position when the latching control element is in the first position;
    the latching control element is configured to allow the bendable latch arm to resiliently rebound to the latching position when the latching control element is in the second position;
    the bendable latch arm is configured to latch with the substantially non-bendable latch arm when the bendable latch arm is in the latching position to prevent separation of the first connector from the second-board mounted connector; and
    the bendable latch arm is configured to unlatch from the substantially non-bendable latch arm when the bendable latch arm is in the unlatching position to allow separation of the first connector from the second connector.

2. An optical fiber connection system for connecting a daughterboard to an optical fiber backplane, the optical fiber connection system comprising:
    a first connector comprising a first connector body, the first connector body including a ferrule housing portion configured to retain a first plurality of optical fiber ferrules and a latching element; and
    a second connector comprising a second connector body and a latching control element slidably connected to the second connector body for movement relative to the second connector body between a first position and a second position, the second connector body configured for movement along the first connector body in a mating direction to mate the second connector body with the first connector body, the second connector body including a ferrule housing portion configured to retain a second plurality optical fiber ferrules such that an optical connection is made between the first plurality of optical fiber ferrules and the second plurality of optical fiber ferrules when the second connector body is mated with the first connector body, the second connector body further comprising a bendable blocking arm, the bendable blocking arm being resiliently bendable from a first position to a second position,
    wherein the bendable blocking arm is configured to inhibit movement of the latching control element from the first position to the second position when the bendable blocking arm is in the first position; and
    wherein the first connector body is configured to bend the bendable blocking arm from the first position to the second position as the second connector body moves along the first connector body in the mating direction to mate the second connector body with the first connector body such that when the second connector body is mated with the first connector body the latching control element is movable from the first position to the second position; and
    wherein when the second connector body is mated with the first connector body:
    the latching control element is configured to enable the latching element to latch with the second connector body when the latching control element is in the second position to prevent separation of the first connector from the second connector; and
    the latching control element is configured to unlatch the latching element from the second connector body when the latching control element is in the first position to enable separation of the first connector from the second connector.

3. A connector for mating with a complementary connector, the connector comprising:
    a plurality of optical fiber ferrules;
    a connector body including a ferrule housing portion configured to retain the plurality of optical fiber ferrules, the connector body being configured for movement relative to the complementary connector along a longitudinal axis to mate the connector to the complementary connector whereby the plurality of optical fiber ferrules is optically connected to the complementary connector;
    a latching control element slidably connected to the connector body for movement relative to the connector body along the longitudinal axis in a range of motion, the range of motion including a latching portion and an unlatching portion, the latching portion of the range of motion extending along the longitudinal axis from a first position of the latching control element relative to the connector body to a second position of the latching control element relative to the connector body that is spaced apart from the first position along the longitudinal axis; and
    a board mount connected to the latching control element and configured for being fixedly mounted on a circuit board,
    wherein the latching control element enables the connector body to latch with the complementary connector along the entire latching portion of the range of motion such that the connector body has a range of motion along the longitudinal axis relative to the board mount at which the connector body can latch with the complementary connector.

4. A connector for mating with a complementary connector, the connector comprising:
   a plurality of optical fiber ferrules;
   a connector body including a ferrule housing portion configured to retain the plurality of optical fiber ferrules such that optical fiber ferrules are spaced apart along a lateral axis of connector, the connector body being configured for movement relative to the complementary connector along a longitudinal axis perpendicular to the lateral axis to mate the connector to the complementary connector whereby the plurality of optical fiber ferrules is optically connected to the complementary connector, the connector body being configured to latch with the complementary connector when mated with the complementary connector; and
   a board mount configured for being fixedly mounted on a circuit board, the board mount being connected to the connector body such that the connector body has a limited range of motion relative to board mount along which the connector body can be latched with the complementary connector, the limited range of motion including a longitudinal range of motion extending from a first longitudinal end position to a second longitudinal end position spaced apart from the first longitudinal end position along the longitudinal axis, a lateral range of motion extending from a first lateral end position to a second lateral end position along the lateral axis, and a third-axis range of motion extending from a first third-axis end position to a second third-axis end position along a third axis perpendicular to the longitudinal axis and the lateral axis.

* * * * *